(12) United States Patent
Sato et al.

(10) Patent No.: US 12,228,731 B2
(45) Date of Patent: Feb. 18, 2025

(54) LIGHT GUIDE ELEMENT AND IMAGE DISPLAY APPARATUS

(71) Applicant: FUJIFILM Corporation, Tokyo (JP)

(72) Inventors: Hiroshi Sato, Minamiashigara (JP); Katsumi Sasata, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 510 days.

(21) Appl. No.: 17/824,219

(22) Filed: May 25, 2022

(65) Prior Publication Data

US 2022/0283434 A1  Sep. 8, 2022

Related U.S. Application Data

(63) Continuation of application No. PCT/JP2020/041805, filed on Nov. 10, 2020.

(30) Foreign Application Priority Data

Nov. 26, 2019 (JP) .................. 2019-212856

(51) Int. Cl.
G02B 27/01 (2006.01)
F21V 8/00 (2006.01)
G02B 5/18 (2006.01)

(52) U.S. Cl.
CPC ....... *G02B 27/0101* (2013.01); *G02B 5/1814* (2013.01); *G02B 6/0026* (2013.01); *G02B 6/005* (2013.01)

(58) Field of Classification Search
CPC ............... G02B 27/0101; G02B 5/1814; G02B 6/0026; G02B 6/005; G02B 6/0016; G02B 6/0036; G02B 27/0081; G02B 27/0172

See application file for complete search history.

(56) References Cited

U.S. PATENT DOCUMENTS

2014/0104665 A1* 4/2014 Popovich ............. G02B 6/0076
   359/15
2017/0373459 A1* 12/2017 Weng ................. G02B 27/4261
   (Continued)

FOREIGN PATENT DOCUMENTS

CN   109521506 A    3/2019
CN   110178077 A    8/2019
   (Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/041805, dated Jun. 9, 2022, with an English translation.

(Continued)

*Primary Examiner* — James A Dudek
(74) *Attorney, Agent, or Firm* — Birch, Stewart, Kolasch & Birch, LLP

(57) ABSTRACT

Provided are: a light guide element in which the occurrence of multiple images can be suppressed and a wide viewing angle can be obtained; and an image display apparatus including this light guide element. The light guide element includes: a light guide plate; and first A, first B, second A, and second B incidence diffraction elements and first A, first B, second A, and second B emission diffraction elements, in which the first A and second A incidence diffraction elements and the first B and second B incidence diffraction elements diffract incident light in different directions to be incident into the light guide plate, periods of diffraction structures of the first A and first B incidence diffraction elements are different from periods of diffraction structures of the second A and second B incidence diffraction elements, periods of diffraction structures of the first A and first B emission diffraction elements are different from periods of diffraction (Continued)

structures of the second A and second B emission diffraction elements, the emission diffraction elements are disposed at overlapping positions in a main surface of the light guide plate, and periodic directions of the diffraction structures of the first A and first B emission diffraction elements intersect with periodic directions of the diffraction structures of the second A and second B emission diffraction elements.

25 Claims, 20 Drawing Sheets

(56) References Cited

U.S. PATENT DOCUMENTS

| 2018/0143438 | A1  | 5/2018 | Oh |
| 2018/0239177 | A1* | 8/2018 | Oh ................. G02B 6/0076 |
| 2018/0321500 | A1  | 11/2018 | Chen et al. |
| 2019/0033723 | A1  | 1/2019 | Kierey et al. |
| 2020/0264378 | A1* | 8/2020 | Grant ................. G02B 27/0081 |

FOREIGN PATENT DOCUMENTS

| JP | 2019-502941 A | 1/2019 |
| WO | WO 2017/180403 A1 | 10/2017 |

OTHER PUBLICATIONS

International Search Report (Form PCT/ISA/210) for International Application No. PCT/JP2020/041805, dated Jan. 26, 2021, with an English translation.

Kress et al., "Towards the Ultimate Mixed Reality Experience: HoloLens Display Architecture Choices," SID 2017 Digest, 2017, pp. 127-131.

* cited by examiner

LIGHT GUIDE ELEMENT AND IMAGE DISPLAY APPARATUS

CROSS-REFERENCE TO RELATED APPLICATIONS

This application is a Continuation of PCT International Application No. PCT/JP2020/041805 filed on Nov. 10, 2020, which claims priority under 35 U.S.C. § 119(a) to Japanese Patent Application No. 2019-212856 filed on Nov. 26, 2019. Each of the above applications is hereby expressly incorporated by reference, in its entirety, into the present application.

BACKGROUND OF THE INVENTION

1. Field of the Invention

The present invention relates to a light guide element that propagates light, and an image display apparatus that includes the light guide element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end portion of a light guide plate. As a result, the light is introduced into the light guide plate at an angle such that the light is totally reflected and propagates in the light guide plate. The light propagated in the light guide plate is also diffracted by the diffraction element in the other end portion of the light guide plate and is emitted from the light guide plate to an observation position by the user.

In the light guide element used for AR glasses or the like, WO2017/180403A describes that a part of an incident image in a different direction is diffracted to split the image into two portions, and the two split portions are guided in light guide plates along different routes and are combined by an emission diffraction element during emission to increase a viewing angle.

In addition, in AR glasses, for example, a video consisting of light components having light wavelengths of three colors including red (R), green (G), and blue (B) is emitted from a display, and each of the light components is diffracted and guided into a light guide plate and is emitted from the light guide plate to an observation position of a user by a diffraction element such that the three color images are superimposed on each other and are displayed. As a result, a color image can be displayed (refer to WO2017/180403A).

SUMMARY OF THE INVENTION

Here, in a case where a color image is displayed using AR glasses or the like, it is necessary to use light guide elements corresponding to colors R, G, and B. In the configuration including the three light guide elements, the total thickness increases. However, for AR glasses or the like, a reduction in thickness and weight is required, and it is necessary to reduce the number of light guide elements. Therefore, a configuration in which a plurality of color light components are guided by one light guide element can be considered.

However, according to an investigation, the present inventors found that, in a case where emission side diffraction elements corresponding to the respective colors at wavelengths close to each other are disposed to be superimposed on each other to display a color image, there is a problem in that multiple images occur.

Specifically, in AR glasses, for example, in a case where videos consisting of RGB light components are superimposed on each other to display a color image, for example, the G light is diffracted by a G diffraction element for diffracting G light, and a part of the G light is also diffracted by a R diffraction element for diffracting R light and/or a B diffraction element for diffracting B light. At this time, the G diffraction element is different from the R diffraction element and the B diffraction element in the period of the diffraction structure. Here, as is well known, the diffraction angle of the diffraction element depends on the period of the diffraction structure of the diffraction element and a wavelength of light.

Therefore, the G light diffracted by the G diffraction element, the G light diffracted by the R diffraction element, and the G light diffracted by the B diffraction element are diffracted at different angles. Likewise, regarding the R light and the B light, a part thereof is diffracted at different angles by diffraction elements other than the corresponding diffraction elements. As a result, multiple images are visually recognized.

An object of the present invention is to solve the above-described problems in the related art and is to provide a light guide element in which the occurrence of multiple images can be suppressed and a wide viewing angle can be obtained and an image display apparatus including this light guide element.

In order to achieve the object, the present invention has the following configurations.

[1] A light guide element comprising:
  a light guide plate; and
  a first A incidence diffraction element, a first B incidence diffraction element, a second A incidence diffraction element, a second B incidence diffraction element, a first A emission diffraction element, a first B emission diffraction element, a second A emission diffraction element, and a second B emission diffraction element that are provided in the light guide plate,
  in which the first A incidence diffraction element, the first B incidence diffraction element, the first A emission diffraction element, and the first B emission diffraction element diffract light in the same wavelength range,
  the second A incidence diffraction element, the second B incidence diffraction element, the second A emission diffraction element, and the second B emission diffraction element diffract light in the same wavelength range, the first A incidence diffraction element and the second A incidence diffraction element diffract incident light in different directions to be incident into the light guide plate, the first B incidence diffraction element and the second B incidence diffraction element diffract incident light in different directions to be incident into the light guide plate, the first A emission diffraction element emits light that is diffracted by the first A incidence diffraction element and propagates in the light guide plate from the light guide plate, the first B emission diffraction element emits light that is diffracted by the first B incidence diffraction element and propagates in the light guide plate from the light guide plate, the second A emission diffraction element emits light that is diffracted by the second A incidence diffraction element and propagates in the light guide plate from the light guide plate, the second B emission diffraction element emits light that is diffracted by the second B incidence diffraction element and propagates in the light guide plate from the light guide plate, a period of a diffraction structure of the first A incidence diffraction element is different from periods of diffraction structures of the second A incidence diffraction element and the second B incidence diffraction element, a period of a diffraction structure of the first B incidence diffraction element is different from the periods of the diffraction structures of the second A incidence diffraction element and the second B incidence diffraction element, a period of a diffraction structure of the first A emission diffraction element is different from periods of diffraction structures of the second A emission diffraction element and the second B emission diffraction element, a period of a diffraction structure of the first B emission diffraction element is different from the periods of the diffraction structures of the second A emission diffraction element and the second B emission diffraction element, the first A emission diffraction element, the first B emission diffraction element, the second A emission diffraction element, and the second B emission diffraction element are disposed at overlapping positions in a plane direction of a main surface of the light guide plate, a periodic direction of the diffraction structure of the first A emission diffraction element intersects with a periodic direction of the diffraction structure of the second A emission diffraction element and a periodic direction of the diffraction structure of the second B emission diffraction element, and a periodic direction of the diffraction structure of the first B emission diffraction element intersects with the periodic direction of the diffraction structure of the second A emission diffraction element and the periodic direction of the diffraction structure of the second B emission diffraction element.

[2] The light guide element according to [1], further comprising:

a first A intermediate diffraction element, a first B intermediate diffraction element, a second A intermediate diffraction element, and a second B intermediate diffraction element that are provided on the light guide plate, in which the first A intermediate diffraction element diffracts light that is diffracted by the first A incidence diffraction element and propagates in the light guide plate to the first A emission diffraction element, the first B intermediate diffraction element diffracts light that is diffracted by the first B incidence diffraction element and propagates in the light guide plate to the first B emission diffraction element, the second A intermediate diffraction element diffracts light that is diffracted by the second A incidence diffraction element and propagates in the light guide plate to the second A emission diffraction element, the second B intermediate diffraction element diffracts light that is diffracted by the second B incidence diffraction element and propagates in the light guide plate to the second B emission diffraction element, a period of a diffraction structure of the first A intermediate diffraction element is different from periods of diffraction structures of the second A intermediate diffraction element and the second B intermediate diffraction element, and a period of a diffraction structure of the first B intermediate diffraction element is different from the periods of the diffraction structures of the second A intermediate diffraction element and the second B intermediate diffraction element.

[3] The light guide element according to [2], in which each of the first A intermediate diffraction element, the first B intermediate diffraction element, the second A intermediate diffraction element, and the second B intermediate diffraction element is any one of a volume hologram type diffraction element or a polarization diffraction element.

[4] The light guide element according to any one of [1] to [3], in which each of the first A incidence diffraction element, the first B incidence diffraction element, the second A incidence diffraction element, the second B incidence diffraction element, the first A emission diffraction element, the first B emission diffraction element, the second A emission diffraction element, and the second B emission diffraction element is any one of a volume hologram type diffraction element or a polarization diffraction element.

[5] The light guide element according to [3] or [4], in which the polarization diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction.

[6] The light guide element according to [5], in which the liquid crystal diffraction element has a region in which the direction of the optical axis of the liquid crystal compound is helically twisted and rotates in a thickness direction.

[7] The light guide element according to [5] or [6], in which the liquid crystal diffraction element includes a cholesteric liquid crystal layer obtained by immobilizing a cholesteric liquid crystalline phase.

[8] The light guide element according to [7], in which in at least either of the first A emission diffraction element and the second A emission diffraction element or the first B emission diffraction element and the second B emission diffraction element, helical twisted rotation directions of cholesteric liquid crystalline phases are different from each other.

[9] The light guide element according to any one of [5] to [8],
in which in a case where an in-plane retardation is measured from a direction tilted with respect to a normal direction and a normal line of a main surface of the liquid crystal diffraction element, a direction in which the in-plane retardation is minimum in any one of a slow axis plane or a fast axis plane is tilted from the normal direction.

[10] The light guide element according to any one of [1] to [9],
in which the periods of the diffraction structures of the first A emission diffraction element, the first B emission diffraction element, the second A emission diffraction element, and the second B emission diffraction element are 0.1 µm to 10 µm.

[11] The light guide element according to any one of [1] to [10],
in which at least either of the first A incidence diffraction element and the first B incidence diffraction element or the second A incidence diffraction element and the second B incidence diffraction element are laminated.

[12] The light guide element according to any one of [1] to [10],
in which the first A incidence diffraction element, the first B incidence diffraction element, the second A incidence diffraction element, and the second B incidence diffraction element are disposed at different positions in the plane direction of the light guide plate.

[13] The light guide element according to any one of [1] to [12], further comprising:
a third A incidence diffraction element, a third B incidence diffraction element, a third A emission diffraction element, and a third B emission diffraction element that are provided on the light guide plate,
in which the third A incidence diffraction element, the third B incidence diffraction element, the third A emission diffraction element, and the third B emission diffraction element diffract light in the same wavelength range,
the third A incidence diffraction element and the second A incidence diffraction element diffract incident light in different directions to be incident into the light guide plate,
the third B incidence diffraction element and the second B incidence diffraction element diffract incident light in different directions to be incident into the light guide plate,
the third A emission diffraction element emits light that is diffracted by the third A incidence diffraction element and propagates in the light guide plate from the light guide plate,
the third B emission diffraction element emits light that is diffracted by the third B incidence diffraction element and propagates in the light guide plate from the light guide plate,
periods of diffraction structures of the third A incidence diffraction element and the third B incidence diffraction element are different from the periods of the diffraction structures of the first A incidence diffraction element and the first B incidence diffraction element and the periods of the diffraction structures of the second A incidence diffraction element and the second B incidence diffraction element,
periods of diffraction structures of the third A emission diffraction element and the third B emission diffraction element are different from the periods of the diffraction structures of the first A emission diffraction element and the first B emission diffraction element and the periods of the diffraction structures of the second A emission diffraction element and the second B emission diffraction element,
the third A emission diffraction element, the third B emission diffraction element, the second A emission diffraction element, and the second B emission diffraction element are disposed at overlapping positions in the plane direction of the main surface of the light guide plate,
a periodic direction of the diffraction structure of the third A emission diffraction element intersects with the periodic direction of the diffraction structure of the second A emission diffraction element and the periodic direction of the diffraction structure of the second B emission diffraction element, and
a periodic direction of the diffraction structure of the third B emission diffraction element intersects with the periodic direction of the diffraction structure of the second A emission diffraction element and the periodic direction of the diffraction structure of the second B emission diffraction element.

[14] The light guide element according to [13],
in which in a case where the periods of the diffraction structures of the first A incidence diffraction element and the first B incidence diffraction element are represented by $\Lambda_{in1}$,
the periods of the diffraction structures of the second A incidence diffraction element and the second B incidence diffraction element are represented by $\Lambda_{in2}$,
the periods of the diffraction structures of the third A incidence diffraction element and the third B incidence diffraction element are represented by $\Lambda_{in3}$,
the periods of the diffraction structures of the first A emission diffraction element and the first B emission diffraction element are represented by $\Lambda_{out1}$,
the periods of the diffraction structures of the second A emission diffraction element and the second B emission diffraction element are represented by $\Lambda_{out2}$, and
the periods of the diffraction structures of the third A emission diffraction element and the third B emission diffraction element are represented by $\Lambda_{out3}$, $\Lambda_{in1} < \Lambda_{in2} < \Lambda_{in3}$ and $\Lambda_{out1} < \Lambda_{out2} < \Lambda_{out3}$ are satisfied.

[15] The light guide element according to [13] or [14], further comprising:
a first A intermediate diffraction element, a first B intermediate diffraction element, a second A intermediate diffraction element, a second B intermediate diffraction element, a third A intermediate diffraction element, and a third B intermediate diffraction element that are provided on the light guide plate,
in which the third A intermediate diffraction element diffracts light that is diffracted by the third A incidence diffraction element and propagates in the light guide plate to the third A emission diffraction element,
the third B intermediate diffraction element diffracts light that is diffracted by the third B incidence diffraction element and propagates in the light guide plate to the third B emission diffraction element, a period of a diffraction structure of the third A intermediate diffraction element is different from periods of diffraction structures of the second A intermediate diffraction element and the second B intermediate diffraction element, and a period of a diffraction structure of the third B intermediate diffraction element is different from the periods of the diffraction structures of the second A intermediate diffraction element and the second B intermediate diffraction element.

[16] The light guide element according to [15], in which in a case where periods of diffraction structures of the first A intermediate diffraction element and the first B intermediate diffraction element are represented by $\Lambda_{mid1}$, the periods of the diffraction structures of the second A intermediate diffraction element and the second B intermediate diffraction element are represented by $\Lambda_{mid2}$, and the periods of the diffraction structures of the third A intermediate diffraction element and the third B intermediate diffraction element are represented by $\Lambda_{mid3}$, $\Lambda_{mid1} < \Lambda_{mid2} < \Lambda_{mid3}$ is satisfied.

[17] The light guide element according to [15] or [16], in which each of the third A intermediate diffraction element and the third B intermediate diffraction element is any one of a volume hologram type diffraction element or a polarization diffraction element.

[18] The light guide element according to any one of [13] to [17], in which each of the third A incidence diffraction element, the third B incidence diffraction element, the third A emission diffraction element, and the third B emission diffraction element is any one of a volume hologram type diffraction element or a polarization diffraction element.

[19] The light guide element according to [17] or [18], in which the polarization diffraction element is a liquid crystal diffraction element including a liquid crystal layer that is formed of a composition including a liquid crystal compound and has a liquid crystal alignment pattern in which a direction of an optical axis derived from the liquid crystal compound changes while continuously rotating in at least one in-plane direction.

[20] The light guide element according to [19], in which the liquid crystal diffraction element includes a cholesteric liquid crystal layer obtained by immobilizing a cholesteric liquid crystalline phase.

[21] The light guide element according to [20], in which in at least either of the third A emission diffraction element and the second A emission diffraction element or the third B emission diffraction element and the second B emission diffraction element, helical twisted rotation directions of cholesteric liquid crystalline phases are different from each other.

[22] The light guide element according to [20] or [21], in which in a case where an in-plane retardation is measured from a direction tilted with respect to a normal direction and a normal line of a main surface of the liquid crystal diffraction element, a direction in which the in-plane retardation is minimum in any one of a slow axis plane or a fast axis plane is tilted from the normal direction.

[23] The light guide element according to any one of [20] to [22], in which in bright portions and dark portions derived from a liquid crystal phase in a cross-section of the liquid crystal layer observed with a scanning electron microscope, in a case where an interval between the bright portions or between the dark portions in a normal direction of lines formed by the bright portions or the dark portions is represented by a ½ pitch, pitches in the first A incidence diffraction element and the first B incidence diffraction element are represented by $P_{in1}$, pitches in the second A incidence diffraction element and the second B incidence diffraction element are represented by $P_{in2}$, pitches in the third A incidence diffraction element and the third B incidence diffraction element are represented by $P_{in3}$, pitches in the first A emission diffraction element and the first B emission diffraction element are represented by $P_{out2}$, pitches in the second A emission diffraction element and the second B emission diffraction element are represented by $P_{out2}$, and pitches of the diffraction structures of the third A emission diffraction element and the third B emission diffraction element are represented by $P_{out3}$, $P_{in1} < P_{in2} < P_{in3}$ and $P_{out1} < P_{out2} < P_{out3}$ are satisfied.

[24] An image display apparatus comprising:

the light guide element according to any one of [1] to [23]; and a display element that emits an image to the first A incidence diffraction element, the first B incidence diffraction element, the second A incidence diffraction element, and the second B incidence diffraction element of the light guide element.

[25] An image display apparatus comprising:

the light guide element according to any one of [13] to [23]; and a display element that emits an image to the first A incidence diffraction element, the first B incidence diffraction element, the second A incidence diffraction element, the second B incidence diffraction element, the third A incidence diffraction element, and the third B incidence diffraction element of the light guide element.

According to an aspect of the present invention, it is possible to provide: a light guide element in which the occurrence of multiple images can be suppressed and a wide viewing angle can be obtained; and an image display apparatus including this light guide element.

DESCRIPTION OF THE PREFERRED EMBODIMENTS

Figure 1:
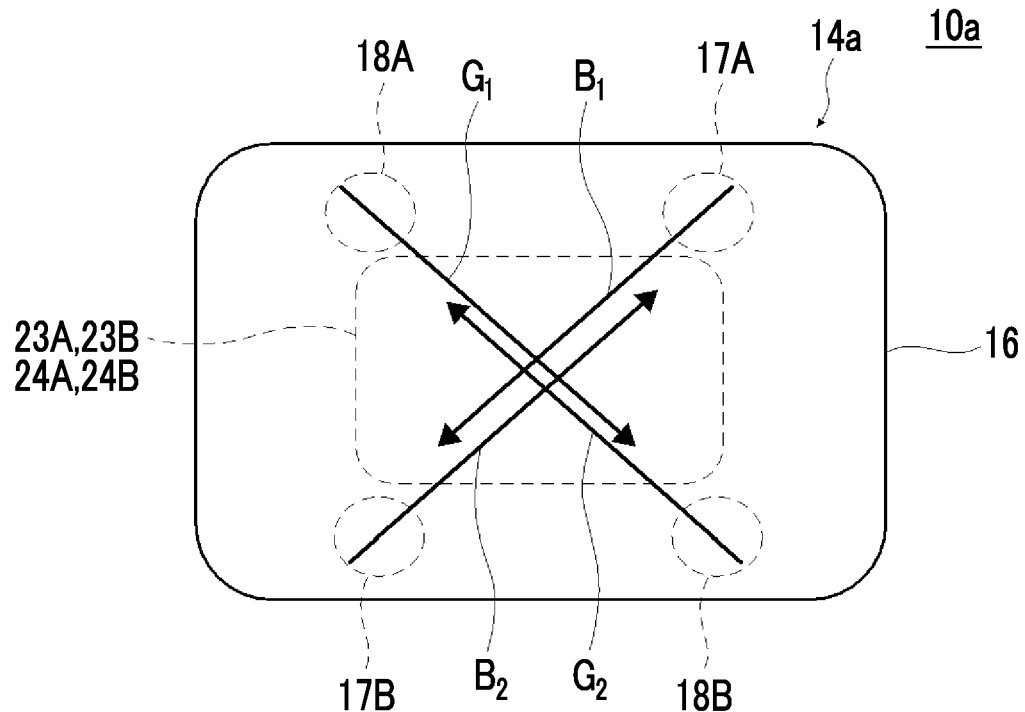
FIG. 1 is a front view conceptually showing an example of an image display apparatus including a light guide element according to the present invention.

Hereinafter, a light guide element and an image display apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

[Light Guide Element and Image Display Apparatus]

The light guide element according to the embodiment of the present invention comprises:

a light guide plate; and a first A incidence diffraction element, a first B incidence diffraction element, a second A incidence diffraction element, a second B incidence diffraction element, a first A emission diffraction element, a first B emission diffraction element, a second A emission diffraction element, and a second B emission diffraction element that are provided in the light guide plate, in which the first A incidence diffraction element, the first B incidence diffraction element, the first A emission diffraction element, and the first B emission diffraction element diffract light in the same wavelength range, the second A incidence diffraction element, the second B incidence diffraction element, the second A emission diffraction element, and the second B emission diffraction element diffract light in the same wavelength range, the first A incidence diffraction element and the second A incidence diffraction element diffract incident light in different directions to be incident into the light guide plate, the first B incidence diffraction element and the second B incidence diffraction element diffract incident light in different directions to be incident into the light guide plate, the first A emission diffraction element emits light that is diffracted by the first A incidence diffraction element and propagates in the light guide plate from the light guide plate, the first B emission diffraction element emits light that is diffracted by the first B incidence diffraction element and propagates in the light guide plate from the light guide plate, the second A emission diffraction element emits light that is diffracted by the second A incidence diffraction element and propagates in the light guide plate from the light guide plate, the second B emission diffraction element emits light that is diffracted by the second B incidence diffraction element and propagates in the light guide plate from the light guide plate, a period of a diffraction structure of the first A incidence diffraction element is different from periods of diffraction structures of the second A incidence diffraction element and the second B incidence diffraction element, a period of a diffraction structure of the first B incidence diffraction element is different from the periods of the diffraction structures of the second A incidence diffraction element and the second B incidence diffraction element, a period of a diffraction structure of the first A emission diffraction element is different from periods of diffraction structures of the second A emission diffraction element and the second B emission diffraction element, a period of a diffraction structure of the first B emission diffraction element is different from the periods of the diffraction structures of the second A emission diffraction element and the second B emission diffraction element, the first A emission diffraction element, the first B emission diffraction element, the second A emission diffraction element, and the second B emission diffraction element are disposed at overlapping positions in a plane direction of a main surface of the light guide plate, a periodic direction of the diffraction structure of the first A emission diffraction element intersects with a periodic direction of the diffraction structure of the second A emission diffraction element and a periodic direction of the diffraction structure of the second B emission diffraction element, and a periodic direction of the diffraction structure of the first B emission diffraction element intersects with the periodic direction of the diffraction structure of the second A emission diffraction element and the periodic direction of the diffraction structure of the second B emission diffraction element.

The image display apparatus according to the embodiment of the present invention comprises:

the above-described light guide element; and a display element that emits an image to the first incidence diffraction element and the second incidence diffraction element of the light guide element.

The image display apparatus according to the embodiment of the present invention displays images of two or more colors.

Figure 2:
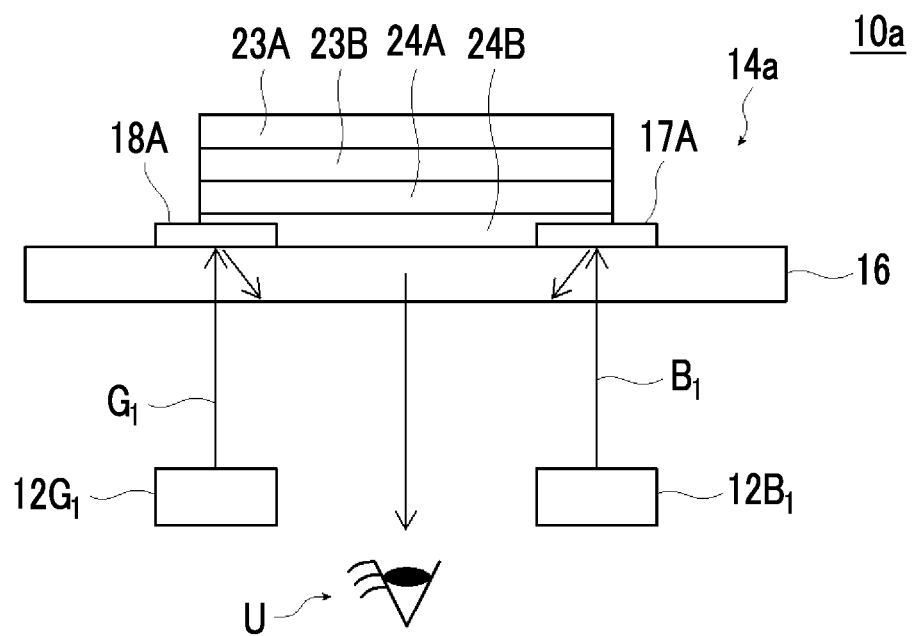
FIG. 2 is a top view conceptually showing the image display apparatus shown in FIG. 1.
Figure 3:
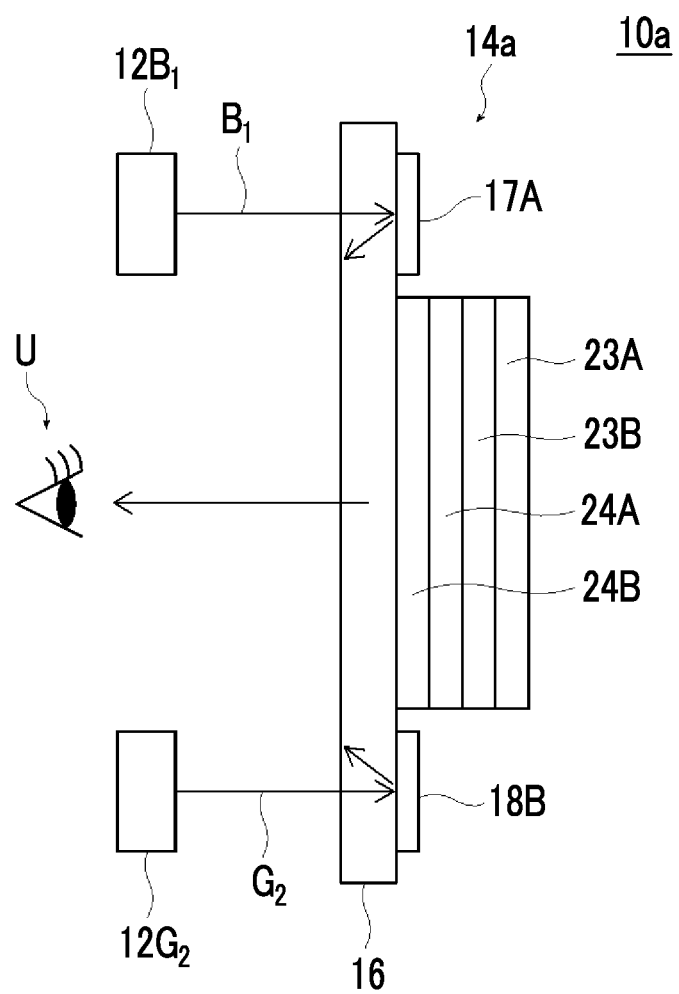
FIG. 3 is a side view conceptually showing the image display apparatus shown in FIG. 1.

FIGS. 1 to 3 conceptually shows an example of the image display apparatus according to the embodiment of the present invention including the light guide element according to the embodiment of the present invention. FIG. 1 is a front view showing an image display apparatus 10a in case of being seen from a surface on a viewing side by a user U. FIG. 2 is a top view showing the image display apparatus 10a in case of being seen from an upper direction on the paper plane of FIG. 1. FIG. 3 is a side view showing the image display apparatus 10a in case of being seen from the right side on the paper plane of FIG. 1.

The image display apparatus 10a shown in FIG. 1 is used as AR glasses as a preferable example. The light guide element according to the embodiment of the present invention can also be used not only as AR glasses but also as an optical element such as a transparent screen, a lighting device (including a backlight unit or the like of a liquid crystal display), or a sensor. In addition, the image display apparatus according to the embodiment of the present invention can also be used as an image display apparatus including the optical element.

The image display apparatus 10a shown in FIGS. 1 to 3 includes a plurality of display elements 12 and a light guide element 14a, and the light guide elements 14a includes: a light guide plate 16; and a first A incidence diffraction element 17A, a first B incidence diffraction element 17B, a second A incidence diffraction element 18A, a second B incidence diffraction element 18B, a first A emission diffraction element 23A, a first B emission diffraction element 23B, a second A emission diffraction element 24A, and a second B emission diffraction element 24B that are provided on the light guide plate 16. FIG. 1 does not show the display element 12.

For example, the image display apparatus 10a superimposes two color images of blue and green on each other and displays the superimposed images.

The image display apparatus 10a includes, as the display elements 12: a display element $12B_1$ and a display element $12B_2$ (not shown) that emit a blue image (image light); and a display element $12G_1$ and a display element $12G_2$ that emit a green image. That is, the display element $12B_1$ and the display element $12B_2$ emit light (image) in the same wavelength range, and the display element $12G_1$ and the display element $12G_2$ emit light (image) in the same wavelength range.

As shown in FIGS. 2 and 3, the display element $12B_1$ is disposed such that an emission surface thereof faces the first A incidence diffraction element 17A with the light guide plate 16 interposed therebetween to emit an image to the first A incidence diffraction element 17A. The display element $12B_2$ is disposed such that an emission surface thereof faces the first B incidence diffraction element 17B with the light guide plate 16 interposed therebetween to emit an image to the first B incidence diffraction element 17B. The display element $12G_1$ is disposed such that an emission surface thereof faces the second A incidence diffraction element 18A with the light guide plate 16 interposed therebetween to emit an image to the second A incidence diffraction element 18A. The display element $12G_2$ is disposed such that an emission surface thereof faces the second B incidence diffraction element 18B with the light guide plate 16 interposed therebetween to emit an image to the second B incidence diffraction element 18B.

As shown in FIGS. 1 to 3, in the light guide element 14a, the first A emission diffraction element 23A, the first B emission diffraction element 23B, the second A emission diffraction element 24A, and the second B emission diffraction element 24B are laminated and disposed at a center position of one main surface of the light guide plate 16. Hereinafter, the first A emission diffraction element 23A, the first B emission diffraction element 23B, the second A emission diffraction element 24A, and the second B emission diffraction element 24B will also be collectively referred to as "emission diffraction element".

In addition, in FIG. 1, the first A incidence diffraction element 17A is disposed on the upper right side of the emission diffraction element, the first B incidence diffraction element 17B is disposed on the lower left side of the emission diffraction element, the second A incidence diffraction element 18A is disposed on the upper left side of the emission diffraction element, and the second B incidence diffraction element 18B is disposed on the lower right side of the emission diffraction element.

As shown in FIG. 1, the emission diffraction element is disposed on a line obtained by connecting the first A incidence diffraction element 17A and the first B incidence diffraction element 17B, and the emission diffraction element is disposed on a line obtained by connecting the second A incidence diffraction element 18A and the second B incidence diffraction element 18B.

The first A incidence diffraction element 17A diffracts a blue image $B_1$ emitted from the display element $12B_1$ at an angle at which total reflection occurs in the light guide plate 16. The blue image $B_1$ diffracted by the first A incidence diffraction element 17A is guided in the light guide plate 16 to be incident into the first A emission diffraction element 23A, is diffracted by the first A emission diffraction element 23A, and is emitted from the light guide plate 16. That is, the first A emission diffraction element 23A diffracts the light that is diffracted by the first A incidence diffraction element 17A and propagates in the light guide plate 16, and emits the diffracted light from the light guide plate 16.

The first B incidence diffraction element 17B diffracts a blue image $B_2$ emitted from the display element $12B_2$ at an angle at which total reflection occurs in the light guide plate 16. The blue image $B_2$ diffracted by the first B incidence diffraction element 17B is guided in the light guide plate 16 to be incident into the first B emission diffraction element 23B, and is diffracted by the first B emission diffraction element 23B, and is emitted from the light guide plate 16. That is, the first B emission diffraction element 23B diffracts the light that is diffracted by the first B incidence diffraction element 17B and propagates in the light guide plate 16, and emits the diffracted light from the light guide plate 16.

The second A incidence diffraction element 18A diffracts a green image $G_1$ emitted from the display element $12G_1$ at an angle at which total reflection occurs in the light guide plate 16. The green image $G_1$ diffracted by the second A incidence diffraction element 18A is guided in the light guide plate 16 to be incident into the second A emission diffraction element 24A, is diffracted by the second A emission diffraction element 24A, and is emitted from the light guide plate 16. That is, the second A emission diffraction element 24A diffracts the light that is diffracted by the second A incidence diffraction element 18A and propagates in the light guide plate 16, and emits the diffracted light from the light guide plate 16.

The second B incidence diffraction element 18B diffracts a green image $G_2$ emitted from the display element $12G_2$ at an angle at which total reflection occurs in the light guide plate 16. The green image $G_2$ diffracted by the second B incidence diffraction element 18B is guided in the light guide plate 16 to be incident in the second B emission diffraction element 24B, is diffracted by the second B emission diffraction element 24B, and is emitted from the light guide plate 16. That is, the second B emission diffraction element 24B diffracts the light that is diffracted by the second B incidence diffraction element 18B and propagates in the light guide plate 16, and emits the diffracted light from the light guide plate 16.

The first A emission diffraction element 23A, the first B emission diffraction element 23B, the second A emission diffraction element 24A, and the second B emission diffraction element 24B are disposed to overlap each other in a plane direction of a main surface of the light guide plate 16. Therefore, the image that is diffracted and emitted by the first A emission diffraction element 23A, the first B emission diffraction element 23B, the second A emission diffraction element 24A, and the second B emission diffraction element 24B is emitted from the light guide plate 16 substantially in the same plane and is provided for observation by the user U. As a result, the blue image emitted from the display element $12B_1$ and the display element $12B_2$ and the green image emitted from the display element $12G_1$ and the display element $12G_2$ are superimposed on each other and are displayed to the user U as two color images.

The first A incidence diffraction element 17A, the first A emission diffraction element 23A, the first B incidence diffraction element 17B, and the first B emission diffraction element 23B diffract a blue image. That is, the first A incidence diffraction element 17A, the first A emission diffraction element 23A, the first B incidence diffraction element 17B, and the first B emission diffraction element 23B diffract light in the same wavelength range.

As shown in FIG. 1, the first A incidence diffraction element 17A and the first B incidence diffraction element 17B are disposed at different positions in the plane direction of the main surface of the light guide plate 16, and diffract incident light in different directions. Specifically, the first A incidence diffraction element 17A diffracts light in the lower left direction in FIG. 1, and the first B incidence diffraction element 17B diffracts light in the upper right direction in FIG. 1. In the example shown in FIG. 1, a traveling direction (direction of arrow $B_1$) of the light diffracted by the first A incidence diffraction element 17A and a traveling direction (direction of arrow $B_2$) of the light diffracted by the first B incidence diffraction element 17B are directions that are different by 180°. That is, the traveling direction of the light diffracted by the first A incidence diffraction element 17A and the traveling direction of the light diffracted by the first B incidence diffraction element 17B are opposite to each other in parallel.

Accordingly, in the image display apparatus 10a in the example shown in the drawing, the blue image emitted from the display element $12B_1$ and the display element $12B_2$ guided in the light guide plate 16 along two different systems, is diffracted by the emission diffraction elements laminated at the same positions, and is emitted from the light guide plate 16. The image display apparatus 10a superimposes the image $B_1$ and the image $B_2$ on each other and displays the superimposed images as one image. As a result, the viewing angle of the blue image can be increased.

In order to emit the light guided in the light guide plate from the light guide plate, it is necessary to set an incidence angle of light with respect to the normal line of an interface between the light guide plate and air to be less than a critical angle. Therefore, in a case where an image is guided in the light guide plate along one system, the visual field of the image to be emitted is limited by this critical angle.

On the other hand, by guiding light in the light guide plate 16 along two different systems, superimposing the images guided along the systems, and displaying the superimposed images as one image, the viewing angle can be widened.

The second A incidence diffraction element 18A, the second A emission diffraction element 24A, the second B incidence diffraction element 18B, and the second B emission diffraction element 24B diffract a green image. That is, the second A incidence diffraction element 18A, the second A emission diffraction element 24A, the second B incidence diffraction element 18B, and the second B emission diffraction element 24B diffract light in the same wavelength range.

As shown in FIG. 1, the second A incidence diffraction element 18A and the second B incidence diffraction element 18B are disposed at different positions in the plane direction of the main surface of the light guide plate 16, and diffract incident light in different directions. Specifically, the second A incidence diffraction element 18A diffracts light in the lower right direction in FIG. 1, and the second B incidence diffraction element 18B diffracts light in the upper left direction in FIG. 1. In the example shown in FIG. 1, a traveling direction (direction of arrow $G_1$) of the light diffracted by the second A incidence diffraction element 18A and a traveling direction (direction of arrow $G_2$) of the light diffracted by the second B incidence diffraction element 18B are directions that are different by 180°. That is, the traveling direction of the light diffracted by the second A incidence diffraction element 18A and the traveling direction of the light diffracted by the second B incidence diffraction element 18B are opposite to each other in parallel.

Accordingly, in the image display apparatus 10a in the example shown in the drawing, the green image emitted from the display element $12G_1$ and the display element $12G_2$ guided in the light guide plate 16 along two different systems, is diffracted by the emission diffraction elements laminated at the same positions, and is emitted from the light guide plate 16. The image display apparatus 10a superimposes the image $G_1$ and the image $G_2$ on each other and displays the superimposed images as one image. As a result, the viewing angle of the green image can be increased.

Here, assuming that the period of the diffraction structure is the same, the diffraction angle of the diffraction element varies depending on the wavelength of light. Accordingly, in order to diffract light components having different wavelengths at the same angle to emit the light components in the same direction, it is necessary to adjust the period of the diffraction structure of the diffraction element according to the wavelength of light to be diffracted. Accordingly, a period of a diffraction structure of the first A incidence diffraction element 17A is different from a period of a diffraction structure of the second A incidence diffraction element 18A and a period of a diffraction structure of the second B incidence diffraction element 18B, and a period of a diffraction structure of the first B incidence diffraction element 17B is different from the period of a diffraction structure of the second A incidence diffraction element 18A and the period of a diffraction structure of the second B incidence diffraction element 18B. In addition, a period of a diffraction structure of the first A emission diffraction element 23A is different from a period of a diffraction structure of the second A emission diffraction element 24A and a period of a diffraction structure of the second B emission diffraction element 24B, and a period of a diffraction structure of the first B emission diffraction element 23B is different from the period of the diffraction structure of the second A emission diffraction element 24A and the period of the diffraction structure of the second B emission diffraction element 24B.

The period of the diffraction structure of the first A incidence diffraction element 17A and the period of the diffraction structure of the first B incidence diffraction element 17B may be the same as or different from each other. In addition, the period of the diffraction structure of the second A incidence diffraction element 18A and the period of the diffraction structure of the second B incidence diffraction element 18B may be the same as or different from each other. In addition, the period of the diffraction structure of the first A emission diffraction element 23A and the period of the diffraction structure of the first B emission diffraction element 23B may be the same as or different from each other. In addition, the period of the diffraction structure of the second A emission diffraction element 24A and the period of the diffraction structure of the second B emission diffraction element 24B may be the same as or different from each other.

It is preferable that the period of the diffraction structure of the first A incidence diffraction element 17A and the period of the diffraction structure of the first B incidence diffraction element 17B are the same, and it is preferable that the period of the diffraction structure of the second A incidence diffraction element 18A and the period of the diffraction structure of the second B incidence diffraction element 18B are the same. In addition, it is preferable that the period of the diffraction structure of the first A emission diffraction element 23A and the period of the diffraction structure of the first B emission diffraction element 23B are the same, and it is preferable that the period of the diffraction structure of the second A emission diffraction element 24A and the period of the diffraction structure of the second B emission diffraction element 24B are the same.

Here, in the present invention, a periodic direction of the diffraction structure of the first A emission diffraction element 23A intersects with a periodic direction of the diffraction structure of the second A emission diffraction element 24A and a periodic direction of the diffraction structure of the second B emission diffraction element 24B. In addition, a periodic direction of the diffraction structure of the first B emission diffraction element 23B intersects with the periodic direction of the diffraction structure of the second A emission diffraction element 24A and the periodic direction of the diffraction structure of the second B emission diffraction element 24B.

This point will be described using FIGS. 4 and 5.

Figure 4:
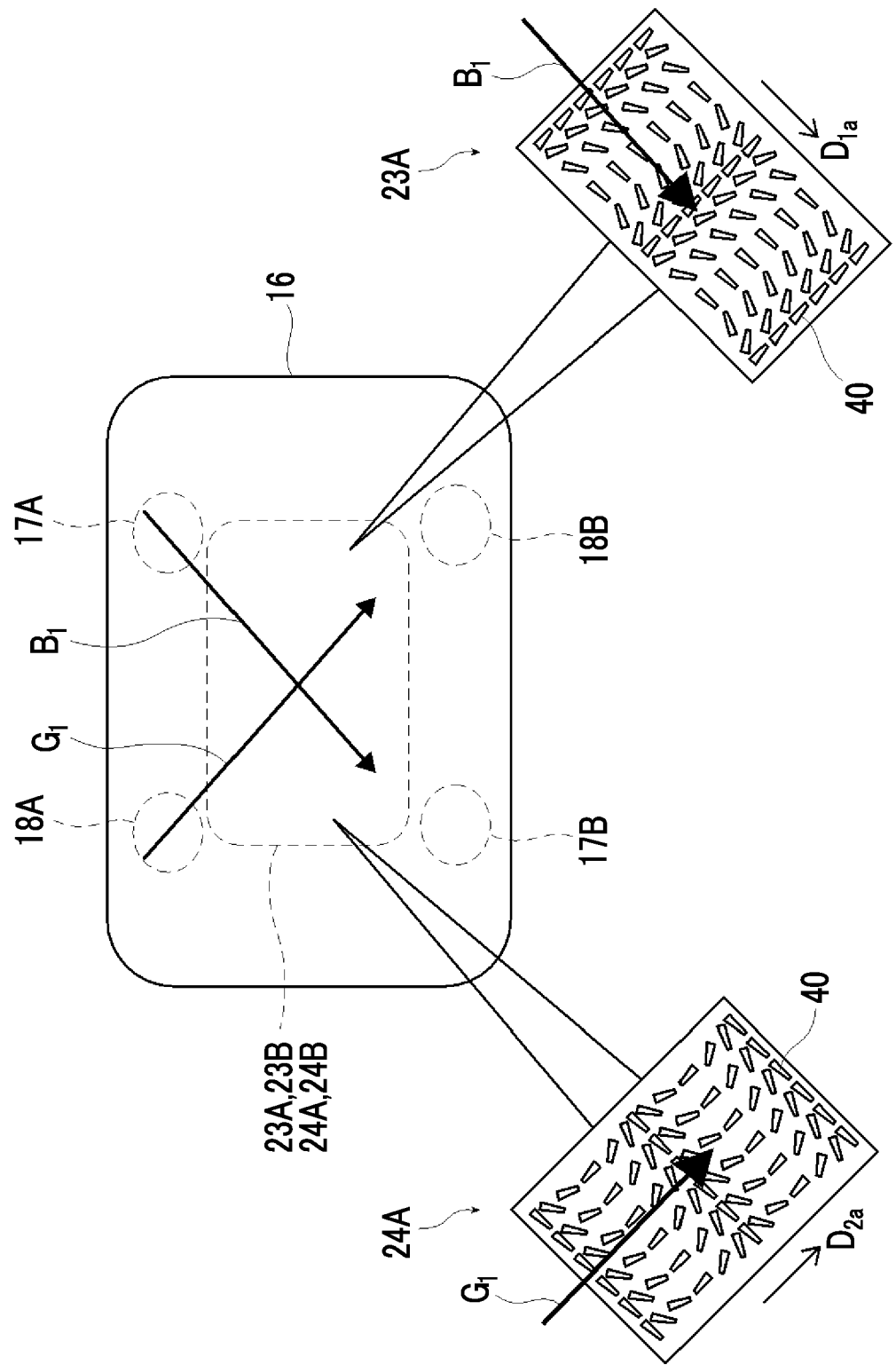
FIG. 4 is a conceptual diagram showing an action of the image display apparatus shown in FIG. 1.

FIG. 4 is a diagram schematically showing a relationship between the traveling direction of the blue image $B_1$ incident from the first A incidence diffraction element 17A and the diffraction structure of the first A emission diffraction element 23A that diffracts the blue image $B_1$ and emits the diffracted blue image $B_1$ from the light guide plate 16, and a relationship between the traveling direction of the green image $G_1$ incident from the second A incidence diffraction element 18A and the diffraction structure of the second A emission diffraction element 24A that diffracts the green image $G_1$ and emits the diffracted green image $G_1$ from the light guide plate 16. In addition, FIG. 5 is a diagram schematically showing a relationship between the traveling direction of the blue image $B_2$ incident from the first B incidence diffraction element 17B and the diffraction structure of the first B emission diffraction element 23B that diffracts the blue image $B_2$ and emits the diffracted blue image $B_2$ from the light guide plate 16, and a relationship between the traveling direction of the green image $G_2$ incident from the second B incidence diffraction element 18B and the diffraction structure of the second B emission diffraction element 24B that diffracts the green image $G_2$ and emits the diffracted green image $G_2$ from the light guide plate 16.

Figure 5:
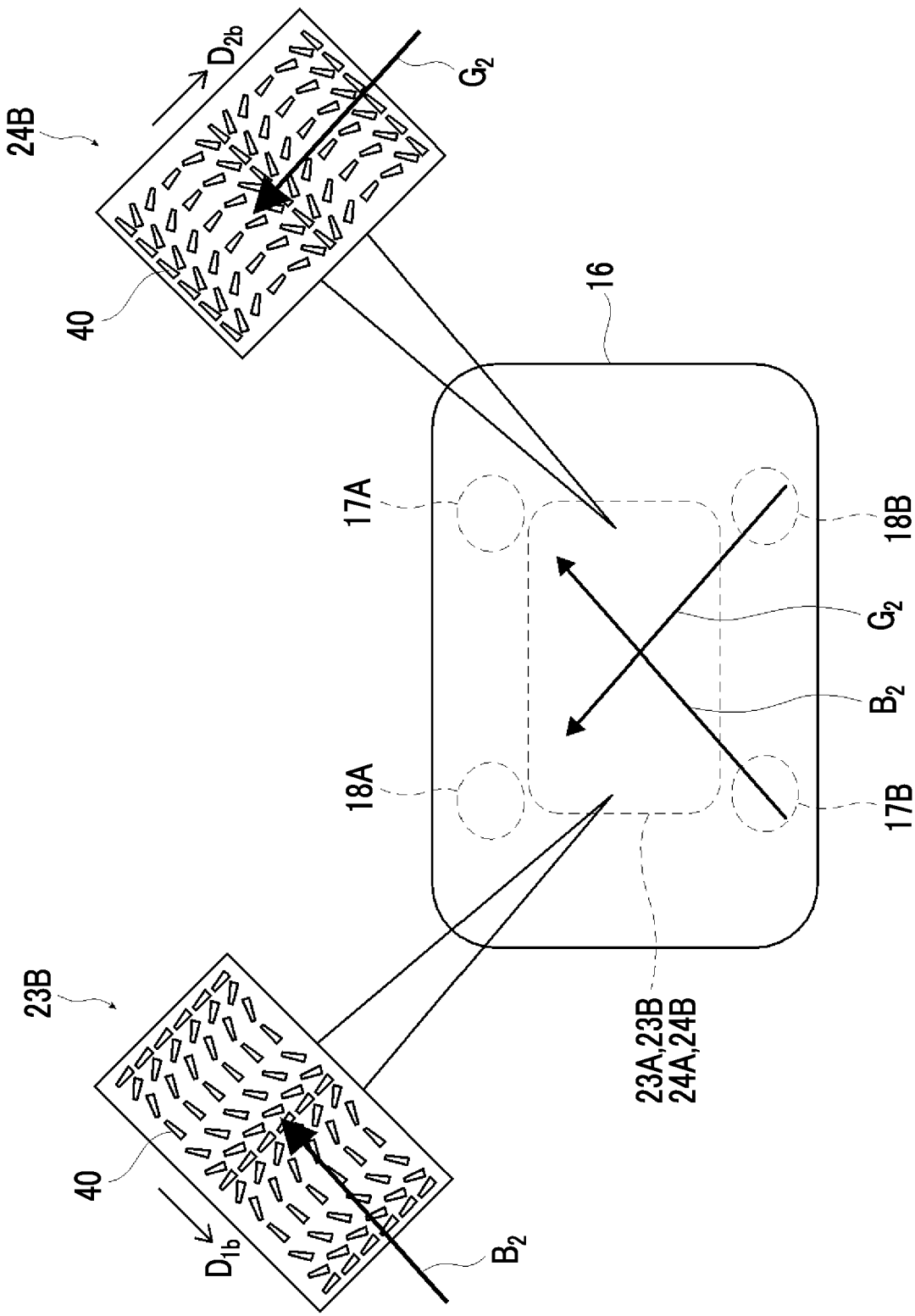
FIG. 5 is a conceptual diagram showing the action of the image display apparatus shown in FIG. 1.

FIGS. 4 and 5 shows a diffraction element including a liquid crystal layer as the emission diffraction element. Although described below in detail, the liquid crystal layer used as a diffraction element has a liquid crystal alignment pattern in which a direction of an optical axis derived from a liquid crystal compound changes while continuously rotating in at least one in-plane direction. In the liquid crystal layer, the direction (an arrangement axis $D_{1a}$ and an arrangement axis $D_{2a}$ in FIG. 4; an arrangement axis $D_{1b}$ and an arrangement axis $D_{2b}$ in FIG. 5) in which the direction of the optical axis derived from the liquid crystal compound changes while continuously rotating corresponds to the periodic direction of the diffraction structure.

As shown in FIG. 4, the first A incidence diffraction element 17A diffracts the incident blue image $B_1$ in the lower left direction. Accordingly, in order to diffract the blue image $B_1$ traveling in the lower left direction to the front direction (direction perpendicular to the main surface of the light guide plate 16), the first A emission diffraction element 23A is disposed such that a periodic direction of the diffraction structure (direction of the arrangement axis $D_{1a}$) is parallel to a traveling direction (traveling direction in the plane direction) of the blue image $B_1$ during incidence into the first A emission diffraction element 23A.

In addition, as shown in FIG. 4, the second A incidence diffraction element 18A diffracts the incident green image $G_1$ in the lower right direction. Accordingly, in order to diffract the green image $G_1$ traveling in the lower right direction to the front direction, the second A emission diffraction element 24A is disposed such that a periodic direction of the diffraction structure (direction of the arrangement axis $D_{2a}$) is parallel to a traveling direction of the green image $G_1$ during incidence into the second A emission diffraction element 24A.

In addition, as shown in FIG. 5, the first B incidence diffraction element 17B diffracts the incident blue image $B_2$ in the upper right direction. Accordingly, in order to diffract the blue image $B_2$ traveling in the upper right direction to the front direction, the first B emission diffraction element 23B is disposed such that a periodic direction of the diffraction structure (direction of the arrangement axis $D_{1b}$) is parallel to a traveling direction of the blue image $B_2$ during incidence into the first B emission diffraction element 23B.

In addition, as shown in FIG. 5, the second B incidence diffraction element 18B diffracts the incident green image $G_2$ in the upper left direction. Accordingly, in order to diffract the green image $G_2$ traveling in the upper left direction to the front direction, the second B emission diffraction element 24B is disposed such that a periodic direction of the diffraction structure (direction of the arrangement axis $D_{2b}$) is parallel to a traveling direction of the green image $G_2$ during incidence into the second B emission diffraction element 24B.

Accordingly, the periodic direction (direction of the arrangement axis $D_{1a}$) of the periodic structure of the first A emission diffraction element 23A, the periodic direction (direction of the arrangement axis $D_{2a}$) of the periodic structure of the second A emission diffraction element 24A, and the periodic direction (direction of the arrangement axis $D_{2b}$) of the periodic structure of the second B emission diffraction element 24B intersect with each other. In addition, the periodic direction (direction of the arrangement axis $D_{1b}$) of the periodic structure of the first B emission diffraction element 23B, the periodic direction (direction of the arrangement axis $D_{2a}$) of the periodic structure of the second A emission diffraction element 24A, and the periodic direction (direction of the arrangement axis $D_{2b}$) of the periodic structure of the second B emission diffraction element 24B intersect with each other.

In the example shown in the drawing, in a preferable aspect, the periodic direction (direction of the arrangement axis $D_{1a}$) of the periodic structure of the first A emission diffraction element 23A and the periodic direction (direction of the arrangement axis $D_{1b}$) of the periodic structure of the first B emission diffraction element 23B are parallel to each other, and the periodic direction (direction of the arrangement axis $D_{2a}$) of the periodic structure of the second A emission diffraction element 24A and the periodic direction (direction of the arrangement axis $D_{2b}$) of the periodic structure of the second B emission diffraction element 24B are parallel to each other.

Figure 28:
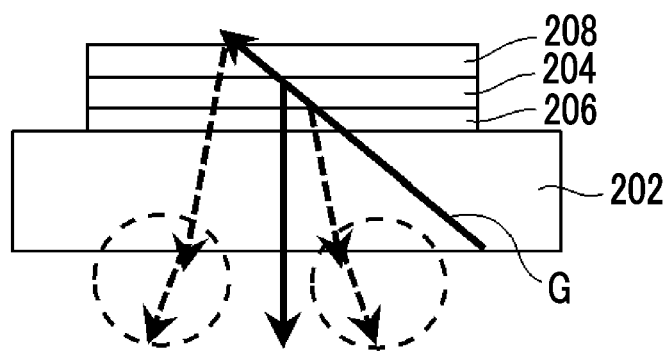
FIG. 28 is a diagram showing the occurrence of multiple images.

As described above, in the light guide element used for AR glasses or the like, for example, the three RGB images are emitted from the display, each of the light components is diffracted and guided into a light guide plate and is emitted from the light guide plate to an observation position of a user by a diffraction element such that such that the three color images overlap each other and are displayed. As a result, in a case where emission side diffraction elements corresponding to the respective RGB colors are disposed to overlap each other during the display of the color image, for example, as shown in FIG. 28, G light is diffracted by a G diffraction element 204 for diffracting G light, and a part of the G light is also diffracted by a R diffraction element 206 for diffracting R light and/or a B diffraction element 208 for diffracting B light. At this time, the G diffraction element 204, the R diffraction element 206, and the B diffraction element 208 are different from each other in the period of the diffraction structure. Therefore, the G light diffracted by the G diffraction element 204, the G light diffracted by the R diffraction element 206, and the G light diffracted by the B diffraction element 208 are diffracted at different angles. As a result, there is a problem in that multiple images are visually recognized.

On the other hand, in the light guide element according to the embodiment of the present invention, the periodic direction of the diffraction structure of the first A emission diffraction element 23A is disposed to intersect with the periodic direction of the diffraction structure of the second A emission diffraction element 24A and the periodic direction of the diffraction structure of the second B emission diffraction element 24B. In addition, the periodic direction of the diffraction structure of the first B emission diffraction element 23B is disposed to intersect with the periodic direction of the diffraction structure of the second A emission diffraction element 24A and the periodic direction of the diffraction structure of the second B emission diffraction element 24B. For example, light having a wavelength that is diffracted by the first A emission diffraction element 23A is incident into the diffraction structure of the second A emission diffraction element 24A and the diffraction structure of the second B emission diffraction element 24B from a direction in which diffraction is not likely to occur. Therefore, light having a wavelength that is diffracted by the first A emission diffraction element 23A can be suppressed from being diffracted by the second A emission diffraction element 24A and the second B emission diffraction element 24B, and the occurrence of multiple images can be suppressed. Likewise, light having a wavelength that is diffracted by the first B emission diffraction element 23B is incident into the diffraction structure of the second A emission diffraction element 24A and the diffraction structure of the second B emission diffraction element 24B from a direction in which diffraction is not likely to occur. Therefore, light having a wavelength that is diffracted by the first B emission diffraction element 23B can be suppressed from being diffracted by the second A emission diffraction element 24A and the second B emission diffraction element 24B, and the occurrence of multiple images can be suppressed. Likewise, light having a wavelength that is diffracted by the second A emission diffraction element 24A is incident into the diffraction structure of the first A emission diffraction element 23A and the diffraction structure of the first B emission diffraction element 23B from a direction in which diffraction is not likely to occur. Therefore, light having a wavelength that is diffracted by the second A emission diffraction element 24A can be suppressed from being diffracted by the first A emission diffraction element 23A and the first B emission diffraction element 23B, and the occurrence of multiple images can be suppressed. Likewise, light having a wavelength that is diffracted by the second B emission diffraction element 24B is incident into the diffraction structure of the first A emission diffraction element 23A and the diffraction structure of the first B emission diffraction element 23B from a direction in which diffraction is not likely to occur. Therefore, light having a wavelength that is diffracted by the second B emission diffraction element 24B can be suppressed from being diffracted by the first A emission diffraction element 23A and the first B emission diffraction element 23B, and the occurrence of multiple images can be suppressed.

With the above-described configuration, in the light guide element and the image display apparatus according to the embodiment of the present invention, the occurrence of multiple images can be suppressed while achieving a wide viewing angle.

In the example shown in the drawing, the image display apparatus displays two color images of blue and green. However, the present invention is not limited thereto, and two color images of other colors (wavelengths) may be adopted. For example, two color images of green and red may be adopted, and two color images of blue and red may be adopted.

Here, from the viewpoint of suitably suppressing the occurrence of multiple images, an angle (intersecting angle) between the periodic directions of the diffraction structures of the first A emission diffraction element 23A and the first B emission diffraction element 23B the periodic directions of the diffraction structures of the second A emission diffraction element 24A and the second B emission diffraction element 24B is preferably 40° to 140°, more preferably 60° to 120°, and still more preferably 80° to 100°. Regarding this point, the same can be applied to a configuration in which an intermediate diffraction element is provided and a configuration in which three or more color images are displayed.

Here, regarding the periodic direction of the diffraction structure of the emission diffraction element, in a case where the emission diffraction elements are disposed on the light guide plate and the light is incident from the normal direction of the emission diffraction elements, the periodic direction of the diffraction structure having a higher diffracted light intensity of the light diffracted in the light guide plate is set as a 0° periodic direction, and the periodic direction of the diffraction structure having a lower diffraction intensity is set as a 180° periodic direction. An angle between the periodic directions of the diffraction structures refers to an angle between a 0° periodic direction of the diffraction structure of the first A emission diffraction element 23A and a 0° periodic direction of the diffraction structure of the second B emission diffraction element 24B.

Although not shown in the drawing, the first A incidence diffraction element 17A, the first B incidence diffraction element 17B, the second A incidence diffraction element 18A, the second B incidence diffraction element 18B, the first A emission diffraction element 23A, the first B emission diffraction element 23B, the second A emission diffraction element 24A, and the second B emission diffraction element 24B are bonded to the light guide plate using a bonding layer.

In the present invention, as the bonding layer, any layer formed of one of various well-known materials can be used as long as it is a layer that can bond materials as bonding targets. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the layers using the bonding layers, each of the diffraction elements and the light guide plate 16 may be laminated and held by a frame, a jig, or the like to configure the light guide element according to the embodiment of the present invention.

Alternatively, each of the diffraction elements may be directly formed on the light guide plate 16.

Regarding a method of bonding to the light guide plate, the same can also be applied to a first A intermediate diffraction element 20A, a first B intermediate diffraction element 20B, a second A intermediate diffraction element 21A, a second B intermediate diffraction element 21B, a third A incidence diffraction element 19A, a third B incidence diffraction element 19B, a third A intermediate diffraction element 22A, a third B intermediate diffraction element 22B, a third A emission diffraction element 25A, and a third B emission diffraction element 25B described below.

In addition, from the viewpoint of diffracting light components having different wavelengths at the same angle to emit the light components in the same direction, assuming that a wavelength of light that is diffracted by the first A incidence diffraction element 17A, the first B incidence diffraction element 17B, the first A emission diffraction element 23A, and the first B emission diffraction element 23B is shorter than a wavelength of light that is diffracted by the second A incidence diffraction element 18A, the second B incidence diffraction element 18B, the second A emission diffraction element 24A, and the second B emission diffraction element 24B, in a case where the periods of the diffraction structures of the first A incidence diffraction element 17A and the first B incidence diffraction element 17B are represented by $\Lambda_{in1}$, the periods of the diffraction structures of the second A incidence diffraction element 18A and the second B incidence diffraction element 18B are represented by $\Lambda_{in2}$, the periods of the diffraction structures of the first A emission diffraction element 23A and the first B emission diffraction element 23B are represented by $\Lambda_{out1}$, and the periods of the diffraction structures of the second A emission diffraction element 24A and the second B emission diffraction element 24B are represented by $\Lambda_{out2}$, it is preferable that $\Lambda_{in1}<\Lambda_{in2}$ and $\Lambda_{out1}<\Lambda_{out2}$ are satisfied.

The periods of the diffraction structures of the first A incidence diffraction element 17A and the first B incidence diffraction element 17B, the periods of the diffraction structures of the second A incidence diffraction element 18A and the second B incidence diffraction element 18B, the periods of the diffraction structures of the first A emission diffraction element 23A and the first B emission diffraction element 23B, and the periods of the diffraction structures of the second A emission diffraction element 24A and the second B emission diffraction element 24B are not particularly limited and may be appropriately set depending on the positional relationship of each of the diffraction elements and the like.

The periods of the diffraction structures of the diffraction elements are preferably 0.1 µm to 10 µm, more preferably 0.1 µm to 1 µm, still more preferably 0.1 µm to 0.8 µm, and still more preferably a wavelength λ or less of incident light from the viewpoint of propagating light in the light guide plate 16 by total reflection.

Regarding this point, the same can also be applied to the periods of the diffraction structures of the first A intermediate diffraction element 20A, the first B intermediate diffraction element 20B, the second A intermediate diffraction element 21A, the second B intermediate diffraction element 21B, the third A incidence diffraction element 19A, the third B incidence diffraction element 19B, the third A intermediate diffraction element 22A, the third B intermediate diffraction element 22B, the third A emission diffraction element 25A, and the third B emission diffraction element 25B described below.

In the examples shown in FIGS. 1 to 3, the configuration in which the light guide element includes the incidence diffraction elements and the emission diffraction elements is adopted. However, a configuration in which the light guide element further includes an intermediate diffraction element may be adopted.

In the configuration in which the light guide element includes the intermediate diffraction element, in a case where light is diffracted by the intermediate diffraction element, a part of the light is diffracted at a plurality of positions of the diffraction element such that exit pupil can be expanded.

Figure 6:
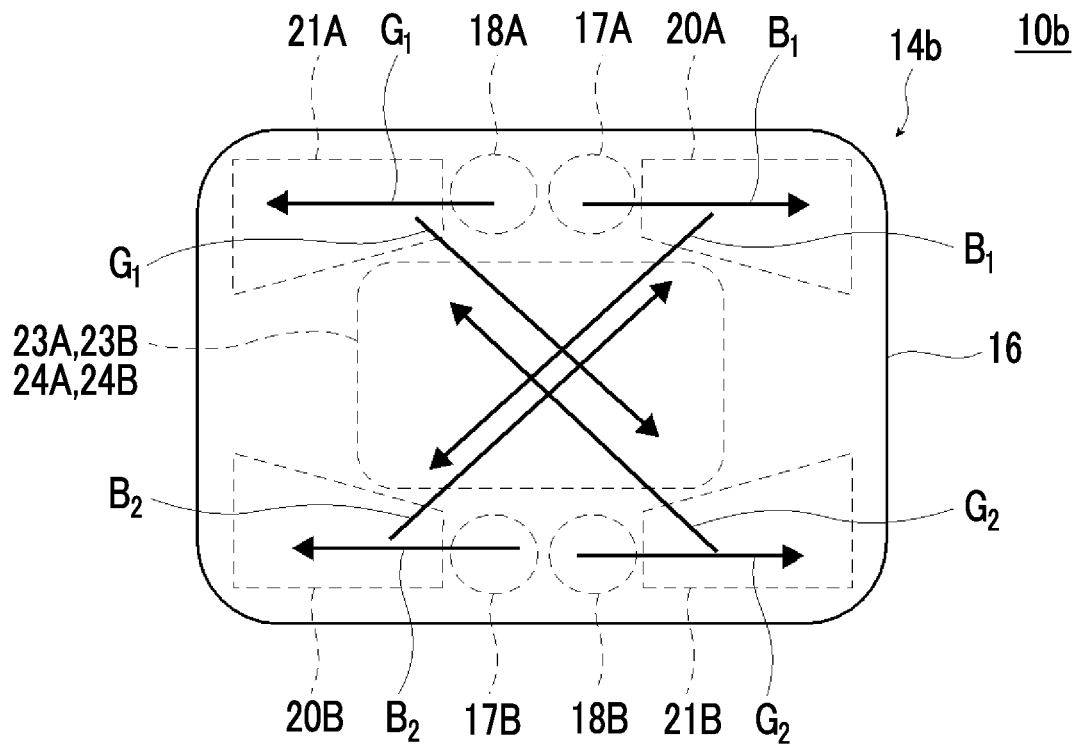
FIG. 6 is a front view conceptually showing an example of an image display apparatus including another example of the light guide element according to the present invention.
Figure 7:
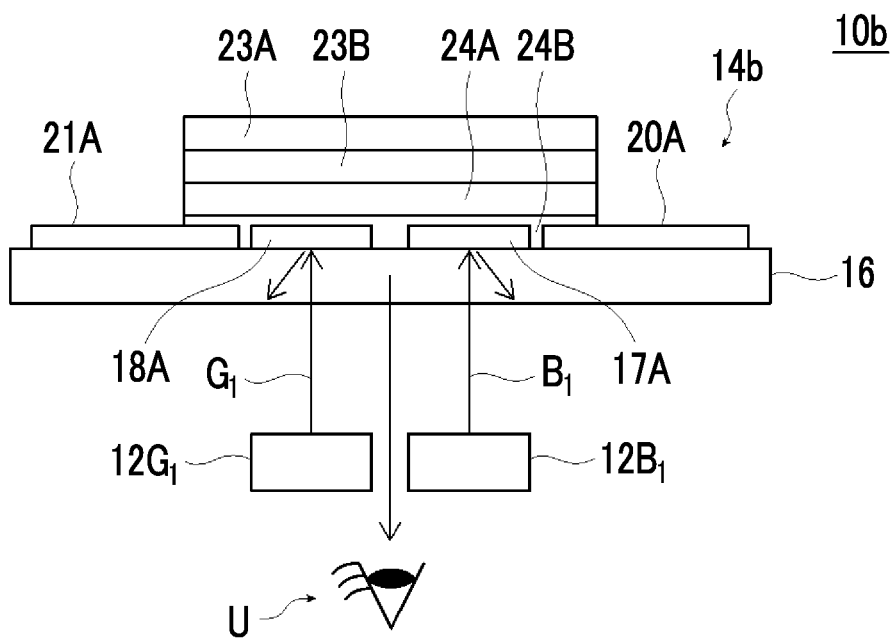
FIG. 7 is a top view conceptually showing the image display apparatus shown in FIG. 6.
Figure 8:
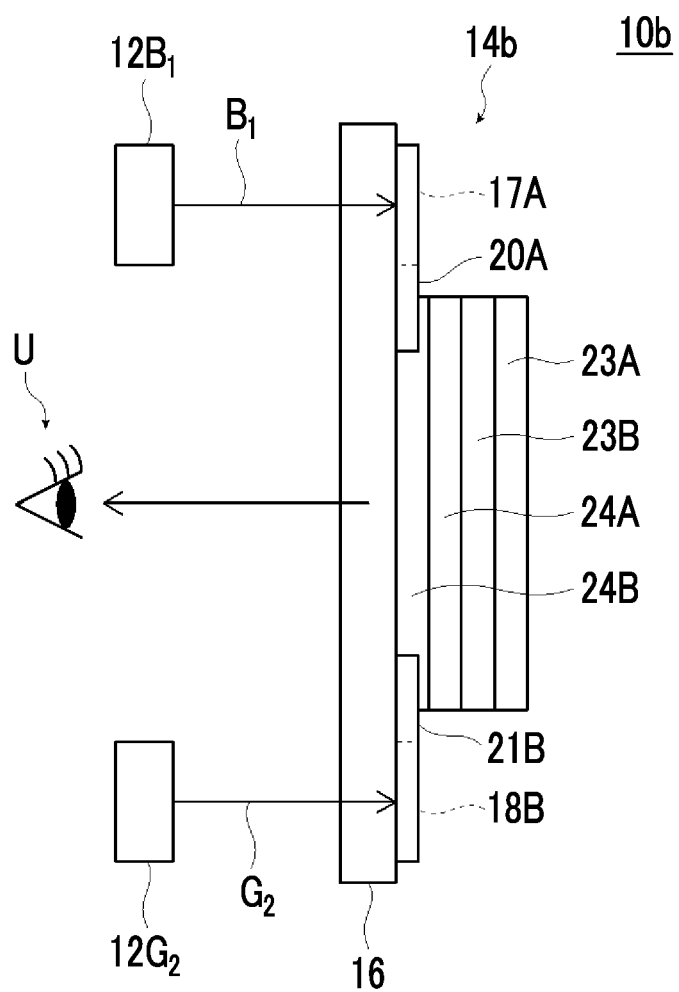
FIG. 8 is a side view conceptually showing the image display apparatus shown in FIG. 6.

FIGS. 6 to 8 conceptually show an image display apparatus including another example of the light guide element according to the embodiment of the present invention. FIG. 6 is a front view showing an image display apparatus 10b in case of being seen from a surface on a viewing side by the user U. FIG. 7 is a top view showing the image display apparatus 10b in case of being seen from an upper direction on the paper plane of FIG. 6. FIG. 8 is a side view showing the image display apparatus 10b in case of being seen from the right side on the paper plane of FIG. 6.

The image display apparatus 10b shown in FIGS. 6 to 8 includes the plurality of display elements 12 and a light guide element 14b, and the light guide elements 14b includes: the light guide plate 16; and the first A incidence diffraction element 17A, the first B incidence diffraction element 17B, the second A incidence diffraction element 18A, the second B incidence diffraction element 18B, the first A intermediate diffraction element 20A, the first B intermediate diffraction element 20B, the second A intermediate diffraction element 21A, the second B intermediate diffraction element 21B, the first A emission diffraction element 23A, the first B emission diffraction element 23B, the second A emission diffraction element 24A, and the second B emission diffraction element 24B that are provided on the light guide plate 16. FIG. 6 does not show the display element 12.

For example, the image display apparatus 10b superimposes two color images of blue and green on each other and displays the superimposed images.

The image display apparatus 10b shown in FIGS. 6 to 8 has the same configuration as that of the image display apparatus 10a shown in FIGS. 1 to 3, except that it includes the first A intermediate diffraction element 20A, the first B intermediate diffraction element 20B, the second A intermediate diffraction element 21A, and the second B intermediate diffraction element 21B. Therefore, the same portions are represented by the same reference numerals, and different points will be mainly described below.

As shown in FIGS. 6 to 8, in the light guide element 14b, the first A emission diffraction element 23A, the first B emission diffraction element 23B, the second A emission diffraction element 24A, and the second B emission diffraction element 24B are laminated and disposed at a center position of one main surface of the light guide plate 16.

In addition, in FIG. 6, at the upper center of the emission diffraction element, the first A incidence diffraction element 17A is disposed on the right side, and the second A incidence diffraction element 18A is disposed on the left side. In addition, at the lower center of the emission diffraction element, the first B incidence diffraction element 17B is disposed on the left side, and the second B incidence diffraction element 18B is disposed on the right side.

Further, the first A intermediate diffraction element 20A is disposed on the right side of the first A incidence diffraction element 17A, and the second A intermediate diffraction element 21A is disposed on the left side of the second A incidence diffraction element 18A. In addition, the first B intermediate diffraction element 20B is disposed on the left side of the first B incidence diffraction element 17B, and the second B intermediate diffraction element 21B is disposed on the left side of the second B incidence diffraction element 18B.

As shown in FIG. 6, the emission diffraction element is disposed on a line obtained by connecting the first A intermediate diffraction element 20A and the first B intermediate diffraction element 20B, and the emission diffraction element is disposed on a line obtained by connecting the second A intermediate diffraction element 21A and the second B intermediate diffraction element 21B.

In addition, as shown in FIGS. 7 and 8, the display element $12B_1$ is disposed to face the first A incidence diffraction element 17A with the light guide plate 16 interposed therebetween. The display element $12B_2$ is disposed to face the first B incidence diffraction element 17B with the light guide plate 16 interposed therebetween. The display element $12G_1$ is disposed to face the second A incidence diffraction element 18A with the light guide plate 16 interposed therebetween. The display element $12G_2$ is disposed to face the second B incidence diffraction element 18B with the light guide plate 16 interposed therebetween.

The first A incidence diffraction element 17A is disposed in a state where the direction of the periodic direction of the diffraction structure is adjusted such that the blue image $B_1$ emitted from the display element $12B_1$ is diffracted to the first A intermediate diffraction element 20A side (the right direction in FIG. 6).

The second A incidence diffraction element 18A is disposed in a state where the direction of the periodic direction of the diffraction structure is adjusted such that the green image $G_1$ emitted from the display element $12G_1$ is diffracted to the second A intermediate diffraction element 21A side (the left direction in FIG. 6).

The first B incidence diffraction element 17B is disposed in a state where the direction of the periodic direction of the diffraction structure is adjusted such that the blue image $B_2$ emitted from the display element $12B_2$ is diffracted to the first B intermediate diffraction element 20B side (the left direction in FIG. 6).

The second B incidence diffraction element 18B is disposed in a state where the direction of the periodic direction of the diffraction structure is adjusted such that the green image $G_2$ emitted from the display element $12G_2$ is diffracted to the second B intermediate diffraction element 21B side (the right direction in FIG. 6).

The first A intermediate diffraction element 20A diffracts light that is diffracted by the first A incidence diffraction element 17A and propagates in the light guide plate 16 to the first A emission diffraction element 23A. That is, the first A intermediate diffraction element 20A diffracts light having the same wavelength as that of the light diffracted by the first A incidence diffraction element 17A and the first A emission diffraction element 23A.

The first B intermediate diffraction element 20B diffracts light that is diffracted by the first B incidence diffraction element 17B and propagates in the light guide plate 16 to the first B emission diffraction element 23B. That is, the first B intermediate diffraction element 20B diffracts light having the same wavelength as that of the light diffracted by the first B incidence diffraction element 17B and the first B emission diffraction element 23B.

The second A intermediate diffraction element 21A diffracts light that is diffracted by the second A incidence diffraction element 18A and propagates in the light guide plate 16 to the second A emission diffraction element 24A. That is, the second A intermediate diffraction element 21A diffracts light having the same wavelength as that of the light diffracted by the second A incidence diffraction element 18A and the second A emission diffraction element 24A.

The second B intermediate diffraction element 21B diffracts light that is diffracted by the second B incidence diffraction element 18B and propagates in the light guide plate 16 to the second B emission diffraction element 24B. That is, the second B intermediate diffraction element 21B diffracts light having the same wavelength as that of the light diffracted by the second B incidence diffraction element 18B and the second B emission diffraction element 24B.

In a case where the blue image $B_1$ is emitted from the display element $12B_1$, the first A incidence diffraction element 17A diffracts the blue image $B_1$ to the direction of the first A intermediate diffraction element 20A at an angle at which total reflection occurs in the light guide plate 16. The blue image $B_1$ diffracted by the first A incidence diffraction element 17A is guided in the light guide plate 16 to be incident into the first A intermediate diffraction element 20A. The first A intermediate diffraction element 20A diffracts the incident blue image $B_1$ such that the traveling direction of the blue image $B_1$ is directed to the first A emission diffraction element 23A. In the example shown in FIG. 6, the first A intermediate diffraction element 20A diffracts the incident blue image $B_1$ in the lower left direction in FIG. 6. The blue image $B_1$ diffracted by the first A intermediate diffraction element 20A is totally reflected and propagates in the light guide plate 16 to be incident into the first A emission diffraction element 23A. The first A emission diffraction element 23A diffracts the incident blue image $B_1$ to deviate from the angle at which total reflection occurs in the light guide plate 16. As shown in FIGS. 6 to 8, the first A emission diffraction element 23A diffracts the incident blue image $B_1$ in a direction substantially perpendicular to the main surface of the light guide plate 16. The blue image $B_1$ diffracted by the first A emission diffraction element 23A is emitted from the light guide plate 16 to the user U.

In a case where the blue image $B_2$ is emitted from the display element $12B_2$, the first B incidence diffraction element 17B diffracts the blue image $B_2$ to the direction of the first B intermediate diffraction element 20B at an angle at which total reflection occurs in the light guide plate 16. The blue image $B_2$ diffracted by the first B incidence diffraction element 17B is guided in the light guide plate 16 to be incident into the first B intermediate diffraction element 20B. The first B intermediate diffraction element 20B diffracts the incident blue image $B_2$ such that the traveling direction of the blue image $B_2$ is directed to the first B emission diffraction element 23B. In the example shown in FIG. 6, the first B intermediate diffraction element 20B diffracts the incident blue image $B_2$ in the upper right direction in FIG. 6. The blue image $B_2$ diffracted by the first B intermediate diffraction element 20B is totally reflected and propagates in the light guide plate 16 to be incident into the first B emission diffraction element 23B. The first B emission diffraction element 23B diffracts the incident blue image $B_2$ to deviate from the angle at which total reflection occurs in the light guide plate 16. As shown in FIGS. 6 to 8, the first B emission diffraction element 23B diffracts the incident blue image $B_2$ in the direction substantially perpendicular to the main surface of the light guide plate 16. The blue image $B_2$ diffracted by the first B emission diffraction element 23B is emitted from the light guide plate 16 to the user U.

In a case where the green image $G_1$ is emitted from the display element $12G_1$, the second A incidence diffraction element 18A diffracts the green image $G_1$ to the direction of the second A intermediate diffraction element 21A at an angle at which total reflection occurs in the light guide plate 16. The green image $G_1$ diffracted by the second A incidence diffraction element 18A is guided in the light guide plate 16 to be incident into the second A intermediate diffraction element 21A. The second A intermediate diffraction element 21A diffracts the incident green image $G_1$ such that the traveling direction of the green image $G_1$ is directed to the second A emission diffraction element 24A. In the example shown in FIG. 6, the second A intermediate diffraction element 21A diffracts the incident green image $G_1$ in the lower right direction in FIG. 6. The green image $G_1$ diffracted by the second A intermediate diffraction element 21A is totally reflected and propagates in the light guide plate 16 to be incident into the second A emission diffraction element 24A. The second A emission diffraction element 24A diffracts the incident green image $G_1$ to deviate from the angle at which total reflection occurs in the light guide plate 16. As shown in FIGS. 6 to 8, the second A emission diffraction element 24A diffracts the incident green image $G_1$ in a direction substantially perpendicular to the main surface of the light guide plate 16. The green image $G_1$ diffracted by the second A emission diffraction element 24A is emitted from the light guide plate 16 to the user U.

In a case where the green image $G_2$ is emitted from the display element $12G_2$, the second B incidence diffraction element 18B diffracts the green image $G_2$ to the direction of the second B intermediate diffraction element 21B at an angle at which total reflection occurs in the light guide plate 16. The green image $G_2$ diffracted by the second B incidence diffraction element 18B is guided in the light guide plate 16 to be incident into the second B intermediate diffraction element 21B. The second B intermediate diffraction element 21B diffracts the incident green image $G_2$ such that the traveling direction of the green image $G_2$ is directed to the second B emission diffraction element 24B. In the example shown in FIG. 6, the second B intermediate diffraction element 21B diffracts the incident green image $G_2$ in the upper left direction in FIG. 6. The green image $G_2$ diffracted by the second B intermediate diffraction element 21B is totally reflected and propagates in the light guide plate 16 to be incident into the second B emission diffraction element 24B. The second B emission diffraction element 24B diffracts the incident green image $G_2$ to deviate from the angle at which total reflection occurs in the light guide plate 16. As shown in FIGS. 6 to 8, the second B emission diffraction element 24B diffracts the incident green image $G_2$ in a direction substantially perpendicular to the main surface of the light guide plate 16. The green image $G_2$ diffracted by the second B emission diffraction element 24B is emitted from the light guide plate 16 to the user U.

The first A emission diffraction element 23A, the first B emission diffraction element 23B, the second A emission diffraction element 24A, and the second B emission diffraction element 24B are disposed to overlap each other in a plane direction of a main surface of the light guide plate 16. Therefore, the image that is diffracted and emitted by the first A emission diffraction element 23A, the first B emission diffraction element 23B, the second A emission diffraction element 24A, and the second B emission diffraction element 24B is emitted from the light guide plate 16 substantially in the same plane and is provided for observation by the user U. As a result, the blue image emitted from the display element $12B_1$ and the display element $12B_2$ and the green image emitted from the display element $12G_1$ and the display element $12G_2$ are superimposed on each other and are displayed to the user U as two color images.

The first A incidence diffraction element 17A, the first A intermediate diffraction element 20A, the first A emission diffraction element 23A, the first B incidence diffraction element 17B, the first B intermediate diffraction element 20B, and the first B emission diffraction element 23B diffract a blue image. That is, the first A incidence diffraction element 17A, the first A intermediate diffraction element 20A, the first A emission diffraction element 23A, the first B incidence diffraction element 17B, the first B intermediate diffraction element 20B, and the first B emission diffraction element 23B diffract light in the same wavelength range.

As shown in FIG. 6, a traveling direction of the light diffracted by the first A incidence diffraction element 17A and the first A intermediate diffraction element 20A during incidence into the first A emission diffraction element 23A and a traveling direction of the light diffracted by the first B incidence diffraction element 17B and the first B intermediate diffraction element 20B during incidence into the first B emission diffraction element 23B are different by 180° (are opposite to each other in parallel).

Accordingly, in the image display apparatus 10b in the example shown in the drawing, the blue image emitted from the display element 12$B_1$ and the display element 12$B_2$ guided in the light guide plate 16 along two different systems, is diffracted by the emission diffraction elements laminated at the same positions, and is emitted from the light guide plate 16. The image display apparatus 10b superimposes the image $B_1$ and the image $B_2$ on each other and displays the superimposed images as one image. As a result, the viewing angle of the blue image can be increased.

The second A incidence diffraction element 18A, the second A intermediate diffraction element 21A, the second A emission diffraction element 24A, the second B incidence diffraction element 18B, the second B intermediate diffraction element 21B, and the second B emission diffraction element 24B diffract a green image. That is, the second A incidence diffraction element 18A, the second A intermediate diffraction element 21A, the second A emission diffraction element 24A, the second B incidence diffraction element 18B, the second B intermediate diffraction element 21B, and the second B emission diffraction element 24B diffract light in the same wavelength range.

As shown in FIG. 6, a traveling direction of the light diffracted by the second A incidence diffraction element 18A and the second A intermediate diffraction element 21A during incidence into the second A emission diffraction element 24A and a traveling direction of the light diffracted by the second B incidence diffraction element 18B and the second B intermediate diffraction element 21B during incidence into the second B emission diffraction element 24B are different by 180° (are opposite to each other in parallel).

Accordingly, in the image display apparatus 10b in the example shown in the drawing, the green image emitted from the display element 12$G_1$ and the display element 12$G_2$ guided in the light guide plate 16 along two different systems, is diffracted by the emission diffraction elements laminated at the same positions, and is emitted from the light guide plate 16. The image display apparatus 10b superimposes the image $G_1$ and the image $G_2$ on each other and displays the superimposed images as one image. As a result, the viewing angle of the green image can be increased.

In addition, wavelengths of light to be diffracted by the first A intermediate diffraction element 20A and the first B intermediate diffraction element 20B are different from wavelengths of light to be diffracted by the second A intermediate diffraction element 21A and the second B intermediate diffraction element 21B. Therefore, the periods of the diffraction structures of the first A intermediate diffraction element 20A and the first B intermediate diffraction element 20B are different from the periods of the diffraction structures of the second A intermediate diffraction element 21A and the second B intermediate diffraction element 21B.

Here, in the image display apparatus 10b (light guide element 14b), the periodic direction of the diffraction structure of the first A emission diffraction element 23A intersects with the periodic direction of the diffraction structure of the second A emission diffraction element 24A and the periodic direction of the diffraction structure of the second B emission diffraction element 24B. In addition, the periodic direction of the diffraction structure of the first B emission diffraction element 23B intersects with the periodic direction of the diffraction structure of the second A emission diffraction element 24A and the periodic direction of the diffraction structure of the second B emission diffraction element 24B.

This point will be described using FIGS. 9 and 10.

Figure 9:
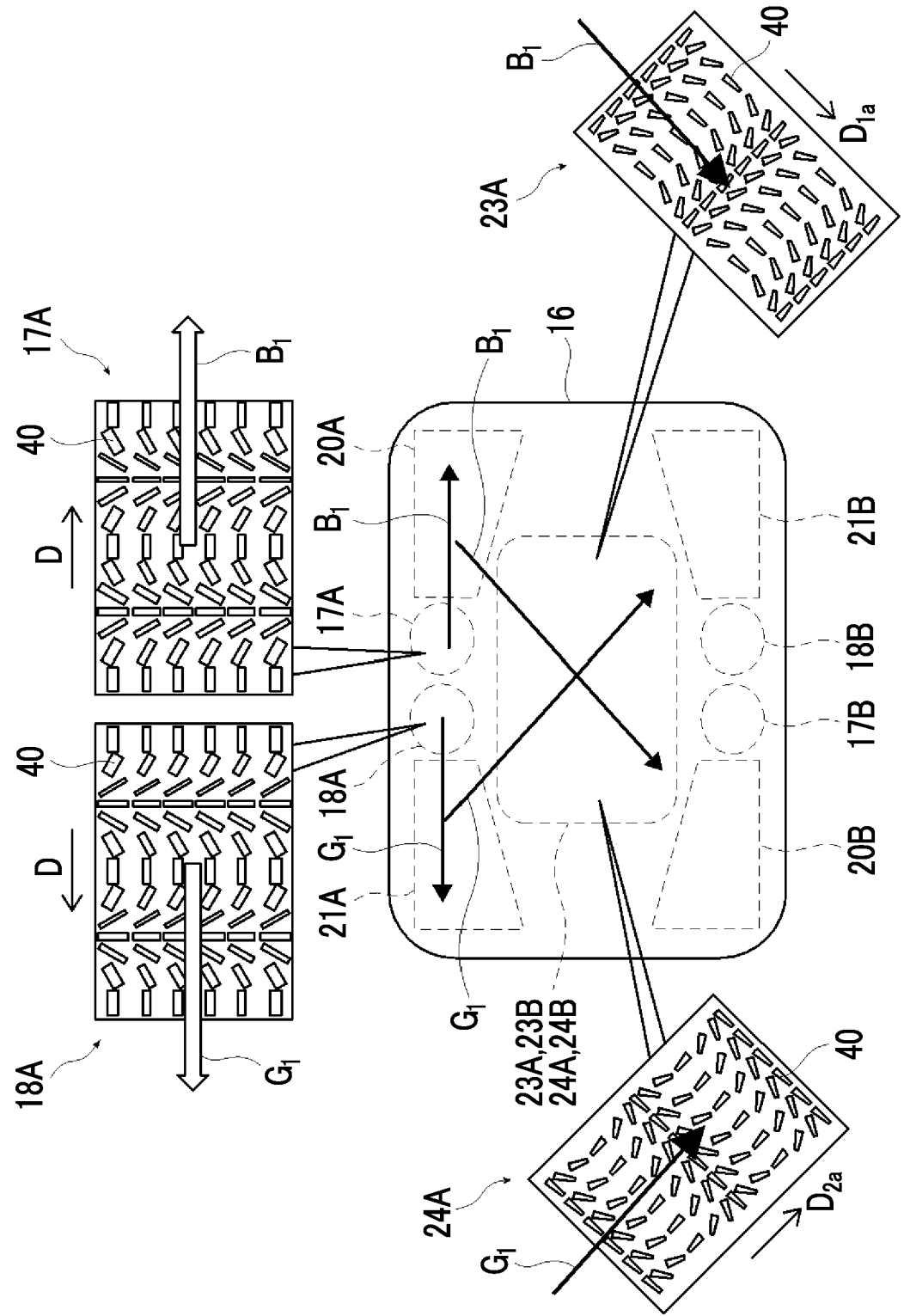
FIG. 9 is a conceptual diagram showing an action of the image display apparatus shown in FIG. 6.

FIG. 9 is a diagram schematically showing a relationship between the traveling direction of the blue image $B_1$ incident from the first A incidence diffraction element 17A and diffracted by the first A intermediate diffraction element 20A and the diffraction structure of the first A emission diffraction element 23A that diffracts the blue image $B_1$ and emits the diffracted blue image $B_1$ from the light guide plate 16, and a relationship between the traveling direction of the green image $G_1$ incident from the second A incidence diffraction element 18A and diffracted by the second A intermediate diffraction element 21A and the diffraction structure of the second A emission diffraction element 24A that diffracts the green image $G_1$ and emits the diffracted green image $G_1$ from the light guide plate 16. In addition, FIG. 10 is a diagram schematically showing a relationship between the traveling direction of the blue image $B_2$ incident from the first B incidence diffraction element 17B diffracted by the first B intermediate diffraction element 20B and the diffraction structure of the first B emission diffraction element 23B that diffracts the blue image $B_2$ and emits the diffracted blue image $B_2$ from the light guide plate 16, and a relationship between the traveling direction of the green image $G_2$ incident from the second B incidence diffraction element 18B and diffracted by the second B intermediate diffraction element 21B and the diffraction structure of the second B emission diffraction element 24B that diffracts the green image $G_2$ and emits the diffracted green image $G_2$ from the light guide plate 16.

Figure 10:
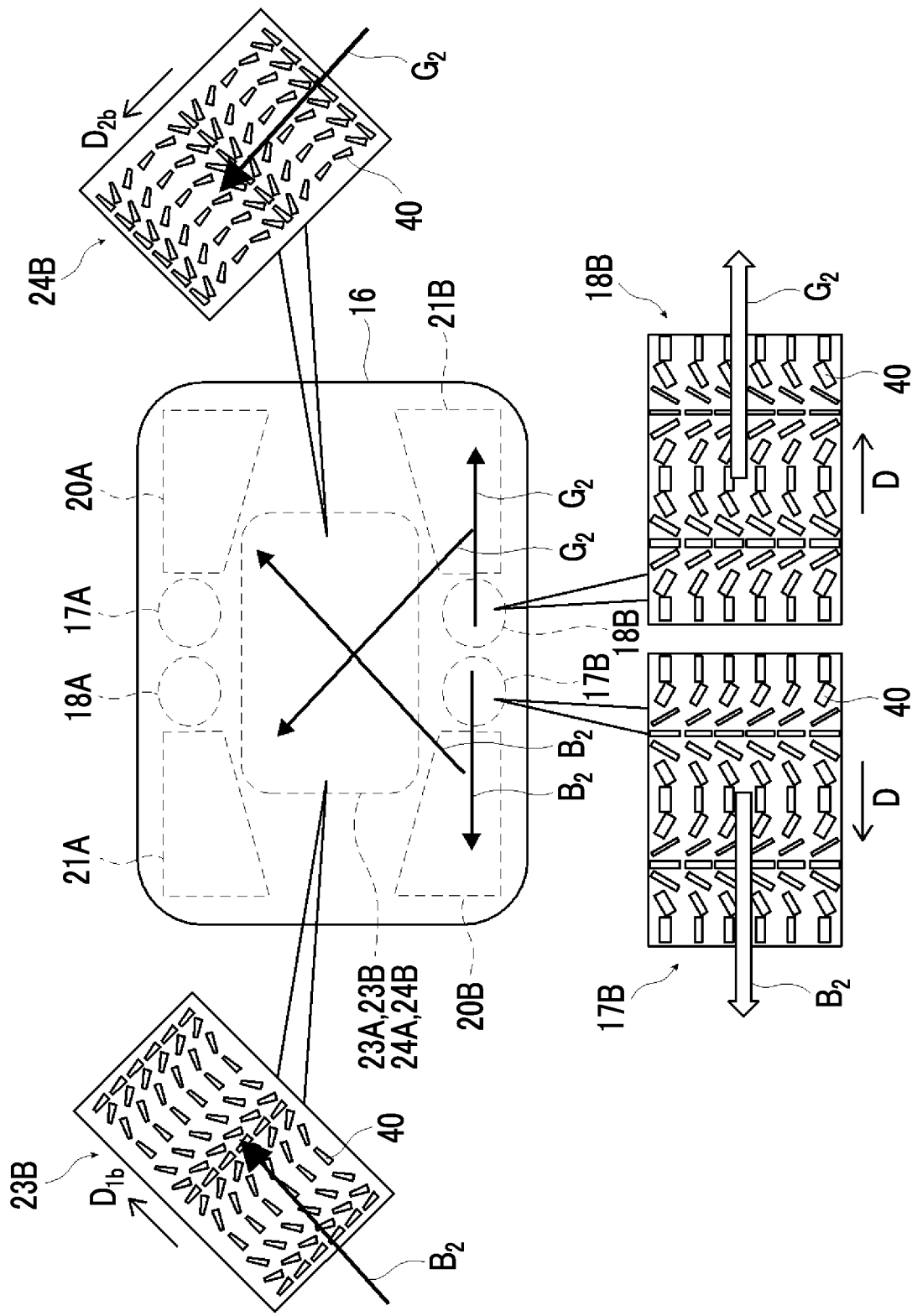
FIG. 10 is a conceptual diagram showing the action of the image display apparatus shown in FIG. 6.

FIGS. 9 and 10 show a diffraction element including a liquid crystal layer as the emission diffraction element as in FIGS. 4 and 5.

As shown in FIG. 9, the first A incidence diffraction element 17A diffracts the incident blue image $B_1$ in the right direction to be incident into the first A intermediate diffraction element 20A. The first A intermediate diffraction element 20A diffracts the incident blue image $B_1$ in the lower left direction. Accordingly, in order to diffract the blue image $B_1$ traveling in the lower left direction to the front direction (direction perpendicular to the main surface of the light guide plate 16), the first A emission diffraction element 23A is disposed such that a periodic direction of the diffraction structure (direction of the arrangement axis $D_{1a}$) is parallel to a traveling direction (traveling direction in the plane direction) of the blue image $B_1$ during incidence into the first A emission diffraction element 23A.

In addition, as shown in FIG. 9, the second A incidence diffraction element 18A diffracts the incident green image $G_1$ in the left direction to be incident into the second A intermediate diffraction element 21A. The second A intermediate diffraction element 21A diffracts the incident green image $G_1$ in the lower right direction. Accordingly, in order to diffract the green image $G_1$ traveling in the lower right direction to the front direction, the second A emission diffraction element 24A is disposed such that a periodic direction of the diffraction structure (direction of the arrangement axis $D_{2a}$) is parallel to a traveling direction of the green image $G_1$ during incidence into the second A emission diffraction element 24A.

In addition, as shown in FIG. 10, the first B incidence diffraction element 17B diffracts the incident blue image $B_2$ in the left direction to be incident into the first B intermediate diffraction element 20B. The first B intermediate diffraction element 20B diffracts the incident blue image $B_2$ in the upper right direction. Accordingly, in order to diffract the blue image $B_2$ traveling in the upper right direction to the front direction, the first B emission diffraction element 23B is disposed such that a periodic direction of the diffraction structure (direction of the arrangement axis $D_{1b}$) is parallel to a traveling direction of the blue image $B_2$ during incidence into the first B emission diffraction element 23B.

In addition, as shown in FIG. 10, the second B incidence diffraction element 18B diffracts the incident green image $G_2$ in the right direction to be incident into the second B intermediate diffraction element 21B. The second B intermediate diffraction element 21B diffracts the incident green image $G_2$ in the upper left direction. Accordingly, in order to diffract the green image $G_2$ traveling in the upper left direction to the front direction, the second B emission diffraction element 24B is disposed such that a periodic direction of the diffraction structure (direction of the arrangement axis $D_{2b}$) is parallel to a traveling direction of the green image $G_2$ during incidence into the second B emission diffraction element 24B.

Accordingly, the periodic direction (direction of the arrangement axis $D_{1a}$) of the periodic structure of the first A emission diffraction element 23A, the periodic direction (direction of the arrangement axis $D_{2a}$) of the periodic structure of the second A emission diffraction element 24A, and the periodic direction (direction of the arrangement axis $D_{2b}$) of the periodic structure of the second B emission diffraction element 24B intersect with each other. In addition, the periodic direction (direction of the arrangement axis $D_{1b}$) of the periodic structure of the first B emission diffraction element 23B, the periodic direction (direction of the arrangement axis $D_{2a}$) of the periodic structure of the second A emission diffraction element 24A, and the periodic direction (direction of the arrangement axis $D_{2b}$) of the periodic structure of the second B emission diffraction element 24B intersect with each other.

As a result, light having a wavelength that is diffracted by the first A emission diffraction element 23A can be suppressed from being diffracted by the second A emission diffraction element 24A and the second B emission diffraction element 24B. In addition, light having a wavelength that is diffracted by the first B emission diffraction element 23B can be suppressed from being diffracted by the second A emission diffraction element 24A and the second B emission diffraction element 24B. In addition, light having a wavelength that is diffracted by the second A emission diffraction element 24A can be suppressed from being diffracted by the first A emission diffraction element 23A and the first B emission diffraction element 23B. Light having a wavelength that is diffracted by the second B emission diffraction element 24B can be suppressed from being diffracted by the first A emission diffraction element 23A and the first B emission diffraction element 23B. Accordingly, the occurrence of multiple images can be suppressed.

With the above-described configuration, in the light guide element and the image display apparatus according to the embodiment of the present invention, the occurrence of multiple images can be suppressed while achieving a wide viewing angle.

Even in the configuration in which the light guide element includes the intermediate diffraction element, the image display apparatus is not limited to displaying two color images of blue and green, and two color images of other colors (wavelengths) may be adopted. For example, two color images of green and red may be adopted, and two color images of blue and red may be adopted.

In addition, in a case where the wavelength of light diffracted by the first A incidence diffraction element 17A, the first B incidence diffraction element 17B, the first A intermediate diffraction element 20A, the first B intermediate diffraction element 20B, the first A emission diffraction element 23A, and the first B emission diffraction element 23B is shorter than the wavelength of light diffracted by the second A incidence diffraction element 18A, the second B incidence diffraction element 18B, the second A intermediate diffraction element 21A, the second B intermediate diffraction element 21B, the second A emission diffraction element 24A, and the second B emission diffraction element 24B, in a case where the periods of the diffraction structures of the first A intermediate diffraction element 20A and the first B intermediate diffraction element 20B are represented by $\Lambda_{mid1}$ and the periods of the diffraction structures of the second A intermediate diffraction element 21A and the second B intermediate diffraction element 21B are represented by $\Lambda_{mid2}$, it is preferable that $\Lambda_{mid1}<\Lambda_{mid2}$ is satisfied.

Here, in the example shown in FIG. 6, the first A incidence diffraction element 17A and the second A incidence diffraction element 18A are disposed at different positions in the plane direction of the main surface of the light guide plate. However, the first A incidence diffraction element 17A and the second A incidence diffraction element 18A may be laminated and disposed. Even in this case, the first A incidence diffraction element 17A and the second A incidence diffraction element 18A are disposed in a state where the periodic direction of the diffraction structure is appropriately adjusted such that incident light is diffracted in different directions. Likewise, the first B incidence diffraction element 17B and the second B incidence diffraction element 18B may be laminated and disposed. Even in this case, the first B incidence diffraction element 17B and the second B incidence diffraction element 18B are disposed in a state where the periodic direction of the diffraction structure is appropriately adjusted such that incident light is diffracted in different directions.

Here, FIGS. 6 to 8 show the example of the image display apparatus that displays two color images. However, the image display apparatus according to the embodiment of the present invention is not limited to this example and may adopt a configuration in which three or more color images are displayed.

Figure 11:
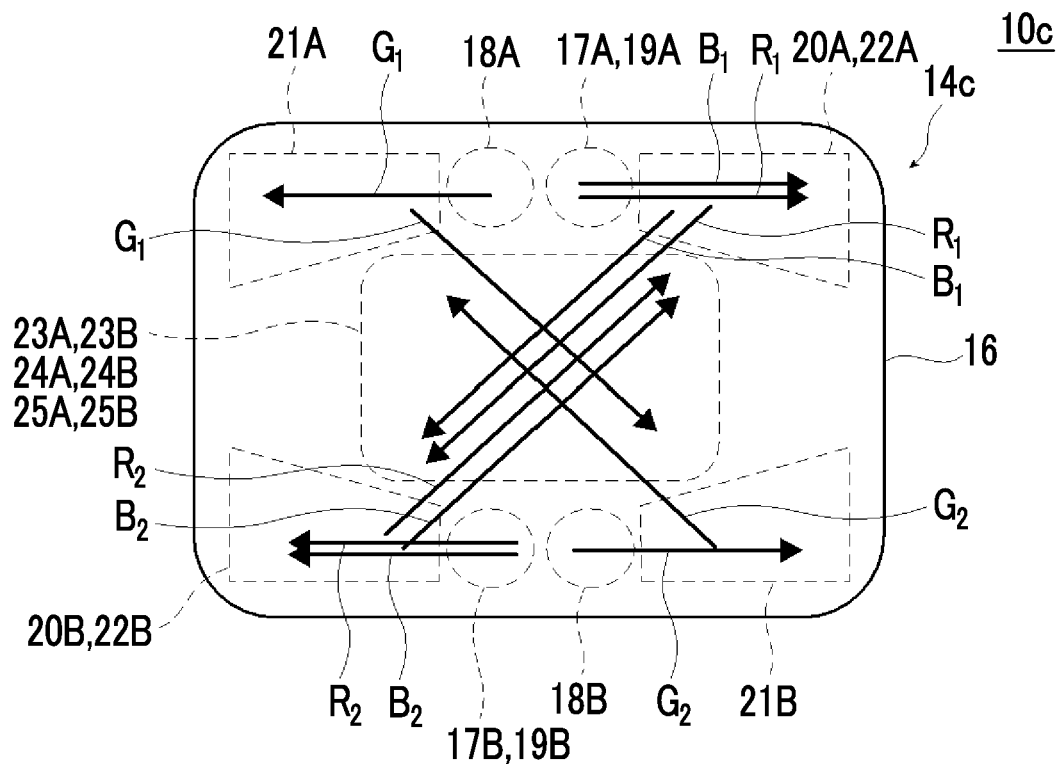
FIG. 11 is a front view conceptually showing an example of an image display apparatus including another example of the light guide element according to the present invention.
Figure 12:
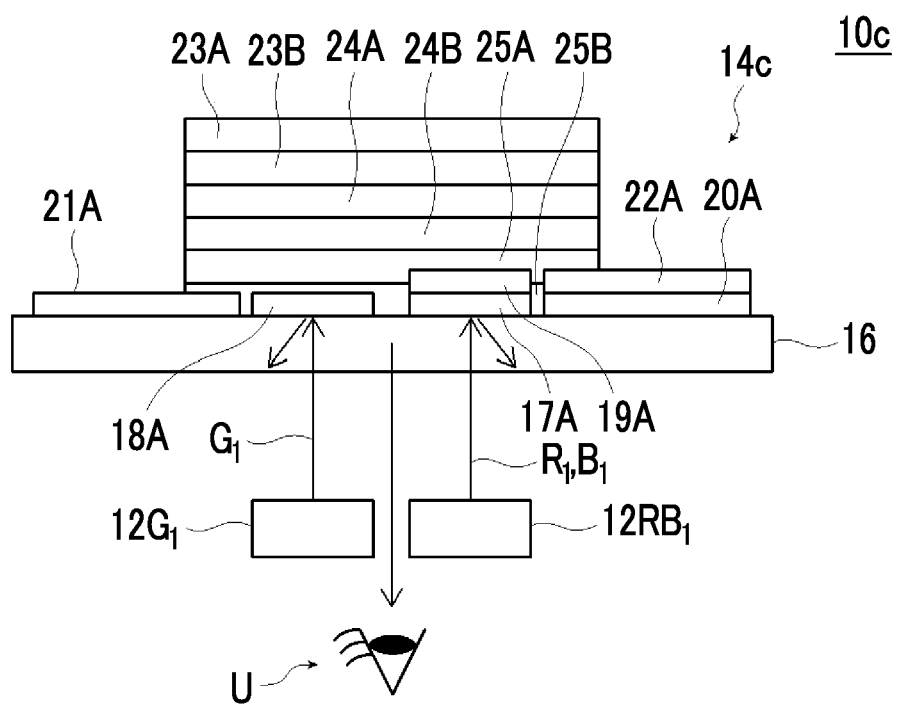
FIG. 12 is a top view conceptually showing the image display apparatus shown in FIG. 11.
Figure 13:
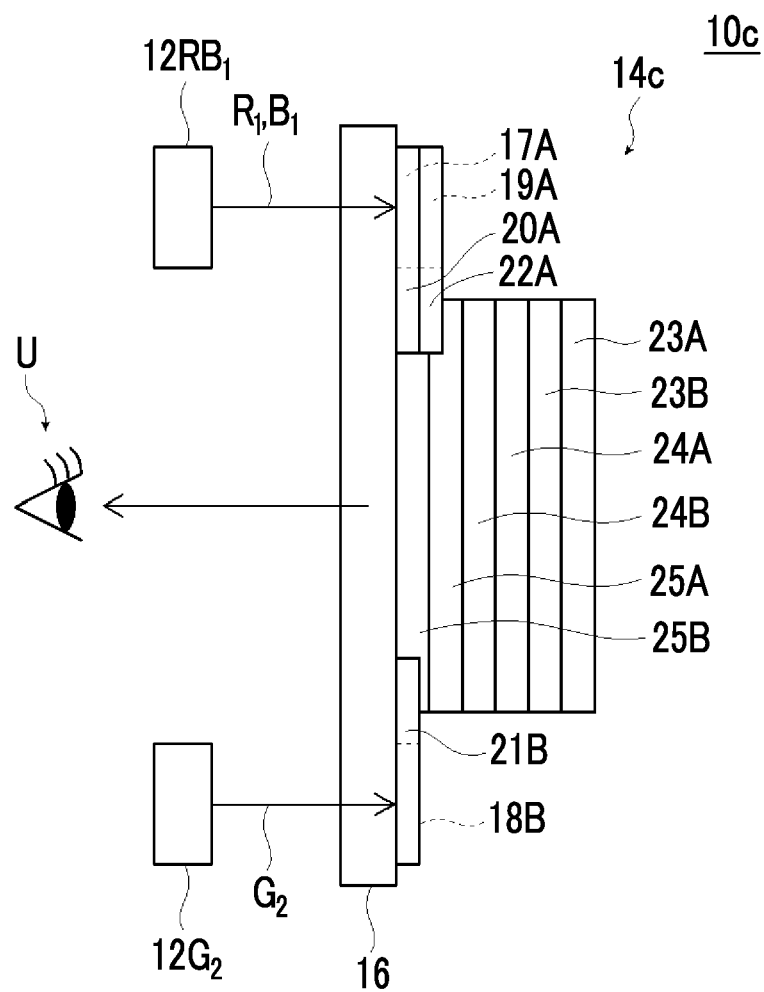
FIG. 13 is a side view conceptually showing the image display apparatus shown in FIG. 11.

FIGS. 11 to 13 conceptually show an image display apparatus including another example of the light guide element according to the embodiment of the present invention. FIG. 11 is a front view showing an image display apparatus 10c in case of being seen from the surface on the viewing side by the user U. FIG. 12 is a top view showing the image display apparatus 10c in case of being seen from an upper direction on the paper plane of FIG. 11. FIG. 13 is a side view showing the image display apparatus 10c in case of being seen from the right side on the paper plane of FIG. 11.

The image display apparatus 10c shown in FIGS. 11 to 13 includes the plurality of display elements 12 and a light guide element 14c, and the light guide elements 14c includes: the light guide plate 16; and the first A incidence diffraction element 17A, the first B incidence diffraction element 17B, the second A incidence diffraction element 18A, the second B incidence diffraction element 18B, the third A incidence diffraction element 19A, the third B incidence diffraction element 19B, the first A intermediate diffraction element 20A, the first B intermediate diffraction element 20B, the second A intermediate diffraction element 21A, the second B intermediate diffraction element 21B, the third A intermediate diffraction element 22A, the third B intermediate diffraction element 22B, the first A emission diffraction element 23A, the first B emission diffraction element 23B, the second A emission diffraction element 24A, the second B emission diffraction element 24B, the third A emission diffraction element 25A, and the third B emission diffraction element 25B that are provided on the light guide plate 16. FIG. 11 does not show the display element 12.

For example, the image display apparatus 10c superimposes three color images of blue, green, and red on each other and displays the superimposed images.

The image display apparatus 10c shown in FIGS. 11 to 13 has the same configuration as that of the image display apparatus 10b shown in FIGS. 6 to 8, except that it includes the third A incidence diffraction element 19A, the third B incidence diffraction element 19B, the third A intermediate diffraction element 22A, the third B intermediate diffraction element 22B, the third A emission diffraction element 25A, and the third B emission diffraction element 25B, includes a display element 12$RB_1$ instead of the display element 12$B_1$, and includes a display element 12$RB_2$ instead of the display element 12$B_2$. Therefore, the same portions are represented by the same reference numerals, and different points will be mainly described below.

As shown in FIGS. 11 to 13, in the light guide element 14c, the first A emission diffraction element 23A, the first B emission diffraction element 23B, the second A emission diffraction element 24A, the second B emission diffraction element 24B, the third A emission diffraction element 25A, and the third B emission diffraction element 25B are laminated and disposed at the center position of one main surface of the light guide plate 16.

In addition, in FIG. 11, at the upper center of the emission diffraction element, the first A incidence diffraction element 17A and the third A incidence diffraction element 19A are laminated and disposed on the right side, and the second A incidence diffraction element 18A is disposed on the left side. In addition, at the lower center of the emission diffraction element, the first B incidence diffraction element 17B and the third B incidence diffraction element 19B are laminated and disposed on the left side, and the second B incidence diffraction element 18B is disposed on the right side.

Further, the first A intermediate diffraction element 20A and the third A intermediate diffraction element 22A are laminated and disposed on the right side of the first A incidence diffraction element 17A and the third A incidence diffraction element 19A, and the second A intermediate diffraction element 21A is disposed on the left side of the second A incidence diffraction element 18A. In addition, the first B intermediate diffraction element 20B and the third B intermediate diffraction element 22B are laminated and disposed on the left side of the first B incidence diffraction element 17B and the third B incidence diffraction element 19B, and the second B intermediate diffraction element 21B is disposed on the left side of the second B incidence diffraction element 18B.

As shown in FIG. 11, the emission diffraction elements are disposed on a line obtained by connecting the first A intermediate diffraction element 20A and the third A intermediate diffraction element 22A on a line obtained by connecting the first B intermediate diffraction element 20B and the third B intermediate diffraction element 22B, and the emission diffraction element is disposed on a line obtained by connecting the second A intermediate diffraction element 21A and the second B intermediate diffraction element 21B.

In addition, as shown in FIGS. 12 and 13, the display element 12$RB_1$ is disposed to face the first A incidence diffraction element 17A and the third A incidence diffraction element 19A with the light guide plate 16 interposed therebetween. The display element 12$RB_2$ is disposed to face the first B incidence diffraction element 17B and the third B incidence diffraction element 19B with the light guide plate 16 interposed therebetween. The display element 12$G_1$ is disposed to face the second A incidence diffraction element 18A with the light guide plate 16 interposed therebetween. The display element 12$G_2$ is disposed to face the second B incidence diffraction element 18B with the light guide plate 16 interposed therebetween.

The third A incidence diffraction element 19A, the third B incidence diffraction element 19B, the third A intermediate diffraction element 22A, the third B intermediate diffraction element 22B, the third A emission diffraction element 25A, and the third B emission diffraction element 25B diffract light having the same wavelength. In addition, the third A incidence diffraction element 19A, the third B incidence diffraction element 19B, the third A intermediate diffraction element 22A, the third B intermediate diffraction element 22B, the third A emission diffraction element 25A, and the third B emission diffraction element 25B diffract light components having different wavelengths from those of the first A incidence diffraction element 17A, the first B incidence diffraction element 17B, the first A intermediate diffraction element 20A, the first B intermediate diffraction element 20B, the first A emission diffraction element 23A, and the first B emission diffraction element 23B and from those of the second A incidence diffraction element 18A, the second B incidence diffraction element 18B, the second A intermediate diffraction element 21A, the second B intermediate diffraction element 21B, the second A emission diffraction element 24A, and the second B emission diffraction element 24B.

In order to diffract light components having different wavelengths, the periods of the diffraction structures of the third A incidence diffraction element 19A and the third B incidence diffraction element 19B, the periods of the diffraction structures of the first A incidence diffraction element 17A and the first B incidence diffraction element 17B, and the periods of the diffraction structures of the second A incidence diffraction element 18A and the second B incidence diffraction element 18B are different from each other.

Likewise, the periods of the diffraction structures of the third A intermediate diffraction element 22A and the third B intermediate diffraction element 22B, the periods of the diffraction structures of the first A intermediate diffraction element 20A and the first B intermediate diffraction element 20B, and the periods of the diffraction structures of the second A intermediate diffraction element 21A and the second B intermediate diffraction element 21B are different from each other.

Likewise, the periods of the diffraction structures of the third A emission diffraction element 25A and the third B emission diffraction element 25B, the periods of the diffraction structures of the first A emission diffraction element 23A and the first B emission diffraction element 23B, and the periods of the diffraction structures of the second A emission diffraction element 24A and the second B emission diffraction element 24B are different from each other.

The third A incidence diffraction element 19A diffracts incident light in a direction different from that of the second A incidence diffraction element 18A to be incident into the light guide plate 16. In addition, the third B incidence diffraction element 19B diffracts incident light in a direction different from that of the second B incidence diffraction element 18B to be incident into the light guide plate 16.

The third A intermediate diffraction element 22A diffracts light that is diffracted by the third A incidence diffraction element 19A and propagates in the light guide plate 16 to the third A emission diffraction element 25A. In addition, the third B intermediate diffraction element 22B diffracts light that is diffracted by the third B incidence diffraction element 19B and propagates in the light guide plate 16 to the third B emission diffraction element 25B.

The third A emission diffraction element 25A diffracts the light that is diffracted by the third A incidence diffraction element 19A to be incident into the light guide plate 16 and is diffracted by the third A intermediate diffraction element 22A to emit the diffracted light from the light guide plate 16. The third B emission diffraction element 25B diffracts the light that is diffracted by the third B incidence diffraction element 19B to be incident into the light guide plate 16 and is diffracted by the third B intermediate diffraction element 22B to emit the diffracted light from the light guide plate 16.

In a case where an image is emitted from the display element 12RB$_1$, the blue component (image B$_1$) is not likely to be diffracted by the third A incidence diffraction element 19A and is diffracted by the first A incidence diffraction element 17A. The first A incidence diffraction element 17A diffracts the blue image B$_1$ to the direction of the first A intermediate diffraction element 20A at an angle at which total reflection occurs in the light guide plate 16. The blue image B$_1$ diffracted by the first A incidence diffraction element 17A is guided in the light guide plate 16 to be incident into the first A intermediate diffraction element 20A. The first A intermediate diffraction element 20A diffracts the incident blue image B$_1$ such that the traveling direction of the blue image B$_1$ is directed to the first A emission diffraction element 23A. In the example shown in FIG. 11, the first A intermediate diffraction element 20A diffracts the incident blue image B$_1$ in the lower left direction in FIG. 11. The blue image B$_1$ diffracted by the first A intermediate diffraction element 20A is totally reflected and propagates in the light guide plate 16 to be incident into the first A emission diffraction element 23A. The first A emission diffraction element 23A diffracts the incident blue image B$_1$ to deviate from the angle at which total reflection occurs in the light guide plate 16. In the example shown in FIGS. 11 to 13, the first A emission diffraction element 23A diffracts the incident blue image B$_1$ in a direction substantially perpendicular to the main surface of the light guide plate 16. The blue image B$_1$ diffracted by the first A emission diffraction element 23A is emitted from the light guide plate 16 to the user U. The first A intermediate diffraction element 20A is laminated on the third A intermediate diffraction element 22A, and the first A emission diffraction element 23A is laminated on the third A emission diffraction element 25A. The blue image B$_1$ is diffracted by the first A intermediate diffraction element 20A and the first A emission diffraction element 23A without being diffracted by the third A intermediate diffraction element 22A and the third A emission diffraction element 25A.

On the other hand, in the image emitted from the display element 12RB$_1$, a red component (image R$_1$) is not likely to be diffracted by the first A incidence diffraction element 17A and is diffracted by the third A incidence diffraction element 19A. The third A incidence diffraction element 19A diffracts a red image R$_1$ to the direction of the third A intermediate diffraction element 22A at an angle at which total reflection occurs in the light guide plate 16. The red image R$_1$ diffracted by the third A incidence diffraction element 19A is guided in the light guide plate 16 to be incident into the third A intermediate diffraction element 22A. The third A intermediate diffraction element 22A diffracts the incident red image R$_1$ such that the traveling direction of the red image R$_1$ is directed to the third A emission diffraction element 25A. In the example shown in FIG. 11, the third A intermediate diffraction element 22A diffracts the incident red image R$_1$ in the lower left direction in FIG. 11. The red image R$_1$ diffracted by the third A intermediate diffraction element 22A is totally reflected and propagates in the light guide plate 16 to be incident into the third A emission diffraction element 25A. The third A emission diffraction element 25A diffracts the incident red image R$_1$ to deviate from the angle at which total reflection occurs in the light guide plate 16. In the example shown in FIGS. 11 to 13, the third A emission diffraction element 25A diffracts the incident red image R$_1$ in the direction substantially perpendicular to the main surface of the light guide plate 16. The red image R$_1$ diffracted by the third A emission diffraction element 25A is emitted from the light guide plate 16 to the user U. The third A intermediate diffraction element 22A is laminated on the first A intermediate diffraction element 20A, and the third A emission diffraction element 25A is laminated on the first A emission diffraction element 23A. The red image R$_1$ is diffracted by the third A intermediate diffraction element 22A and the third A emission diffraction element 25A without being diffracted by the first A intermediate diffraction element 20A and the first A emission diffraction element 23A.

In a case where an image is emitted from the display element 12RB$_2$, the blue component (image B$_2$) is not likely to be diffracted by the third B incidence diffraction element 19B and is diffracted by the first B incidence diffraction element 17B. The first B incidence diffraction element 17B diffracts the blue image B$_2$ to the direction of the first B intermediate diffraction element 20B at an angle at which total reflection occurs in the light guide plate 16. The blue image B$_2$ diffracted by the first B incidence diffraction element 17B is guided in the light guide plate 16 to be incident into the first B intermediate diffraction element 20B. The first B intermediate diffraction element 20B diffracts the incident blue image B$_1$ such that the traveling direction of the blue image B$_1$ is directed to the first B emission diffraction element 23B. In the example shown in FIG. 11, the first B intermediate diffraction element 20B diffracts the incident blue image B$_2$ in the upper right direction in FIG. 11. The blue image B$_2$ diffracted by the first B intermediate diffraction element 20B is totally reflected and propagates in the light guide plate 16 to be incident into the first B emission diffraction element 23B. The first B emission diffraction element 23B diffracts the incident blue image B$_2$ to deviate from the angle at which total reflection occurs in the light guide plate 16. In the example shown in FIGS. 11 to 13, the first B emission diffraction element 23B diffracts the incident blue image $B_2$ in the direction substantially perpendicular to the main surface of the light guide plate 16. The blue image $B_2$ diffracted by the first B emission diffraction element 23B is emitted from the light guide plate 16 to the user U. The first B intermediate diffraction element 20B is laminated on the third B intermediate diffraction element 22B, and the first B emission diffraction element 23B is laminated on the third B emission diffraction element 25B. The blue image $B_2$ is diffracted by the first B intermediate diffraction element 20B and the first B emission diffraction element 23B without being diffracted by the third B intermediate diffraction element 22B and the third B emission diffraction element 25B.

On the other hand, in the image emitted from the display element $12RB_2$, a red component (image $R_2$) is not likely to be diffracted by the first B incidence diffraction element 17B and is diffracted by the third B incidence diffraction element 19B. The third B incidence diffraction element 19B diffracts the red image $R_2$ to the direction of the third B intermediate diffraction element 22B at an angle at which total reflection occurs in the light guide plate 16. The red image $R_2$ diffracted by the third B incidence diffraction element 19B is guided in the light guide plate 16 to be incident into the third B intermediate diffraction element 22B. The third B intermediate diffraction element 22B diffracts the incident red image $R_2$ such that the traveling direction of the red image $R_2$ is directed to the third B emission diffraction element 25B. In the example shown in FIG. 11, the third B intermediate diffraction element 22B diffracts the incident red image $R_2$ in the upper right direction in FIG. 11. The red image $R_2$ diffracted by the third B intermediate diffraction element 22B is totally reflected and propagates in the light guide plate 16 to be incident into the third B emission diffraction element 25B. The third B emission diffraction element 25B diffracts the incident red image $R_2$ to deviate from the angle at which total reflection occurs in the light guide plate 16. In the example shown in FIGS. 11 to 13, the third B emission diffraction element 25B diffracts the incident red image $R_2$ in the direction substantially perpendicular to the main surface of the light guide plate 16. The red image $R_2$ diffracted by the third B emission diffraction element 25B is emitted from the light guide plate 16 to the user U. The third B intermediate diffraction element 22B is laminated on the first B intermediate diffraction element 20B, and the third B emission diffraction element 25B is laminated on the first B emission diffraction element 23B. The red image $R_2$ is diffracted by the third B intermediate diffraction element 22B and the third B emission diffraction element 25B without being diffracted by the first B intermediate diffraction element 20B and the first B emission diffraction element 23B.

Routes along which the green image $G_1$ emitted from the display element $12G_1$ the green image $G_2$ emitted from the display element $12G_2$ are guided by the light guide element 14c are the same as a light guide route by the light guide element 14b shown in FIGS. 6 to 8.

The third A incidence diffraction element 19A, the third A intermediate diffraction element 22A, the third A emission diffraction element 25A, the third B incidence diffraction element 19B, the third B intermediate diffraction element 22B, and the third B emission diffraction element 25B diffract a red image. That is, the third A incidence diffraction element 19A, the third A intermediate diffraction element 22A, the third A emission diffraction element 25A, the third B incidence diffraction element 19B, the third B intermediate diffraction element 22B, and the third B emission diffraction element 25B diffract light in the same wavelength range.

As shown in FIG. 11, a traveling direction of the light diffracted by the third A incidence diffraction element 19A and the third A intermediate diffraction element 22A during incidence into the third A emission diffraction element 25A and a traveling direction of the light diffracted by the third B incidence diffraction element 19B and the third B intermediate diffraction element 22B during incidence into the third B emission diffraction element 25B are different by 180° (are opposite to each other in parallel).

Accordingly, in the image display apparatus 10c in the example shown in the drawing, the red component (red image) in the image emitted from the display element $12RB_1$ and the display element $12RB_2$ guided in the light guide plate 16 along two different systems, is diffracted by the emission diffraction elements laminated at the same positions, and is emitted from the light guide plate 16. The image display apparatus 10c superimposes the image $R_1$ and the image $R_2$ on each other and displays the superimposed images as one image. As a result, the viewing angle of the red image can be increased.

Here, in the image display apparatus 10c (light guide element 14c), as in the image display apparatus 10b shown in FIG. 6, the periodic direction of the diffraction structure of the first A emission diffraction element 23A intersects with the periodic direction of the diffraction structure of the second A emission diffraction element 24A and the periodic direction of the diffraction structure of the second B emission diffraction element 24B. In addition, the periodic direction of the diffraction structure of the first B emission diffraction element 23B intersects with the periodic direction of the diffraction structure of the second A emission diffraction element 24A and the periodic direction of the diffraction structure of the second B emission diffraction element 24B. Further, in the image display apparatus 10c (light guide element 14c), the periodic direction of the diffraction structure of the third A emission diffraction element 25A intersects with the periodic direction of the diffraction structure of the second A emission diffraction element 24A and the periodic direction of the diffraction structure of the second B emission diffraction element 24B. In addition, the periodic direction of the diffraction structure of the third B emission diffraction element 25B intersects with the periodic direction of the diffraction structure of the second A emission diffraction element 24A and the periodic direction of the diffraction structure of the second B emission diffraction element 24B.

This point will be described using FIGS. 14 and 15.

Figure 14:
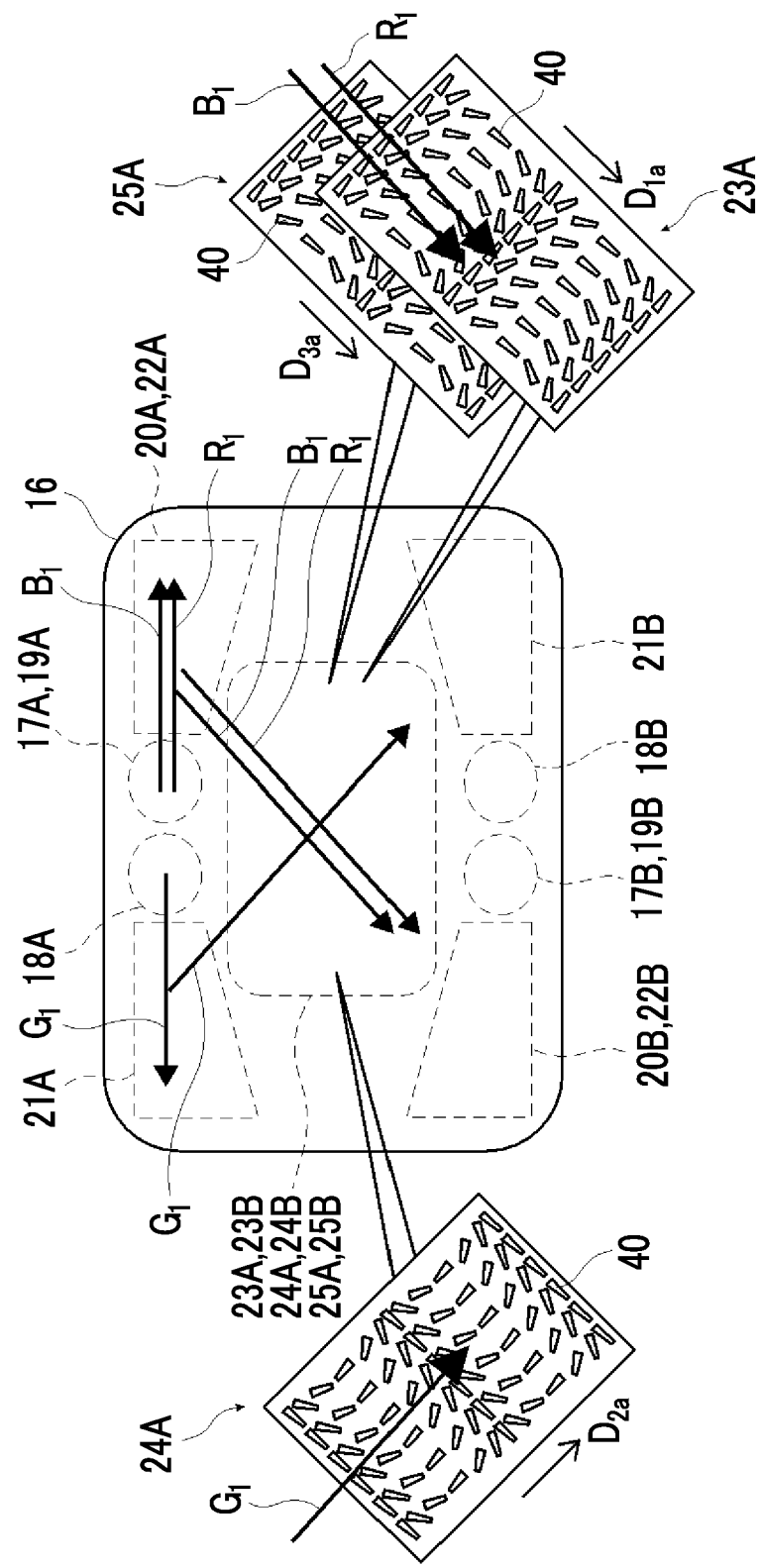
FIG. 14 is a conceptual diagram showing an action of the image display apparatus shown in FIG. 11.

FIG. 14 is a diagram schematically showing a relationship between the traveling direction of the blue image $B_1$ incident from the first A incidence diffraction element 17A and diffracted by the first A intermediate diffraction element 20A and the diffraction structure of the first A emission diffraction element 23A that diffracts the blue image $B_1$ and emits the diffracted blue image $B_1$ from the light guide plate 16, a relationship between the traveling direction of the green image $G_1$ incident from the second A incidence diffraction element 18A and diffracted by the second A intermediate diffraction element 21A and the diffraction structure of the second A emission diffraction element 24A that diffracts the green image $G_1$ and emits the diffracted green image $G_1$ from the light guide plate 16, and a relationship between the traveling direction of the red image $R_1$ incident from the third A incidence diffraction element 19A and diffracted by the third A intermediate diffraction element 22A and the diffraction structure of the third A emission diffraction element 25A that diffracts the red image $R_1$ and emits the diffracted red image $R_1$ from the light guide plate 16. In addition, FIG. 15 is a diagram schematically showing a relationship between the traveling direction of the blue image $B_2$ incident from the first B incidence diffraction element 17B diffracted by the first B intermediate diffraction element 20B and the diffraction structure of the first B emission diffraction element 23B that diffracts the blue image $B_2$ and emits the diffracted blue image $B_2$ from the light guide plate 16, a relationship between the traveling direction of the green image $G_2$ incident from the second B incidence diffraction element 18B and diffracted by the second B intermediate diffraction element 21B and the diffraction structure of the second B emission diffraction element 24B that diffracts the green image $G_2$ and emits the diffracted green image $G_2$ from the light guide plate 16, and a relationship between the traveling direction of the red image $R_2$ incident from the third B incidence diffraction element 19B and diffracted by the third B intermediate diffraction element 22B and the diffraction structure of the third B emission diffraction element 25B that diffracts the red image $R_2$ and emits the diffracted red image $R_2$ from the light guide plate 16.

Figure 15:
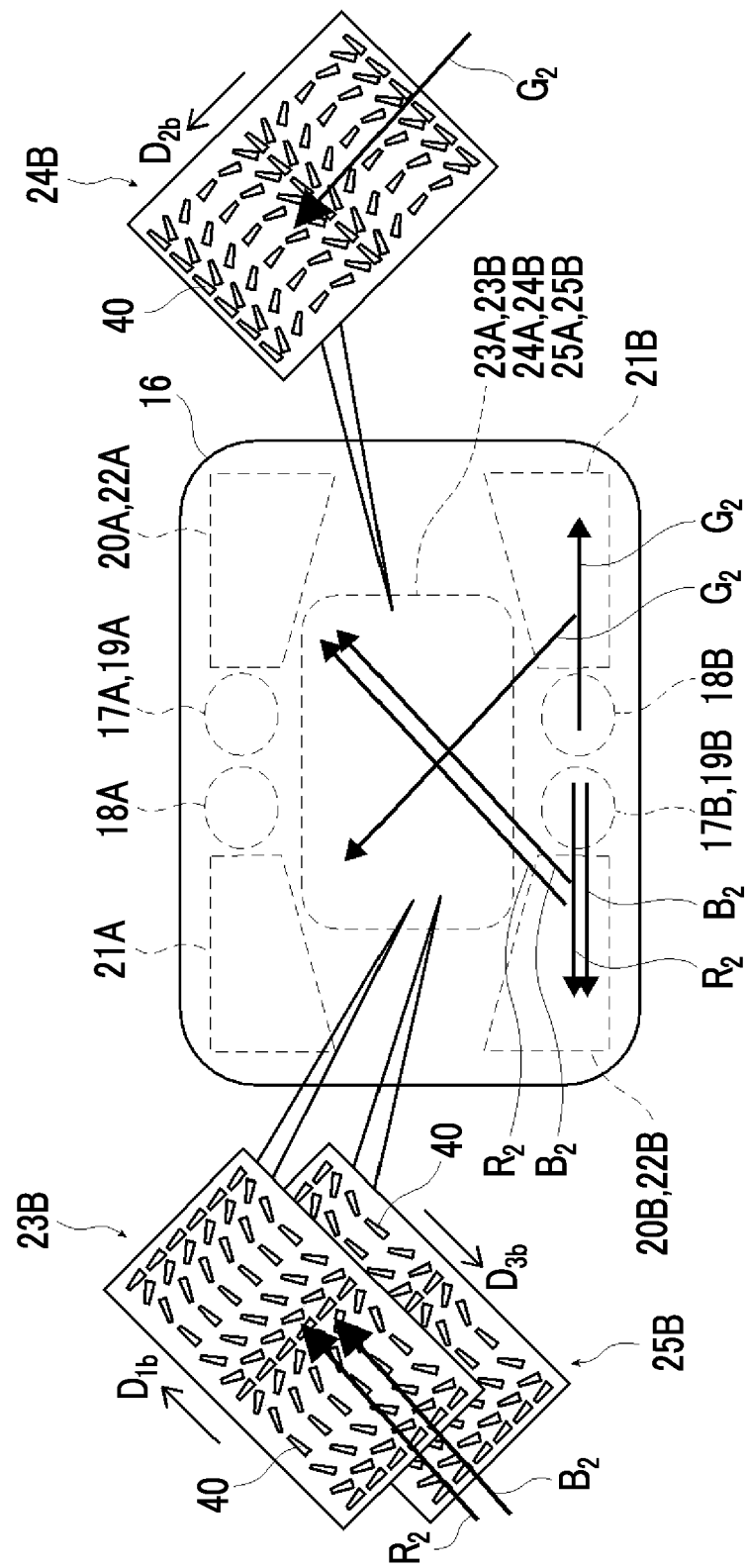
FIG. 15 is a conceptual diagram showing the action of the image display apparatus shown in FIG. 11.

FIGS. 14 and 15 show a diffraction element including a liquid crystal layer as the emission diffraction element as in FIGS. 4 and 5.

In FIGS. 14 and 15, the periodic direction (direction of the arrangement axis $D_{1a}$) of the diffraction structure of the first A emission diffraction element 23A, the periodic direction (direction of the arrangement axis $D_{2a}$) of the diffraction structure of the second A emission diffraction element 24A, the periodic direction (direction of the arrangement axis $D_{1b}$) of the diffraction structure of the first B emission diffraction element 23B, and the periodic direction (direction of the arrangement axis Deb) of the diffraction structure of the second B emission diffraction element 24B are the same as those in the examples shown in FIGS. 9 and 10.

As shown in FIG. 14, the third A incidence diffraction element 19A diffracts the incident red image $R_1$ in the right direction to be incident into the third A intermediate diffraction element 22A. The third A intermediate diffraction element 22A diffracts the incident red image $R_1$ in the lower left direction. Accordingly, in order to diffract the red image $R_1$ traveling in the lower left direction to the front direction (direction perpendicular to the main surface of the light guide plate 16), the third A emission diffraction element 25A is disposed such that a periodic direction of the diffraction structure (direction of an arrangement axis $D_{3a}$) is parallel to a traveling direction (traveling direction in the plane direction) of the red image $R_1$ during incidence into the third A emission diffraction element 25A.

In addition, as shown in FIG. 15, the third B incidence diffraction element 19B diffracts the incident red image $R_2$ in the left direction to be incident into the third B intermediate diffraction element 22B. The third B intermediate diffraction element 22B diffracts the incident red image $R_2$ in the upper right direction. Accordingly, in order to diffract the red image $R_2$ traveling in the upper right direction to the front direction, the third B emission diffraction element 25B is disposed such that a periodic direction of the diffraction structure (direction of an arrangement axis $D_{3b}$) is parallel to a traveling direction of the red image $R_2$ during incidence into the third B emission diffraction element 25B.

Accordingly, the periodic direction (direction of the arrangement axis $D_{1a}$) of the periodic structure of the first A emission diffraction element 23A, the periodic direction (direction of the arrangement axis $D_{2a}$) of the periodic structure of the second A emission diffraction element 24A, and the periodic direction (direction of the arrangement axis $D_{2b}$) of the periodic structure of the second B emission diffraction element 24B intersect with each other. In addition, the periodic direction (direction of the arrangement axis $D_{1b}$) of the periodic structure of the first B emission diffraction element 23B, the periodic direction (direction of the arrangement axis $D_{2a}$) of the periodic structure of the second A emission diffraction element 24A, and the periodic direction (direction of the arrangement axis $D_{2b}$) of the periodic structure of the second B emission diffraction element 24B intersect with each other. Accordingly, the periodic direction (direction of the arrangement axis $D_{3a}$) of the periodic structure of the third A emission diffraction element 25A, the periodic direction (direction of the arrangement axis $D_{2a}$) of the periodic structure of the second A emission diffraction element 24A, and the periodic direction (direction of the arrangement axis $D_{2b}$) of the periodic structure of the second B emission diffraction element 24B intersect with each other. Accordingly, the periodic direction (direction of the arrangement axis $D_{3b}$) of the periodic structure of the third B emission diffraction element 25B, the periodic direction (direction of the arrangement axis $D_{2a}$) of the periodic structure of the second A emission diffraction element 24A, and the periodic direction (direction of the arrangement axis $D_{2b}$) of the periodic structure of the second B emission diffraction element 24B intersect with each other.

In the example shown in the drawing, in a preferable aspect, the periodic direction (direction of the arrangement axis $D_{1a}$) of the periodic structure of the third A emission diffraction element 25A and the periodic direction (direction of the arrangement axis $D_{3b}$) of the periodic structure of the third B emission diffraction element 25B are parallel to each other.

As a result, light having a wavelength that is diffracted by the first A emission diffraction element 23A can be suppressed from being diffracted by the second A emission diffraction element 24A and the second B emission diffraction element 24B. In addition, light having a wavelength that is diffracted by the first B emission diffraction element 23B can be suppressed from being diffracted by the second A emission diffraction element 24A and the second B emission diffraction element 24B. In addition, light having a wavelength that is diffracted by the second A emission diffraction element 24A can be suppressed from being diffracted by the first A emission diffraction element 23A, the first B emission diffraction element 23B, the third A emission diffraction element 25A, and the third B emission diffraction element 25B. Light having a wavelength that is diffracted by the second B emission diffraction element 24B can be suppressed from being diffracted by the first A emission diffraction element 23A, the first B emission diffraction element 23B, the third A emission diffraction element 25A, and the third B emission diffraction element 25B. In addition, light having a wavelength that is diffracted by the third A emission diffraction element 25A can be suppressed from being diffracted by the second A emission diffraction element 24A and the second B emission diffraction element 24B. In addition, light having a wavelength that is diffracted by the third B emission diffraction element 25B can be suppressed from being diffracted by the second A emission diffraction element 24A and the second B emission diffraction element 24B. Accordingly, the occurrence of multiple images can be suppressed.

Even in the configuration in which the image display apparatus displays three color images, the image display apparatus is not limited to displaying three color images of blue, green, and red, and three color images of other colors (wavelengths) may be adopted. In addition, a configuration in which the image display apparatus displays four or more color images may also be adopted.

In the example shown in the drawing, the periodic direction (direction of the arrangement axis $D_{1a}$) of the periodic structure of the first A emission diffraction element 23A and the periodic direction (direction of the arrangement axis $D_{1a}$) of the periodic structure of the third A emission diffraction element 25A are parallel to each other, and the periodic direction (direction of the arrangement axis $D_{1b}$) of the periodic structure of the first B emission diffraction element 23B and the periodic direction (direction of the arrangement axis Dab) of the periodic structure of the third B emission diffraction element 25B are parallel to each other. However, the wavelength of light diffracted by the first A emission diffraction element 23A and the first B emission diffraction element 23B is distant from the wavelength of light diffracted by the third A emission diffraction element 25A and the third B emission diffraction element 25B. Therefore, the light having a wavelength that is diffracted by the first A emission diffraction element 23A or the first B emission diffraction element 23B is not likely to be diffracted by the third A emission diffraction element 25A or the third B emission diffraction element 25B, and the light having a wavelength that is diffracted by the third A emission diffraction element 25A or the third B emission diffraction element 25B is not likely to be diffracted by the first A emission diffraction element 23A or the first B emission diffraction element 23B. Accordingly, the occurrence of multiple images can be suppressed.

That is, in a case where three color images are displayed, for example, a configuration is preferable in which light having the shortest wavelength is diffracted by the first A incidence diffraction element 17A, the first B incidence diffraction element 17B, the first A emission diffraction element 23A, and the first B emission diffraction element 23B, light having the intermediate wavelength is diffracted by the second A incidence diffraction element 18A, the second B incidence diffraction element 18B, the second A emission diffraction element 24A, and the second B emission diffraction element 24B, and light having the longest wavelength is diffracted by the third A incidence diffraction element 19A, the third B incidence diffraction element 19B, the third A emission diffraction element 25A, and the third B emission diffraction element 25B.

In addition, from the viewpoint of diffracting light components having different wavelengths at the same angle to emit the light components in the same direction, in a case where the wavelength of light diffracted by the first A incidence diffraction element 17A, the first B incidence diffraction element 17B, the first A intermediate diffraction element 20A, the first B intermediate diffraction element 20B, the first A emission diffraction element 23A, and the first B emission diffraction element 23B is represented by $\lambda_1$, the wavelength of light diffracted by the second A incidence diffraction element 18A, the second B incidence diffraction element 18B, the second A intermediate diffraction element 21A, the second B intermediate diffraction element 21B, the second A emission diffraction element 24A, and the second B emission diffraction element 24B is represented by $X_2$, the wavelength of light diffracted by the third A incidence diffraction element 19A, the third B incidence diffraction element 19B, the third A intermediate diffraction element 22A, the third B intermediate diffraction element 22B, the third A emission diffraction element 25A, and the third B emission diffraction element 25B is represented by $\lambda_3$, and $\lambda_1 < \lambda_2 < \lambda_3$ is satisfied, it is preferable that the periods $\Lambda_{in1}$ of the diffraction structures of the first A incidence diffraction element 17A and the first B incidence diffraction element 17B, the periods $\Lambda_{in2}$ of the diffraction structures of the second A incidence diffraction element 18A and the second B incidence diffraction element 18B, and the periods $\Lambda_{in3}$ of the diffraction structures of the third A incidence diffraction element 19A and the third B incidence diffraction element 19B satisfy $\Lambda_{in1} < \Lambda_{in2} < \Lambda_{in3}$. In addition, it is preferable that the periods $\Lambda_{mid1}$ of the diffraction structures of the first A intermediate diffraction element 20A and the first B intermediate diffraction element 20B, the periods $\Lambda_{mid2}$ of the diffraction structures of the second A intermediate diffraction element 21A and the second B intermediate diffraction element 21B, and the periods $\Lambda_{mid3}$ of the diffraction structures of the third A intermediate diffraction element 22A and the third B intermediate diffraction element 22B satisfy $\Lambda_{mid1} < \Lambda_{mid2} < \Lambda_{mid3}$. In addition, it is preferable that the periods $\Lambda_{out1}$ of the diffraction structures of the first A emission diffraction element 23A and the first B emission diffraction element 23B, the periods $\Lambda_{out2}$ of the diffraction structures of the second A emission diffraction element 24A and the second B emission diffraction element 24B, and the periods $\Lambda_{out3}$ of the diffraction structures of the third A emission diffraction element 25A and the third B emission diffraction element 25B satisfy $\Lambda_{out1} < \Lambda_{out2} < \Lambda_{out3}$.

Here, in the example shown in FIG. 11, the first A incidence diffraction element 17A, the third A incidence diffraction element 19A, and the second A incidence diffraction element 18A are disposed at different positions in the plane direction of the main surface of the light guide plate. However, the first A incidence diffraction element 17A, the third A incidence diffraction element 19A, and the second A incidence diffraction element 18A may be laminated and disposed. Even in this case, the first A incidence diffraction element 17A, the third A incidence diffraction element 19A, and the second A incidence diffraction element 18A are disposed in a state where the periodic direction of the diffraction structure is appropriately adjusted such that incident light is diffracted in different directions. Likewise, the first B incidence diffraction element 17B, the third B incidence diffraction element 19B, and the second B incidence diffraction element 18B may be laminated and disposed. Even in this case, the first B incidence diffraction element 17B, the third B incidence diffraction element 19B, and the second B incidence diffraction element 18B are disposed in a state where the periodic direction of the diffraction structure is appropriately adjusted such that incident light is diffracted in different directions.

In addition, in the example shown in FIG. 11, the first A incidence diffraction element 17A and the third A incidence diffraction element 19A are laminated and disposed. However, the present invention is not limited thereto, and the first A incidence diffraction element 17A and the third A incidence diffraction element 19A may be disposed at different positions in the plane direction of the main surface of the light guide plate 16. In addition, the first A incidence diffraction element 17A and the third A incidence diffraction element 19A diffract light in the same direction. However, the present invention is not limited thereto, and the first A incidence diffraction element 17A and the third A incidence diffraction element 19A may diffract light in different directions. Likewise, the first B incidence diffraction element 17B and the third B incidence diffraction element 19B may be disposed at different positions in the plane direction of the main surface of the light guide plate 16. In addition, the first B incidence diffraction element 17B and the third B incidence diffraction element 19B diffract light in the same direction. However, the present invention is not limited thereto, and the first B incidence diffraction element 17B and the third B incidence diffraction element 19B may diffract light in different directions.

In addition, in the example shown in FIG. 11, the first A intermediate diffraction element 20A and the third A intermediate diffraction element 22A are laminated and disposed. However, the present invention is not limited thereto, and the first A intermediate diffraction element 20A and the third A intermediate diffraction element 22A may be disposed at different positions in the plane direction of the main surface of the light guide plate 16. Likewise, the first B intermediate diffraction element 20B and the third B intermediate diffraction element 22B may be disposed at different positions in the plane direction of the main surface of the light guide plate 16.

In addition, in the example shown in FIG. 11, the periodic direction (direction of the arrangement axis $D_{1a}$) of the periodic structure of the first A emission diffraction element 23A and the periodic direction (direction of the arrangement axis $D_{1b}$) of the periodic structure of the first B emission diffraction element 23B are parallel to the periodic direction (direction of the arrangement axis $D_{1a}$) of the periodic structure of the third A emission diffraction element 25A and the periodic direction (direction of the arrangement axis $D_{3b}$) of the periodic structure of the third B emission diffraction element 25B. However, the present invention is not limited to this configuration, and the periodic direction (direction of the arrangement axis $D_{1a}$) of the periodic structure of the first A emission diffraction element 23A and the periodic direction (direction of the arrangement axis $D_{1b}$) of the periodic structure of the first B emission diffraction element 23B may intersect with the periodic direction (direction of the arrangement axis $D_{1a}$) of the periodic structure of the third A emission diffraction element 25A and the periodic direction (direction of the arrangement axis $D_{3b}$) of the periodic structure of the third B emission diffraction element 25B.

Hereinafter, each of the components in the image display apparatus according to the embodiment of the present invention will be described.

[Display Element]

The display elements 12 (display elements $12B_1$, $12B_2$, $12G_1$, $12G_2$, $12RB_1$, and $12RB_2$) display an image (video) to be observed by the user U and emits the image to the corresponding incidence diffraction elements. Accordingly, the display elements 12 are disposed such that the emitted image is incident into the incidence diffraction elements.

In the image display apparatus according to the embodiment of the present invention, as the display element 12, various well-known display elements (a display device or a projector) used for AR glasses or the like can be used without any particular limitation. Examples of the display element 12 include a display element including a display and a projection lens.

In the image display apparatus according to the embodiment of the present invention, the display is not particularly limited. For example, various well-known displays used in AR glasses or the like can be used.

Examples of the display include a liquid crystal display (including Liquid Crystal On Silicon (LCOS)), an organic electroluminescent display, and a scanning type display employing a digital light processing (DLP) or Micro Electro Mechanical Systems (MEMS) mirror.

In a case where a plurality of incidence diffraction elements are disposed at overlapping positions in the plane direction of the light guide plate, a display that displays a polychromic image using light components having wavelengths diffracted by the incidence diffraction elements is used.

In addition, in a case where a plurality of incidence diffraction elements are disposed at non-overlapping positions in the plane direction, a plurality of displays that emit monochromic images having wavelengths diffracted by the incidence diffraction element, respectively are used. In addition, in a case where a plurality of incidence diffraction elements are disposed at positions where they do not overlap each other in the plane direction, a configuration may be adopted in which light emitted from the display that displays a polychromic image is dispersed for each wavelength to be incident into the incidence diffraction element.

In the display element 12 used in the image display apparatus according to the embodiment of the present invention, the projection lens is also a well-known projection lens (collimating lens) used for AR glasses or the like.

Here, in the image display apparatus according to the embodiment of the present invention, a display image by the display element 12, that is, light to be emitted from the display element 12 is not limited and is preferably unpolarized light (natural light) or circularly polarized light.

In a case where the display element 12 emits circularly polarized light and the display emits an unpolarized light image, it is preferable that the display element 12 includes, for example, a circular polarization plate consisting of a linear polarizer and an λ/4 plate. In addition, in a case where the display emits a linearly polarized light image, it is preferable that the display element 12 includes, for example, a λ/4 plate.

The light to be emitted by the display element 12 may be another polarized light (for example, linearly polarized light).

[Light Guide Plate]

The light guide plate 16 is a well-known light guide plate that reflects light incident thereinto and guides (propagates) the reflected light.

As the light guide plate 16, various well-known light guide plates used for a backlight unit or the like of AR glasses or a liquid crystal display can be used without any particular limitation.

[Diffraction Element]

As the first A incidence diffraction element 17A, the first B incidence diffraction element 17B, the first A intermediate diffraction element 20A, the first B intermediate diffraction element 20B, the first A emission diffraction element 23A, the first B emission diffraction element 23B, the second A incidence diffraction element 18A, the second B incidence diffraction element 18B, the second A intermediate diffraction element 21A, the second B intermediate diffraction element 21B, the second A emission diffraction element 24A, the second B emission diffraction element 24B, the third A incidence diffraction element 19A, the third B incidence diffraction element 19B, the third A intermediate diffraction element 22A, the third B intermediate diffraction element 22B, the third A emission diffraction element 25A, and the third B emission diffraction element 25B, various diffraction elements can be used. In the following description, in a case where these diffraction elements do not need to be distinguished from each other, they will also be collectively referred to as "diffraction element".

It is preferable that each of the diffraction elements is any one of a volume hologram type diffraction element or a polarization diffraction element.

It is preferable that the polarization diffraction element is a liquid crystal diffraction element that is formed of a composition including a liquid crystal compound. In addition, it is also preferable that the liquid crystal diffraction element includes a cholesteric liquid crystal layer obtained by immobilizing a cholesteric liquid crystalline phase.

[Volume Hologram Type Diffraction Element]

Figure 16:
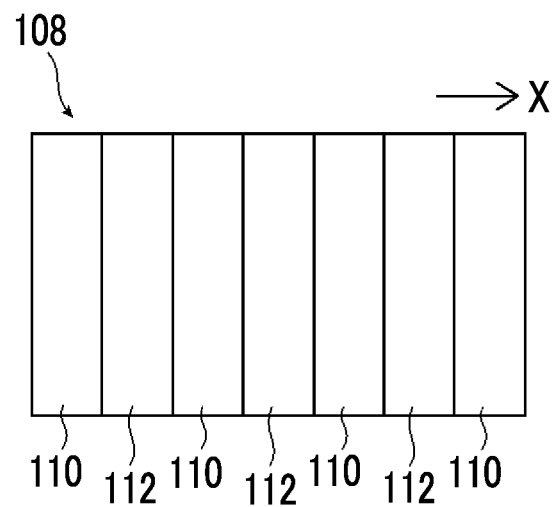
FIG. 16 is a front view conceptually showing a volume hologram type diffraction element.

As the volume hologram type diffraction element, a well-known volume hologram type diffraction element can be used. As shown in FIG. 16 as an example, a volume hologram type diffraction element 108 is configured such that a linear region 110 having a high refractive index and a linear region 112 having a low refractive index are alternately arranged in parallel at predetermined periods. The period of the diffraction structure, the material thereof, the refractive index of each of the regions, and the like may be appropriately set depending on the wavelength range where light is diffracted.

In the volume hologram type diffraction element, the structure in which the linear region 110 having a high refractive index and the linear region 112 having a low refractive index are alternately formed is the diffraction structure, the period of the arrangement of the region 110 and the region 112 is the period of the diffraction structure, and the arrangement direction of the region 110 and the region 112 indicated by arrow X in FIG. 16 is the periodic direction of the diffraction structure.

[Polarization Diffraction Element]

As the polarization diffraction element, a well-known polarization diffraction element can be used. The polarization diffraction element is a diffraction element that controls a diffraction direction or a polarized state of emitted light and a diffracted light intensity depending on the polarized state of incident light by controlling the polarized state in a fine region. Examples of the polarization diffraction element include a polarization diffraction element in which a diffraction structure is formed using structural birefringence described in "Erez Hasman et al., Polarization dependent focusing lens by use of quantized Pancharatnm-Berry phase diffractive optics, Applied Physics Letters, Volume 82, Number 3, pp. 328-330" and a polarization diffraction element in which a diffraction structure is formed using a birefringence material described in JP5276847B.

Examples of the polarization diffraction element include a liquid crystal diffraction element that is formed using a composition including a liquid crystal compound and has a liquid crystal alignment pattern in which a direction of an optical axis derived from the liquid crystal compound changes while continuously rotating in at least one in-plane direction.

(Liquid Crystal Diffraction Element A)

Figure 17:
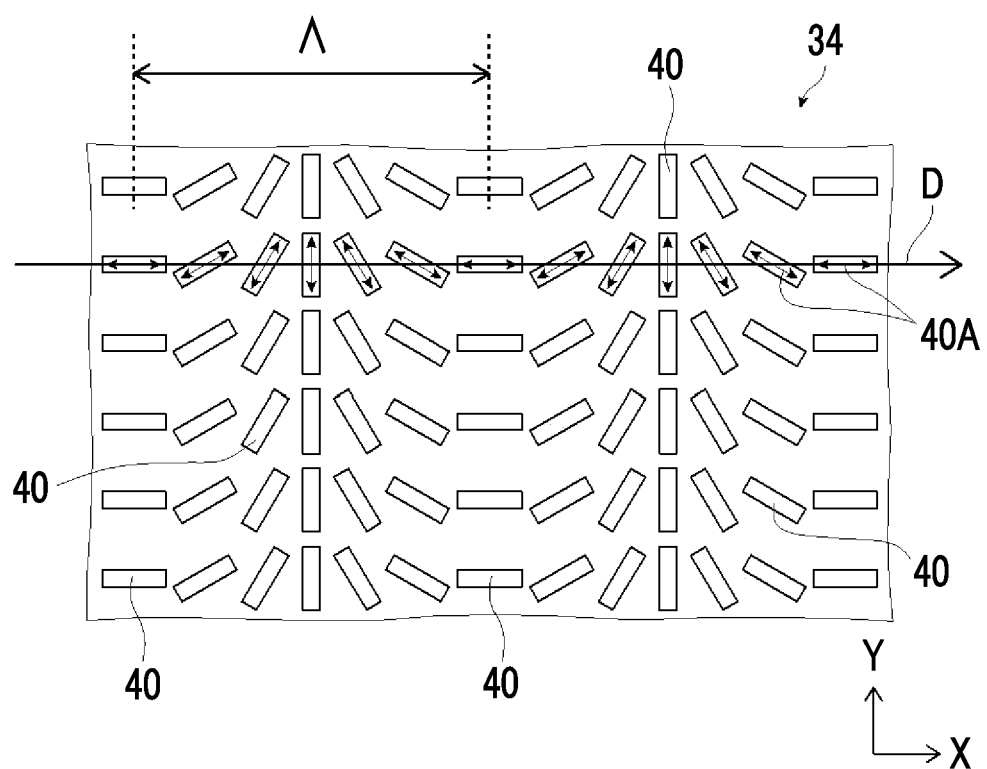
FIG. 17 is a plan view conceptually showing a liquid crystal layer used as a diffraction element.
Figure 18:
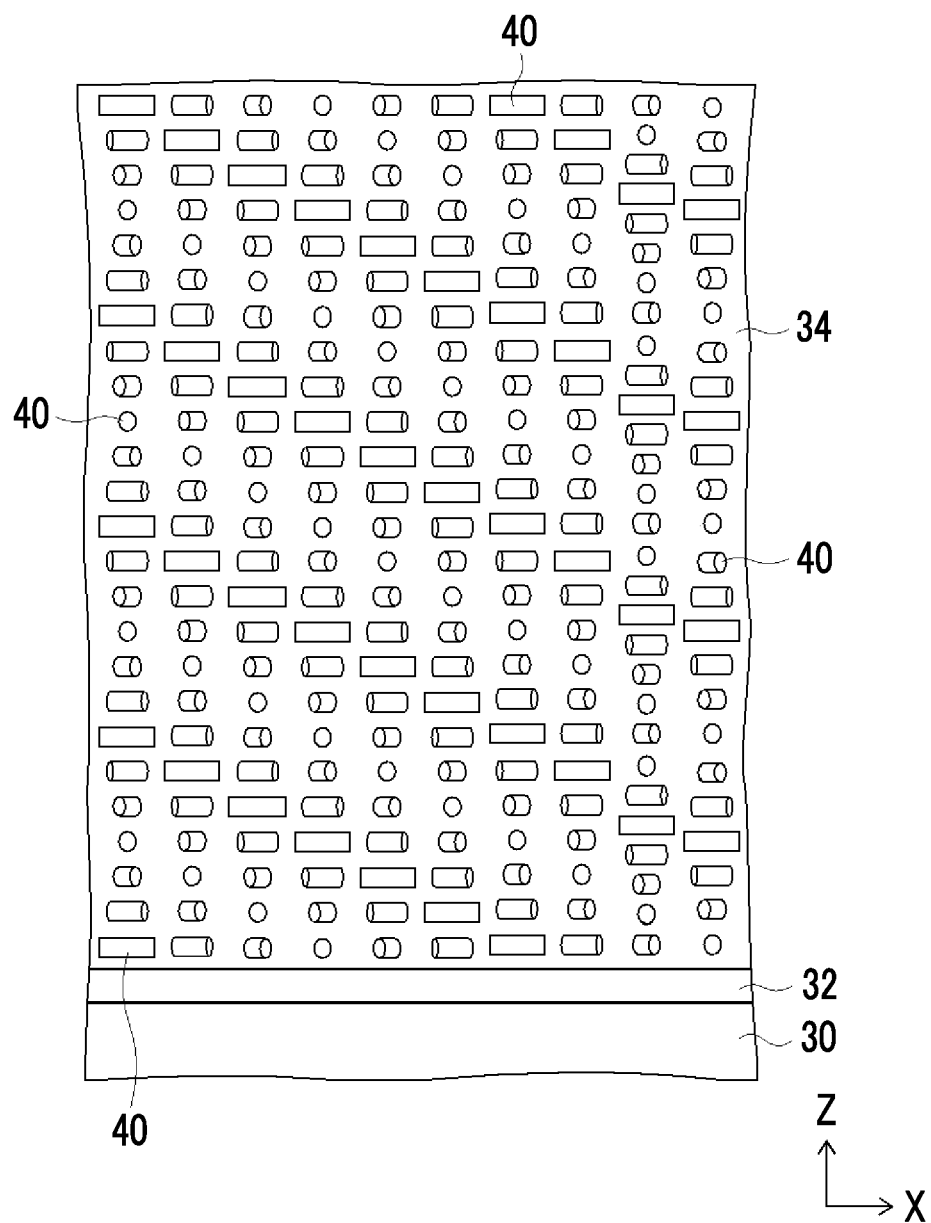
FIG. 18 is a cross-sectional view showing the liquid crystal layer shown in FIG. 17.

The liquid crystal diffraction element will be described using FIGS. 17 to 19. FIG. 17 is a schematic diagram showing an alignment state of a liquid crystal compound in a plane of a main surface of a liquid crystal layer 34. In addition, FIG. 18 is a schematic cross-sectional view showing a state of a liquid crystal phase in a cross-section perpendicular to the main surface. In the following description, it is assumed that a main surface of the liquid crystal layer 34 is an X-Y plane and a cross-section perpendicular to the X-Y plane is a X-Z plane. That is, FIG. 17 corresponds to a schematic diagram of the X-Y plane of the liquid crystal layer 34, and FIG. 18 corresponds to a schematic diagram of the X-Z plane of the liquid crystal layer 34.

In the example shown in FIG. 18, the diffraction element includes a support 30, an alignment film 32, and the liquid crystal layer 34.

The liquid crystal layer shown in FIGS. 17 and 18 is an example of a cholesteric liquid crystal layer obtained by cholesteric alignment of a liquid crystal compound. In addition, the liquid crystal compound is an example of a rod-like liquid crystal compound.

In the example shown in FIG. 18, the liquid crystal diffraction element includes the support 30, the alignment film 32, and the liquid crystal layer 34.

In the example shown in FIG. 18, the liquid crystal diffraction element includes the support 30, the alignment film 32, and the liquid crystal layer 34. However, the present invention is not limited to this configuration. The liquid crystal diffraction element may include only the alignment film 32 and the liquid crystal layer 34 by peeling off the support 30 after bonding the laminate to the light guide plate 16. Alternatively, the liquid crystal diffraction element may include only the liquid crystal layer 34 by peeling off the support 30 and the alignment film 32 after bonding the laminate to the light guide plate 16.

<Support>

The support 30 supports the alignment film 32 and the liquid crystal layer 34.

As the support 30, various sheet-shaped materials (films or plate-shaped materials) can be used as long as they can support the alignment film 32 and the liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the alignment film 32 and the liquid crystal layer 34 can be supported.

The thickness of the support 30 is preferably 1 to 2000 μm, more preferably 3 to 500 μm, and still more preferably 5 to 250 μm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

In the liquid crystal diffraction element, the alignment film 32 is formed on a surface of the support 30.

The alignment film 32 is an alignment film for aligning the liquid crystal compound 40 to a predetermined liquid crystal alignment pattern during the formation of the liquid crystal layer 34.

Although described below, in the present invention, the liquid crystal layer 34 has a liquid crystal alignment pattern in which a direction of an optical axis 40A (refer to FIG. 17) derived from the liquid crystal compound 40 changes while continuously rotating in one in-plane direction. Accordingly, the alignment film 32 is formed such that the liquid crystal layer 34 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film 32 such as JP2005-97377A, JP2005-99228A, and JP2005-128503A is preferable.

In the liquid crystal diffraction element 29, the alignment film 32 can be suitably used as a so-called photo-alignment film obtained by irradiating a photo-alignment material with polarized light or non-polarized light. That is, in the liquid crystal diffraction element 29, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 23:
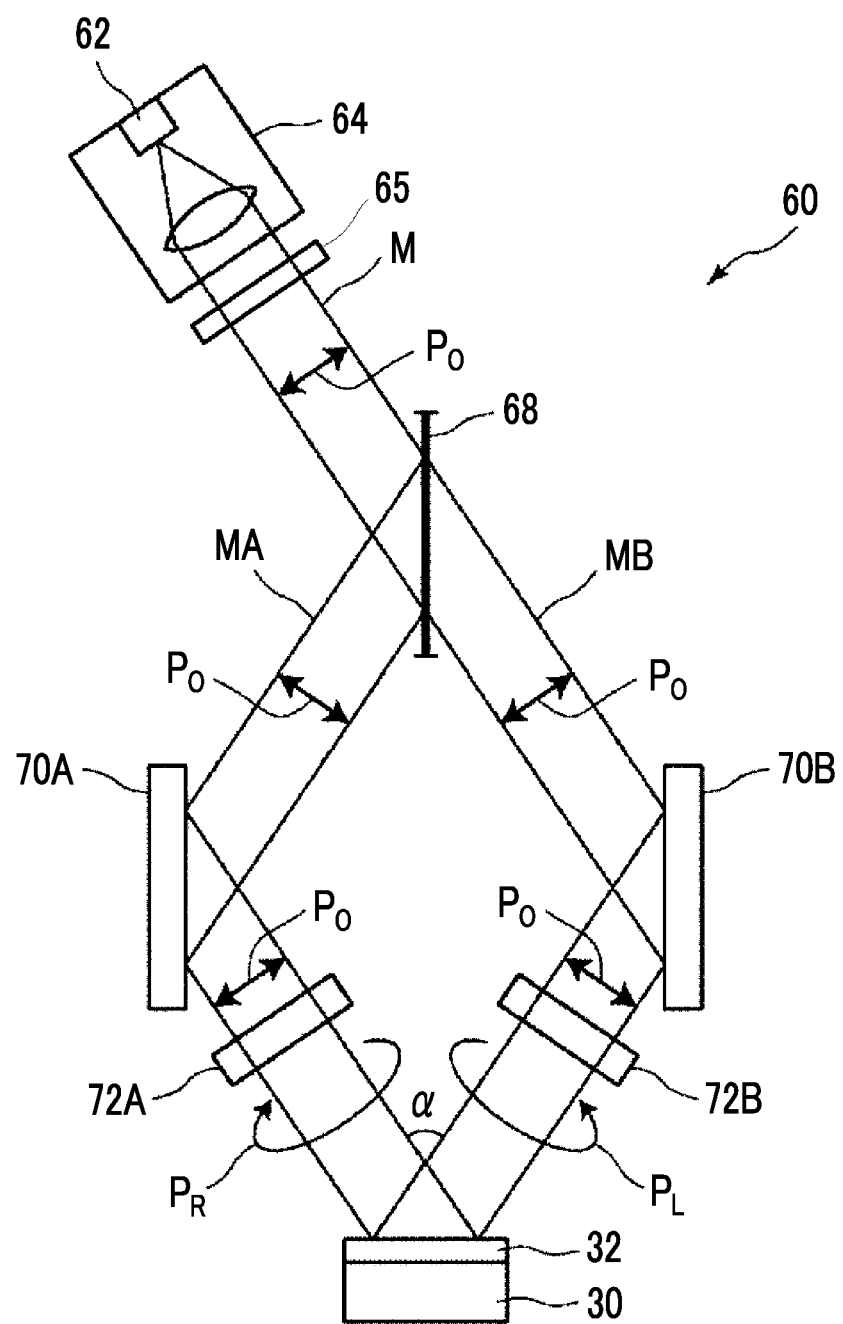
FIG. 23 is a conceptual diagram showing an example of an exposure device that exposes an alignment film.

FIG. 23 conceptually shows an example of an exposure device that exposes the alignment film 32 to form an alignment pattern.

An exposure device 60 shown in FIG. 23 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarized state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound is aligned such that the direction of the optical axis of the liquid crystal compound in the liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, the liquid crystal layer has the liquid crystal alignment pattern in which the direction of the optical axis 40A derived from the liquid crystal compound 40 changes while continuously rotating in at least one in-plane direction. That is, in the present invention, the support 30 may be made to function as the alignment film.

<Liquid Crystal Layer>

In the liquid crystal diffraction element, the liquid crystal layer 34 is formed on a surface of the alignment film 32.

As described above, the liquid crystal layer is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 18, the liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch, and plural pitches of the helically turned liquid crystal compound 40 are laminated.

As is well-known, the cholesteric liquid crystal layer obtained by immobilizing a cholesteric liquid crystalline phase has wavelength-selective reflectivity.

Although described below in detail, the selective reflection wavelength range of the cholesteric liquid crystal layer depends on the length (pitch P shown in FIG. 19) of one helical pitch described above.

Accordingly, the diffraction element including the liquid crystal layer has wavelength selectivity and diffracts light having a predetermined wavelength. Accordingly, regarding the wavelength of light that is reflected (diffracted) by the diffraction element, the selective reflection wavelength range of the liquid crystal layer may be appropriately set by adjusting the helical pitch P of the liquid crystal layer.

As shown in FIG. 17, in the X-Y plane of the liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 17, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length A of the single period in the liquid crystal alignment pattern.

That is, a distance between centers of two liquid crystal compounds 40 in the arrangement axis D direction is the length A of the single period, the two liquid crystal compounds having the same angle in the arrangement axis D direction. Specifically, as shown in FIG. 17, a distance between centers in the arrangement axis D direction of two liquid crystal compounds 40 in which the arrangement axis D direction and the direction of the optical axis 40A match each other is the length A of the single period. In the following description, the length A of the single period will also be referred to as "single period A".

In the liquid crystal alignment pattern of the liquid crystal layer 34, the single period A is repeated in the arrangement axis D direction, that is, in the one in-plane direction in which the direction of the optical axis 40A changes while continuously rotating.

On the other hand, in the liquid crystal compound 40 forming the liquid crystal layer 34, the directions of the optical axes 40A are the same in the direction (in FIG. 17, the Y direction) perpendicular to the arrangement axis D direction, that is, the Y direction perpendicular to the one in-plane direction in which the optical axis 40A continuously rotates.

In other words, in the liquid crystal compound 40 forming the liquid crystal layer 34, angles between the optical axes 40A of the liquid crystal compound 40 and the arrow X direction are the same in the Y direction.

Figure 19:
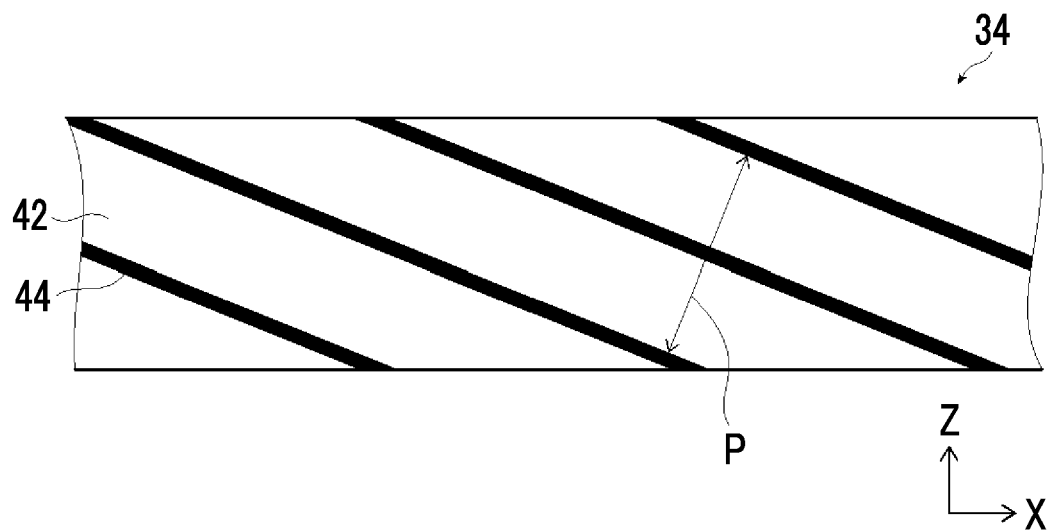
FIG. 19 is a diagram conceptually showing a cross-sectional scanning electron microscopic (SEM) image of the liquid crystal layer shown in FIG. 17.

In a case where the X-Z plane of the liquid crystal layer 34 shown in FIG. 18 is observed with a scanning electron microscope (SEM), an arrangement direction in which bright portions 42 and dark portions 44 are alternately arranged as shown in FIG. 19, a stripe pattern tilted at a predetermined angle with respect to the main surface (X-Y plane) is observed. In this SEM cross-section, an interval between the bright portions 42 adjacent to each other or between the dark portions 44 adjacent to each other in a normal direction of lines formed by the bright portions 42 or the dark portions 44 corresponds to a ½ pitch. That is, as indicated by P in FIG. 19, two bright portions 42 and two dark portions 44 correspond to one helical pitch (one helical turn).

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

Figure 20:
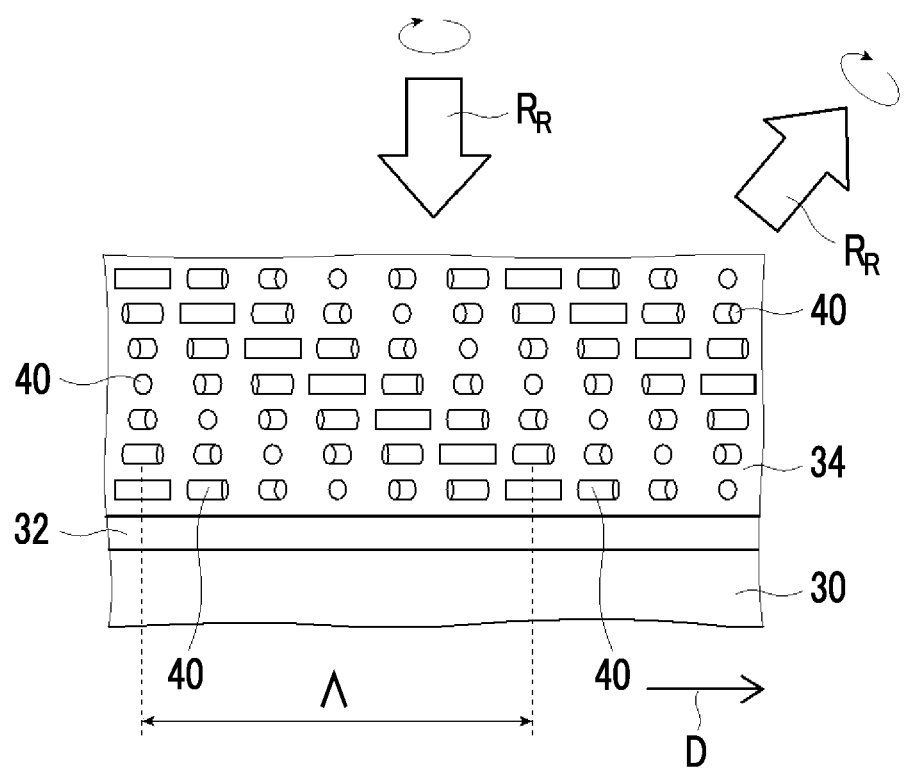
FIG. 20 is a conceptual diagram showing an action of the liquid crystal layer shown in FIG. 17.

On the other hand, the liquid crystal layer 34 reflects incident light in a state where it is tilted in the arrangement axis D direction with respect to the specular reflection. The liquid crystal layer 34 has the liquid crystal alignment pattern in which the optical axis 40A changes while continuously rotating in the arrangement axis D direction in a plane (the predetermined one in-plane direction). Hereinafter, the description will be made with reference to FIG. 20.

For example, it is assumed that the liquid crystal layer 34 is a cholesteric liquid crystal layer that selectively reflects right circularly polarized light $R_R$ of red light. Accordingly, in a case where light is incident into the liquid crystal layer 34, the liquid crystal layer 34 reflects only right circularly polarized light $R_R$ of red light and allows transmission of the other light.

Here, in the liquid crystal layer 34, the optical axis 40A of the liquid crystal compound 40 changes while rotating in the arrangement axis D direction (the one in-plane direction). The liquid crystal alignment pattern formed in the liquid crystal layer 34 is a pattern that is periodic in the arrangement axis D direction. Therefore, as conceptually shown in FIG. 20, the right circularly polarized light $R_R$ of red light incident into the liquid crystal layer 34 is reflected (diffracted) in a direction corresponding to the period of the liquid crystal alignment pattern, and the reflected right circularly polarized light $R_R$ of red light is reflected (diffracted) in a direction tilted with respect to the XY plane (the main surface of the cholesteric liquid crystal layer) in the arrangement axis D direction.

As a result, in a case where the liquid crystal layer 34 is applied to a light guide element or the like, the liquid crystal layer 34 can be used as a diffraction element in which light incident from a direction perpendicular to the main surface of the light guide plate can be reflected (diffracted) at an angle at which total reflection occurs in the light guide plate and the light guided in the light guide plate by total reflection can be reflected (diffracted) in a direction perpendicular to the main surface of the light guide plate.

In the liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 17 and 18, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

In the liquid crystal layer, the length over which the optical axis of the liquid crystal compound rotates by 180° in the liquid crystal alignment pattern of the liquid crystal compound is the single period Λ of the diffraction structure, and the one in-plane direction (arrangement axis D direction) in which the optical axis of the liquid crystal compound changes while rotating is the periodic direction of the diffraction structure.

In the liquid crystal layer having the liquid crystal alignment pattern, as the single period Λ decreases, the angle of reflected light with respect to the incidence light increases. That is, as the single period Λ decreases, reflected light can be reflected in a state where it is largely tilted with respect to incidence light.

Here, a case where the liquid crystal diffraction element is used as a diffraction element will be described. In this case, as described above, in a case where the wavelength of light diffracted by the first A incidence diffraction element 17A, the first B incidence diffraction element 17B, the first A intermediate diffraction element 20A, the first B intermediate diffraction element 20B, the first A emission diffraction element 23A, and the first B emission diffraction element 23B is represented by the wavelength of light diffracted by the second A incidence diffraction element 18A, the second B incidence diffraction element 18B, the second A intermediate diffraction element 21A, the second B intermediate diffraction element 21B, the second A emission diffraction element 24A, and the second B emission diffraction element 24B is represented by $\lambda_2$, and the wavelength of light diffracted by the third A incidence diffraction element 19A, the third B incidence diffraction element 19B, the third A intermediate diffraction element 22A, the third B intermediate diffraction element 22B, the third A emission diffraction element 25A, and the third B emission diffraction element 25B is represented by $\lambda_3$, in order to satisfy $\lambda_1 > \lambda_2 > \lambda_3$, it is preferable that, in a case where a pitch of a helical structure of the liquid crystal layer in the first A incidence diffraction element 17A and the first B incidence diffraction element 17B is represented by $P_{in1}$, a pitch of a helical structure of the liquid crystal layer in the second A incidence diffraction element 18A and the second B incidence diffraction element 18B is represented by $P_{in2}$, and a pitch of a helical structure of the liquid crystal layer in the third A incidence diffraction element 19A and the third B incidence diffraction element 19B is represented by $P_{in3}$, $P_{in1} < P_{in2} < P_{in3}$ is satisfied. In addition, in a case where a pitch of a helical structure of the liquid crystal layer in the first A intermediate diffraction element 20A and the first B intermediate diffraction element 20B is represented by $P_{mid1}$, a pitch of a helical structure of the liquid crystal layer in the second A intermediate diffraction element 21A and the second B intermediate diffraction element 21B is represented by $P_{mid2}$, and a pitch of a helical structure of the liquid crystal layer in the third A intermediate diffraction element 22A and the third B intermediate diffraction element 22B is represented by $P_{mid3}$, it is preferable that $P_{mid1} < P_{mid2} < P_{mid3}$ is satisfied. In addition, in a case where a pitch of a helical structure of the liquid crystal layer in the first A emission diffraction element 23A and the first B emission diffraction element 23B is represented by $P_{out1}$, a pitch of a helical structure of the liquid crystal layer in the second A emission diffraction element 24A and the second B emission diffraction element 24B is represented by $P_{out2}$, and a pitch of a helical structure of the liquid crystal layer in the third A emission diffraction element 25A and the third B emission diffraction element 25B is represented by $P_{out3}$, it is preferable that $P_{out1} < P_{out2} < P_{out3}$ is satisfied.

In addition, as described above, the liquid crystal diffraction element including the liquid crystal layer has circularly polarized light selectivity in which right circularly polarized light or left circularly polarized light is selectively reflected depending on the helically twisted rotation direction of the cholesteric liquid crystalline phase. In a case where the liquid crystal diffraction element is used as a diffraction element, in the first A emission diffraction element 23A, the second A emission diffraction element 24A, the first B emission diffraction element 23B, and the second B emission diffraction element 24B, the helically twisted rotation directions of the cholesteric liquid crystalline phases may be the same as each other. Alternatively, the helically twisted rotation direction of the cholesteric liquid crystalline phase in at least one different element may be different from that of the other diffraction elements. That is, the turning directions of circularly polarized light to be reflected may be the same as or different from each other. Likewise, in the third A emission diffraction element 25A, the second A emission diffraction element 24A, the third B emission diffraction element 25B, and the second B emission diffraction element 24B, the helically twisted rotation directions of the cholesteric liquid crystalline phases may be the same as each other. Alternatively, the helically twisted rotation direction of the cholesteric liquid crystalline phase in at least one incidence different element may be different from that of at least one emission diffraction element. From the viewpoint that the occurrence of multiple images can be more suitably suppressed, it is preferable that, in at least one of the first A emission diffraction element 23A, the second A emission diffraction element 24A, the first B emission diffraction element 23B, and the second B emission diffraction element 24B, the helically rotation direction of the cholesteric liquid crystalline phase is different from those of the other diffraction elements. Likewise, it is preferable that, in at least one of the third A emission diffraction element 25A, the second A emission diffraction element 24A, the third B emission diffraction element 25B, and the second B emission diffraction element 24B, the helically rotation direction of the cholesteric liquid crystalline phase is different from those of the other diffraction elements.

In addition, in the first A incidence diffraction element 17A, the first A emission diffraction element 23A, the first B incidence diffraction element 17B, and the first B emission diffraction element 23B, the helically twisted rotation directions of the cholesteric liquid crystalline phases may be the same as or different from each other. That is, the turning direction of circular polarization emitted from the display elements 12 to the first A incidence diffraction element 17A may be the same as or different from the turning direction of circular polarization emitted from the display elements 12 to the first B incidence diffraction element 17B. In addition, in the second A incidence diffraction element 18A, the second A emission diffraction element 24A, the second B incidence diffraction element 18B, and the second B emission diffraction element 24B, the helically twisted rotation directions of the cholesteric liquid crystalline phases may be the same as or different from each other. In addition, in the third A incidence diffraction element 19A, the third A emission diffraction element 25A, the third B incidence diffraction element 19B, and the third B emission diffraction element 25B, the helically twisted rotation directions of the cholesteric liquid crystalline phases may be the same as or different from each other.

Here, the example shown in FIG. 18 shows the configuration in which, on the X-Z plane of the liquid crystal layer 34, the optical axis 40A of the liquid crystal compound 40 is aligned to be parallel to the main surface (X-Y plane). However, the present invention is not limited to this configuration. For example, as shown in FIG. 21, a configuration in which, on the X-Z plane of the liquid crystal layer 34, the optical axes 40A of the liquid crystal compound 40 is aligned to be tilted with respect to the main surface (X-Y plane) may be adopted.

Figure 21:
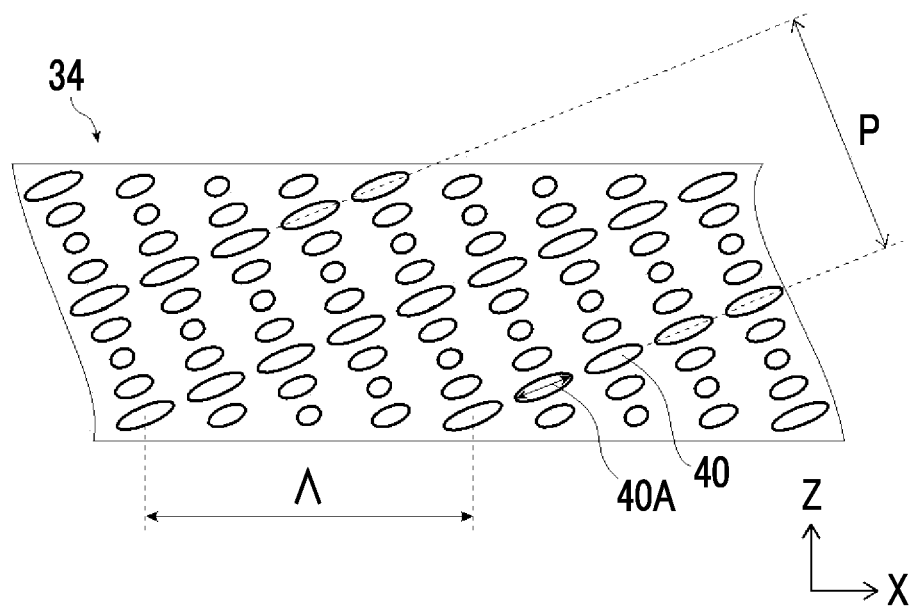
FIG. 21 is a diagram conceptually showing another example of the liquid crystal layer used as a diffraction element.

In addition, the example shown in FIG. 21 shows the configuration in which, on the X-Z plane of the liquid crystal layer 34, the tilt angle of the liquid crystal compound 40 with respect to the main surface (X-Y plane) is uniform in the thickness direction (Z direction). However, the present invention is not limited to this configuration. In the liquid crystal layer 34, a region where the tilt angle of the liquid crystal compound 40 varies in the thickness direction may be provided.

Figure 22:
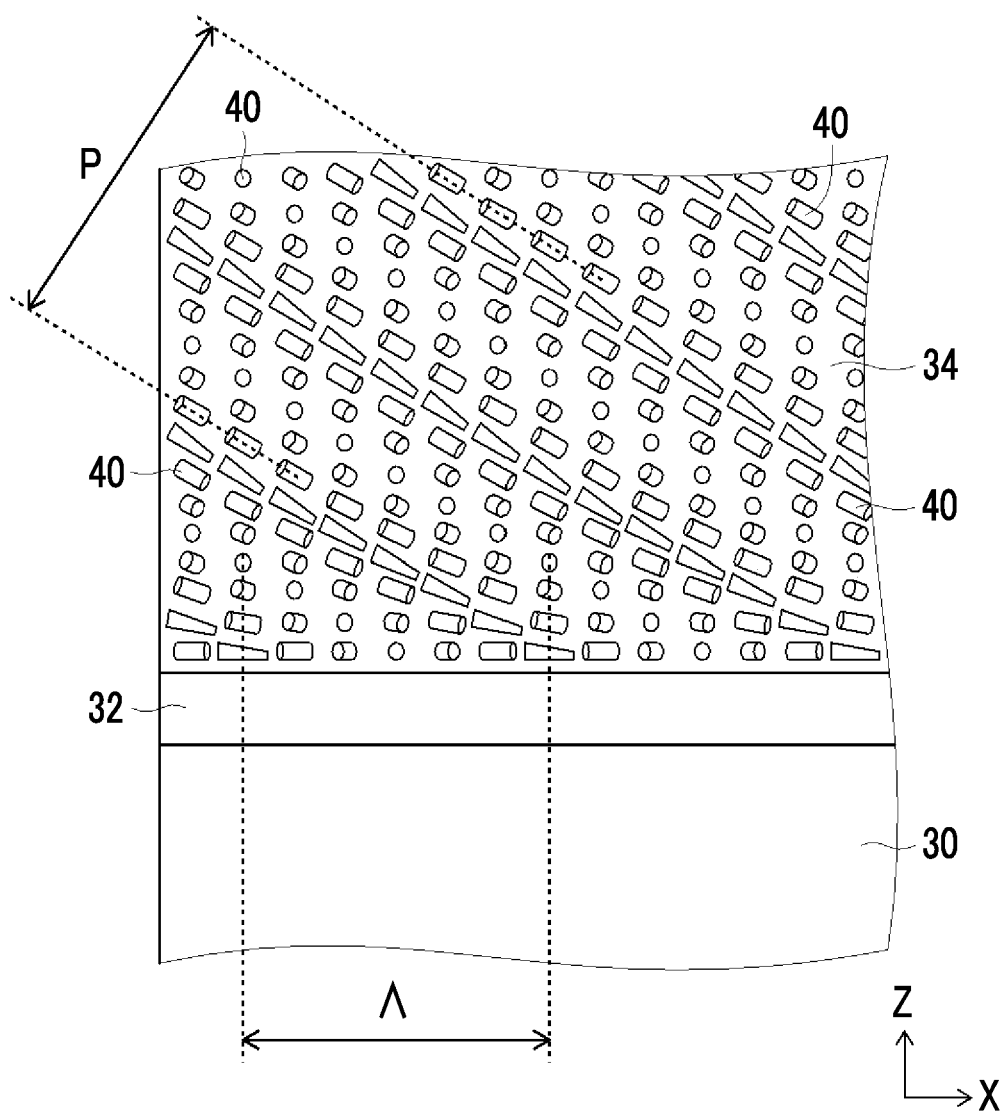
FIG. 22 is a diagram conceptually showing another example of the liquid crystal layer used as a diffraction element.

For example, in an example shown in FIG. 22, the optical axis 40A of the liquid crystal compound 40 at an interface of the liquid crystal layer on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface).

This way, the liquid crystal layer may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the liquid crystal layer 34 with a polarization microscope. In particular, it is preferable that, on the X-Z plane of the liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the diffraction element (liquid crystal layer) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is desirable that the tilt angle is controlled by treating the interface of the liquid crystal layer. By pretilting the alignment film on the support side interface, the tilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, in a cross-section of the liquid crystal layer observed with a SEM, the bright portions and the dark portions derived from a cholesteric liquid crystalline phase are tilted with respect to the main surface. In the liquid crystal layer, it is preferable that, in a case where an in-plane retardation Re is measured from a direction tilted with respect to a normal direction and a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

<<Method of Forming Liquid Crystal Layer>>

The liquid crystal layer can be formed by immobilizing a liquid crystal phase in a layer shape, the liquid crystal phase obtained by aligning a liquid crystal compound in a predetermined alignment state. For example, the cholesteric liquid crystal layer can be formed by immobilizing a cholesteric liquid crystalline phase in a layer shape.

The structure in which a liquid crystal phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

—Polymerizable Liquid Crystal Compound—

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. These crosslinking agents, may be used alone or in combination of two or more kinds.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. These organic solvents may be used alone or in combination of two or more kinds. Among these, a ketone is preferable in consideration of an environmental burden.

In a case where the liquid crystal layer is formed, it is preferable that the liquid crystal layer is formed by applying the liquid crystal composition to a surface where the liquid crystal layer is to be formed, aligning the liquid crystal compound to a state of a desired liquid crystal phase, and curing the liquid crystal compound.

That is, in a case where the cholesteric liquid crystal layer is formed on the alignment film 32, it is preferable that the liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 mJ/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the liquid crystal layer is not particularly limited, and the thickness with which a required light reflectivity can be obtained may be appropriately set depending on the use of the diffraction element, the light reflectivity required for the liquid crystal layer, the material for forming the liquid crystal layer, and the like.

(Liquid Crystal Diffraction Element B)

In the above-described example, the liquid crystal layer obtained by cholesteric alignment of the liquid crystal compound is used as the liquid crystal diffraction element. Various liquid crystal diffraction elements can be used as the liquid crystal diffraction element used in the present invention as long as they have the liquid crystal alignment pattern in which the optical axis 40A derived from the liquid crystal compound 40 continuously rotates in at least one in-plane direction.

In the present invention, a liquid crystal diffraction element that has the liquid crystal alignment pattern where the optical axis continuously rotates in at least one in-plane direction and in which the liquid crystal compound does not form a cholesteric liquid crystalline phase in the thickness direction can also be used. The liquid crystal diffraction element may have a configuration in which the liquid crystal compound is helically twisted and rotates in the thickness direction to some extent that a cholesteric liquid crystalline phase is not formed.

Figure 24:
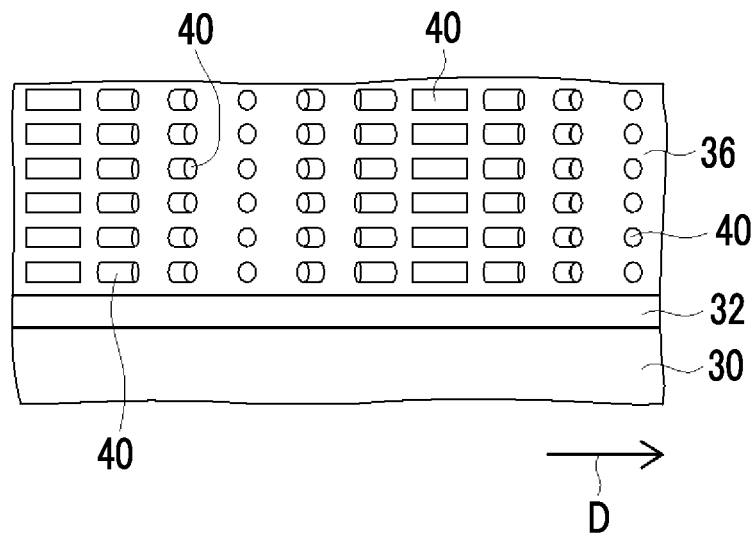
FIG. 24 is a diagram conceptually showing another example of the liquid crystal layer used as a diffraction element.
Figure 25:
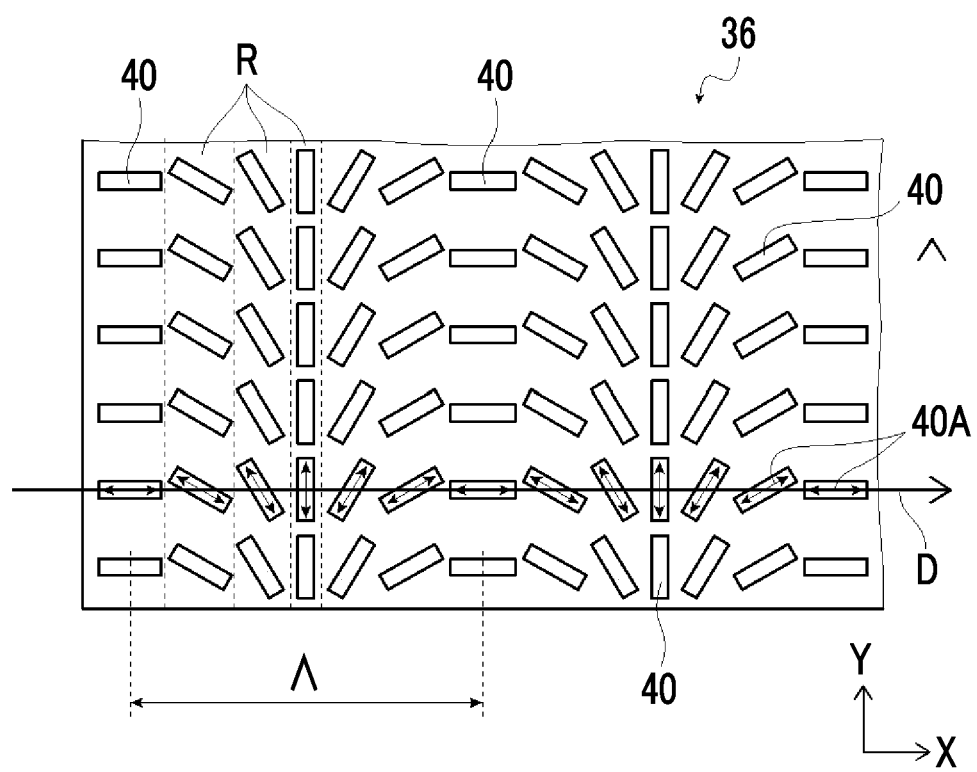
FIG. 25 is a plan view showing the liquid crystal layer shown in FIG. 24.

FIGS. 24 and 25 show an example of another liquid crystal diffraction element.

A liquid crystal diffraction element shown in FIGS. 24 and 25 includes the support 30, the alignment film 32, and a liquid crystal layer 36.

As in the liquid crystal layer 34, the liquid crystal layer 36 of the liquid crystal diffraction element shown in FIG. 25 also has the liquid crystal alignment pattern in which the optical axis 40A of the liquid crystal compound 40 continuously rotates in the arrow $\lambda_1$ direction. FIG. 25 also shows only the liquid crystal compound of the surface of the alignment film 32 as in FIG. 17.

In the liquid crystal diffraction element shown in FIG. 24, the liquid crystal compound 40 forming the liquid crystal layer 36 is not helically twisted and does not rotate in the thickness direction, and the optical axis 40A is positioned at the same position in the plane direction. The liquid crystal layer can be formed by adding a chiral agent to a liquid crystal composition during the formation of the liquid crystal layer.

As described above, the liquid crystal layer 36 has the liquid crystal alignment pattern in which the direction of the optical axis 40A derived from the liquid crystal compound 40 changes while continuously rotating in the arrow X direction in a plane, that is, in the one in-plane direction indicated by arrow X.

On the other hand, regarding the liquid crystal compound 40 forming the liquid crystal layer 36, the liquid crystal compounds 40 having the same direction of the optical axes 40A are arranged at regular intervals in the Y direction perpendicular to the arrow $\lambda_1$ direction, that is, the Y direction perpendicular to the one in-plane direction in which the optical axis 40A continuously rotates.

In other words, regarding the liquid crystal compound 40 forming the liquid crystal layer 36, in the liquid crystal compounds 40 arranged in the Y direction, angles between the directions of the optical axes 40A and the arrow $\lambda_1$ direction are the same.

In the liquid crystal compounds arranged in the Y direction in the liquid crystal layer 36, the angles between the optical axes 40A and the arrow X direction (the one in-plane direction in which the direction of the optical axis of the liquid crystal compound 40 rotates) are the same. Regions where the liquid crystal compounds 40 in which the angles between the optical axes 40A and the arrow X direction are the same are disposed in the Y direction will be referred to as "regions R".

In this case, it is preferable that an in-plane retardation (Re) value of each of the regions R is a half wavelength, that is, $\lambda/2$. The in-plane retardation is calculated from the product of a difference $\Lambda n$ in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference $\Lambda n$ in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference $\Lambda n$ in refractive index is the same as the difference in refractive index of the liquid crystal compound 40.

In a case where circularly polarized light is incident into the above-described liquid crystal layer 36, the light is refracted such that the direction of the circularly polarized light is converted.

Figure 26:
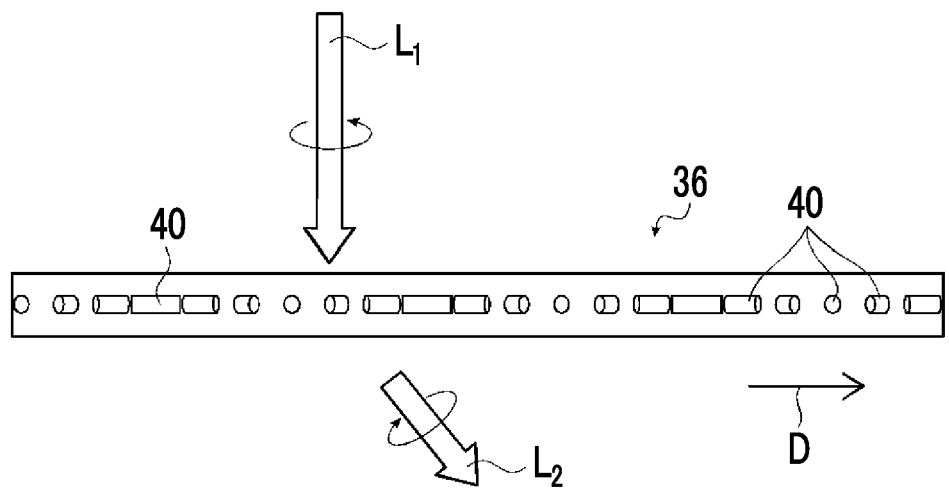
FIG. 26 is a conceptual diagram showing an action of the liquid crystal layer shown in FIG. 24.
Figure 27:
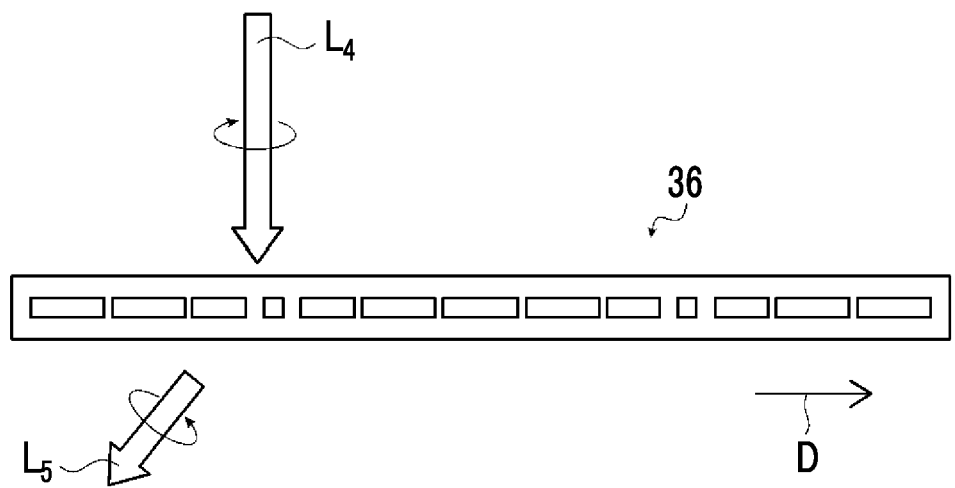
FIG. 27 is a conceptual diagram showing the action of the liquid crystal layer shown in FIG. 24.

This action is conceptually shown in FIGS. 26 and 27. In the liquid crystal layer 36, the value of the product of the difference in refractive index of the liquid crystal compound and the thickness of the optically-anisotropic layer is $\lambda/2$.

As shown in FIG. 26, in a case where the value of the product of the difference in refractive index of the liquid crystal compound in the liquid crystal layer 36 and the thickness of the optically-anisotropic layer is $\lambda/2$ and incidence light $L_1$ as left circularly polarized light is incident into the liquid crystal layer 36, the incidence light $L_1$ transmits through the liquid crystal layer 36 to be imparted with a phase difference of 180°, and the transmitted light $L_2$ is converted into right circularly polarized light.

In addition, the liquid crystal alignment pattern formed in the liquid crystal layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 27, in a case where the value of the product of the difference in refractive index of the liquid crystal compound in the liquid crystal layer 36 and the thickness of the optically-anisotropic layer is $\lambda/2$ and incidence light $L_4$ of right circularly polarized light is incident into the liquid crystal layer 36, the incidence light $L_4$ transmits through the liquid crystal layer 36 to be imparted with a phase difference of 180°, and the transmitted light $L_4$ is converted into transmitted light $L_5$ of left circularly polarized light.

In addition, the liquid crystal alignment pattern formed in the liquid crystal layer 36 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrangement axis D direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

As in the liquid crystal layer 34, by changing the single period A of the liquid crystal alignment pattern formed in the liquid crystal layer 36, refraction angles of the transmitted light components $L_2$ and $L_5$ can be adjusted. Specifically, even in the liquid crystal layer 36, as the single period A of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrow D direction, the refraction direction of transmitted light can be reversed. That is, in the example FIGS. 24 to 27, the rotation direction of the optical axis 40A toward the arrow D direction is clockwise. By setting this rotation direction to be counterclockwise, the refraction direction of transmitted light can be reversed.

From the viewpoint of diffraction efficiency, even in a case where the liquid crystal diffraction element that allows transmission of incidence light and diffracts incidence light is used, it is preferable to use a liquid crystal diffraction element having a region where the liquid crystal compound is twisted and rotates (the twisted angle is less than 360°). In particular, in a case where light is diffracted at an angle where total reflection occurs in the light guide plate, from the viewpoint of diffraction efficiency, a liquid crystal diffraction element including a region in which a liquid crystal compound is twisted and rotates can be suitably used. In addition, from the viewpoint of diffraction efficiency, it is preferable to use a laminate in which liquid crystal diffraction elements having different angles at which the liquid crystal compound is twisted and rotates is laminated, or it is preferable to use a laminate in which liquid crystal diffraction elements having different directions in which the liquid crystal compound is twisted and rotates are laminated.

In the light guide element according to the embodiment of the present invention, any one of a volume hologram type diffraction element, or a polarization diffraction element may be used as each of the diffraction elements. In addition, different kinds of diffraction elements may be used in combination. For example, a volume hologram type diffraction element may be used as the incidence diffraction element, and a polarization diffraction element (liquid crystal diffraction element) may be used as the intermediate diffraction element and the emission diffraction element. For example, different kinds of diffraction elements may also be used as the first A incidence diffraction element and the second A incidence diffraction element. Likewise, different kinds of diffraction elements may be used as the first A intermediate diffraction element, the second A intermediate diffraction element, the first A emission diffraction element, and the second A emission diffraction element.

In order to improve visibility for the light guide element and the image display apparatus according to the embodiment of the present invention, a diffractive optical method of enlarging an exit pupil may be used.

Specifically, a diffractive optical method of using a plurality of diffraction components (diffraction elements), that is, an optical method of using in-coupling, intermediate and out-coupling diffractive elements can be used. This method is described in detail in JP2008-546020A.

Hereinabove, the light guide element and the image display apparatus according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1-1

<Preparation of Incidence Diffraction Element G>
(Formation of Alignment Film)

A glass substrate was prepared as the support. The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

| Coating Liquid for Forming Alignment Film | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

-Material for Photo-Alignment-

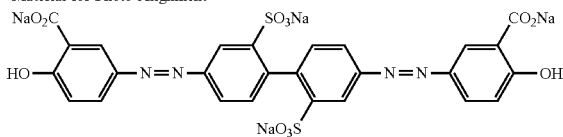

(Exposure of Alignment Film)

The alignment film was exposed using the exposure device shown in FIG. 23 to form an alignment film P-1 having an alignment pattern.

In the exposure device, a laser that emits laser light having a wavelength (325 nm) was used as the laser. The exposure amount of the interference light was 1000 mJ/cm². The single period (the length over which the optical axis rotates by 180°) of an alignment pattern formed by interference of two laser beams was controlled by changing an intersecting angle (intersecting angle α) between the two beams.

(Formation of Liquid Crystal Layer)

As the liquid crystal composition forming the first incidence diffraction element G, the following composition A-1 was prepared. This composition A-1 is a liquid crystal composition forming a cholesteric liquid crystal layer (cholesteric liquid crystalline phase) that reflects right circularly polarized light.

| Composition A-1 | |
|---|---|
| Rod-like liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 5.27 parts by mass |
| Methyl ethyl ketone | 204.00 parts by mass |

Rod-Like Liquid Crystal Compound L-1

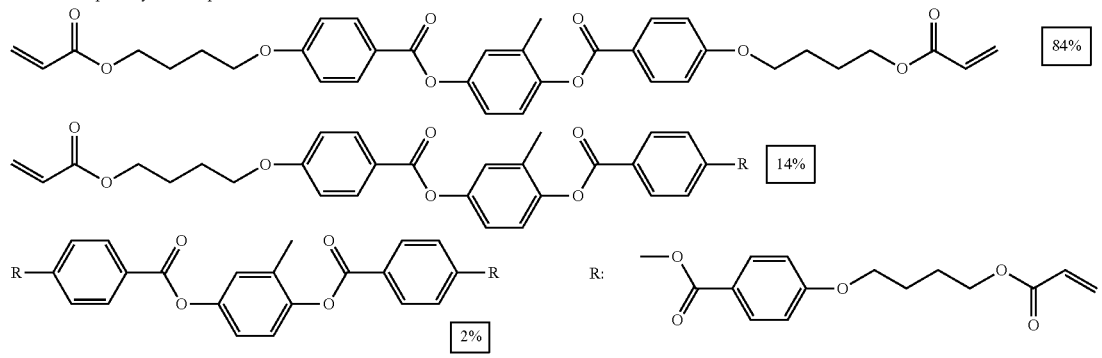

Chiral Agent Ch-1

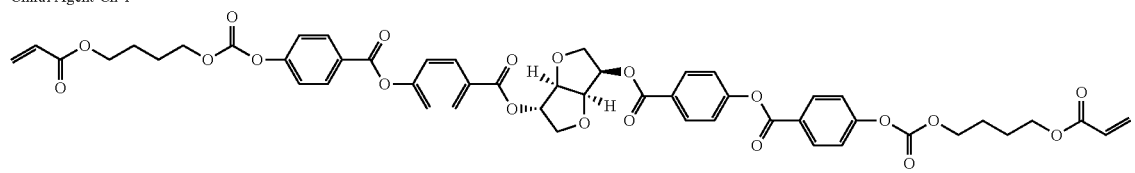

The above-described composition A-1 was applied to the alignment film P-1 to form a coating film, the coating film was heated using a hot plate at 80° C. and was irradiated at 80° C. with ultraviolet light having a wavelength of 365 nm at an irradiation dose of 300 mJ/cm² using a high-pressure mercury lamp in a nitrogen atmosphere. As a result, the alignment of the liquid crystal compound is immobilized, and the liquid crystal layer of the first incidence diffraction element was formed.

In a case where a cross-section of a coating layer was observed with a scanning electron microscope (SEM), the number of pitches of the normal direction (thickness direction) with respect to the main surface was 8. Regarding the pitch, an interval between bright portions or between dark portions in the normal direction with respect to the main surface was set as a ½ pitch. In addition, the pitch P of tilted surfaces of bright portions and dark portions with respect to a main surface was 0.36 µm. Regarding the pitch P, an interval between bright portions or between dark portions in the normal direction with respect to the inclined surface was set as a ½ pitch. The bright portions and the dark portions described herein refer to bright portions and dark portions derived from a cholesteric liquid crystalline phase in a case where a cross-section of the cholesteric liquid crystal layer was observed with a SEM.

It was verified using a polarization microscope that the liquid crystal layer of the incidence diffraction element G had a periodically aligned surface as shown in FIG. 17. In a case where a cross-section of the coating layer was observed with a SEM, in the liquid crystal alignment pattern of the liquid crystal layer of the incidence diffraction element G, the single period over which the optical axis of the liquid crystal compound rotated by 180° was 0.39 µm.

(Preparation of Incidence Diffraction Element R)

An incidence diffraction element R was prepared using the same method as that of the incidence diffraction element G, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 4.42 parts by mass, and the film thickness was adjusted.

In the liquid crystal layer of the incidence diffraction element R, the number of pitches was 8, and in the liquid crystal alignment pattern, the single period over which the optical axis derived from the liquid crystal compound rotated by 180° was 0.45 µm. The pitch P of the liquid crystal layer was 0.43 µm.

(Preparation of Emission Diffraction Element)

An emission diffraction element G and an emission diffraction element R were prepared using the same methods as those of the incidence diffraction element G and the incidence diffraction element R, except that the film thickness was adjusted.

The number of pitches in each of the liquid crystal layers was 2.

(Preparation of Light Guide Element)

As the light guide plate, a glass (material) light guide plate formed of glass and having a size of 60 mm×70 mm and a thickness of 1 mm was used. The incidence diffraction element G was used as the first A and first B incidence diffraction elements, the incidence diffraction element R was used as the second A and second B incidence diffraction elements, the emission diffraction element G was used as the first A and first B emission diffraction elements, and the emission diffraction element R was used as the second A and second B emission diffraction elements.

The incidence diffraction element was cut into a size having a diameter of 6 mm and used. The emission diffraction element was cut into a size of 25 mm×30 mm and used.

During the cutting of each of the diffraction elements, a cutting direction and a periodic direction of the diffraction structures were adjusted such that, in a case where the diffraction elements were disposed on the light guide plate, the periodic direction of the diffraction structure was a predetermined direction.

Each of the prepared diffraction elements was bonded to one main surface of the light guide plate using an adhesive.

Each of the diffraction elements was disposed as shown in FIG. 1. That is, the first A incidence diffraction element was disposed on the upper right side of the main surface of the light guide plate, the first B incidence diffraction element was disposed on the lower left side of the main surface of the light guide plate, the second A incidence diffraction element was disposed on the upper left side of the main surface of the light guide plate, the second B incidence diffraction element was disposed on the lower right side of the main surface of the light guide plate, and the first A, first B, second A, and second B emission diffraction elements were laminated and disposed at a center position of the main surface of the light guide plate. The emission diffraction elements and the incidence diffraction elements were disposed to be spaced from each other by 6 mm in the up-down direction. The first A incidence diffraction element and the second A incidence diffraction element were disposed to be spaced from each other by 20 mm in the left-right direction. The first B incidence diffraction element and the second B incidence diffraction element were disposed to be spaced from each other by 20 mm in the left-right direction.

In addition, the first A incidence diffraction element was disposed such that the periodic direction (arrangement axis D direction) of the diffraction structure was directed to the lower left side, the first B incidence diffraction element was disposed such that the periodic direction of the diffraction structure was directed to the upper right side, the second A incidence diffraction element was disposed such that the periodic direction of the diffraction structure was directed to the lower right side, and the second B incidence diffraction element was disposed such that the periodic direction of the diffraction structure was directed to the upper left side. The first A incidence diffraction element and the first B incidence diffraction element were disposed such that the periodic directions of the diffraction structures were different from each other by 180°, and the second A incidence diffraction element and the second B incidence diffraction element were disposed such that the periodic directions of the diffraction structures were different from each other by 180°.

In addition, the first A emission diffraction element was disposed such that the periodic direction (arrangement axis D direction) of the diffraction structure was directed to the lower left side, the first B emission diffraction element was disposed such that the periodic direction of the diffraction structure was directed to the upper right side, the second A emission diffraction element was disposed such that the periodic direction of the diffraction structure was directed to the lower right side, and the second B emission diffraction element was disposed such that the periodic direction of the diffraction structure was directed to the upper left side. The first A emission diffraction element and the first B emission diffraction element were disposed such that the periodic directions of the diffraction structures were different from each other by 180°, and the second A emission diffraction element and the second B emission diffraction element were disposed such that the periodic directions of the diffraction structures were different from each other by 180°. In addition, an angle between the periodic direction of the diffraction structure of the first A and first B emission diffraction elements and the periodic direction of the diffraction structure of the second A and second B emission diffraction elements was 90°.

As a result, a light guide element was prepared.

In addition, in subsequent Examples and Comparative Examples, the disposition of the diffraction elements was appropriately adjusted.

Example 1-2

A light guide element was prepared using the same method as that of Example 1-1, except that the arrangement positions and directions of the diffraction elements were adjusted such that an angle between the periodic direction of the diffraction structure of the first A and first B emission diffraction elements and the periodic direction of the diffraction structure of the second A and second B emission diffraction elements was 70°.

Comparative Example 1

A light guide element was prepared using the same method as that of Example 1-1, except that the first A incidence diffraction element was laminated on the second A incidence diffraction element, the direction of the second A emission diffraction element was changed such that the periodic direction of the diffraction structure of the second A emission diffraction element matched with the periodic direction of the diffraction structure of the first A emission diffraction element, and the first B incidence diffraction element, the second B incidence diffraction element, the first B emission diffraction element, and the second B emission diffraction element were not provided.

That is, an angle between the periodic direction of the diffraction structure of the first A emission diffraction element and the periodic direction of the diffraction structure of the second A emission diffraction element was 0°.

Examples 2-1 and 2-2 and Comparative Example 2

Light guide elements were prepared using the same methods as those of Examples 1-1 and 1-2 and Comparative Example 1, except that an incidence diffraction element B described below was used as the first A and first B incidence diffraction elements, an emission diffraction element B described below was used as the first A and first B emission diffraction elements, the incidence diffraction element G was used as the second A and second B incidence diffraction elements, and the emission diffraction element G was used as the second A and second B emission diffraction elements.

(Preparation of Incidence Diffraction Element B)

The incidence diffraction element B was prepared using the same method as that of the incidence diffraction element G, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 6.10 parts by mass, and the film thickness was adjusted.

In the liquid crystal layer of the incidence diffraction element B, the number of pitches was 8, and in the liquid crystal alignment pattern, the single period over which the optical axis derived from the liquid crystal compound rotated by 180° was 0.32 μm. The pitch P of the liquid crystal layer was 0.31 μm.

(Preparation of Emission Diffraction Element B)

An emission diffraction element B was prepared using the same method as that of the incidence diffraction element B, except that the film thickness was adjusted.

The number of pitches in the liquid crystal layer of the emission diffraction element B was 2.

Examples 3-1 and 3-2 and Comparative Example 3

Light guide elements were prepared using the same methods as those of Examples 2-1 and 2-2 and Comparative Example 2, except that the incidence diffraction element R as the third A incidence diffraction element was laminated on the incidence diffraction element B as the first A incidence diffraction element, the incidence diffraction element R as the third B incidence diffraction element was laminated on the incidence diffraction element B as the first B incidence diffraction element, and the two emission diffraction elements R as the third A emission diffraction element and the third B emission diffraction element were laminated on the first A, first B, second A, and second B emission diffraction elements.

The third A incidence diffraction element, the third B incidence diffraction element, the first A incidence diffraction element, and the first B incidence diffraction element were disposed such that the periodic directions of the diffraction structures of the third A incidence diffraction element and the third B incidence diffraction element matched with the periodic directions of the diffraction structures of the first A incidence diffraction element and the first B incidence diffraction element. In addition, the third A emission diffraction element, the third B emission diffraction element, the first A emission diffraction element, and the first B emission diffraction element were disposed such that the periodic directions of the diffraction structures of the third A emission diffraction element and the third B emission diffraction element matched with the periodic directions of the diffraction structures of the first A emission diffraction element and the first B emission diffraction element.

That is, in Example 3-1, an angle between the periodic directions of the diffraction structures of the third A and third B emission diffraction element and the periodic directions of the diffraction structures of the second A and second B emission diffraction elements was 90°. In addition, in Example 3-2, an angle between the periodic directions of the diffraction structures of the third A and third B emission diffraction element and the periodic directions of the diffraction structures of the second A and second B emission diffraction elements was 70°. In addition, in Comparative Example 3, an angle between the periodic directions of the diffraction structures of the third A and third B emission diffraction element and the periodic directions of the diffraction structures of the second A and second B emission diffraction elements was 0°.

Example 4-1

A light guide element including intermediate diffraction elements as shown in FIG. 6 was prepared as follows.
(Preparation of Intermediate Diffraction Element G)

An intermediate diffraction element G was prepared using the same method as that of the incidence diffraction element G, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 4.64 parts by mass, and the film thickness was adjusted.

In the liquid crystal layer of the intermediate diffraction element G, the number of pitches was 2, and in the liquid crystal alignment pattern, the single period over which the optical axis derived from the liquid crystal compound rotated by 180° was 0.28 μm. The pitch P of the liquid crystal layer was 0.41 μm.
(Preparation of Intermediate Diffraction Element R)

An intermediate diffraction element R was prepared using the same method as that of the incidence diffraction element R, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 3.94 parts by mass, and the film thickness was adjusted.

In the liquid crystal layer of the intermediate diffraction element R, the number of pitches was 2, and in the liquid crystal alignment pattern, the single period over which the optical axis derived from the liquid crystal compound rotated by 180° was 0.32 μm. The pitch P of the liquid crystal layer was 0.48 μm.
(Preparation of Light Guide Element)

As the light guide plate, a glass (material) light guide plate formed of glass and having a size of 60 mm×70 mm and a thickness of 1 mm was used. The incidence diffraction element G was used as the first A and first B incidence diffraction element, the incidence diffraction element R was used as the second A and second B incidence diffraction elements, the intermediate diffraction element G was used as the first A and first B intermediate diffraction elements, the intermediate diffraction element R was used as the second A and second B intermediate diffraction elements, the emission diffraction element G was used as the first A and first B emission diffraction elements, and the emission diffraction element R was used as the second A and second B emission diffraction elements.

The incidence diffraction element was cut into a size having a diameter of 6 mm and used. The intermediate diffraction element was cut into a size of 12 mm (maximum)×22 mm and used. The emission diffraction element was cut into a size of 25 mm×30 mm and used.

During the cutting of each of the diffraction elements, a cutting direction and a periodic direction of the diffraction structures were adjusted such that, in a case where the diffraction elements were disposed on the light guide plate, the periodic direction of the diffraction structure was a predetermined direction.

Each of the prepared diffraction elements was bonded to one main surface of the light guide plate using an adhesive.

Each of the diffraction elements was disposed as shown in FIG. 6. That is, the first A incidence diffraction element was disposed on the right side at the upper center of the main surface of the light guide plate, the first B incidence diffraction element was disposed on the left side at the lower center of the main surface of the light guide plate, the second A incidence diffraction element was disposed on the left side at the upper center of the main surface of the light guide plate, the second B incidence diffraction element was disposed on the right side at the lower center of the main surface of the light guide plate, the first A intermediate diffraction element was disposed on the right side of the first A incidence diffraction element, the second A intermediate diffraction element was disposed on the left side of the second A incidence diffraction element, the first B intermediate diffraction element was disposed on the left side of the first B incidence diffraction element, and the second B intermediate diffraction element was disposed on the right side of the second B incidence diffraction element. In addition, the first A, first B, second A, and second B emission diffraction elements were laminated and disposed at a center position of the main surface of the light guide plate. The emission diffraction elements and the incidence diffraction elements were disposed to be spaced from each other by 6 mm in the up-down direction. The first A incidence diffraction element and the second A incidence diffraction element were disposed to be spaced from each other by 1 mm in the left-right direction. The first B incidence diffraction element and the second B incidence diffraction element were disposed to be spaced from each other by 1 mm in the left-right direction. The first A incidence diffraction element and the first A intermediate diffraction element were disposed to be spaced from each other by 1 mm in the left-right direction. The second A incidence diffraction element and the second A intermediate diffraction element were disposed to be spaced from each other by 1 mm in the left-right direction. The first B incidence diffraction element and the first B intermediate diffraction element were disposed to be spaced from each other by 1 mm in the left-right direction. The second B incidence diffraction element and the second B intermediate diffraction element were disposed to be spaced from each other by 1 mm in the left-right direction.

In addition, the first A incidence diffraction element was disposed such that the periodic direction (arrangement axis D direction) of the diffraction element was directed to the right side, the first B incidence diffraction element was disposed such that the periodic direction of the diffraction element was directed to the left side, the second A incidence diffraction element was disposed such that the periodic direction of the diffraction element was directed to the left side, and the second B incidence diffraction element was disposed such that the periodic direction of the diffraction element was directed to the right side.

The respective intermediate diffraction elements were disposed in a state where the periodic direction of the diffraction elements was adjusted such that incident light was diffracted in the direction of the emission diffraction element.

In addition, the first A emission diffraction element was disposed such that the periodic direction (arrangement axis D direction) of the diffraction element was directed to the lower left side, the first B emission diffraction element was disposed such that the periodic direction of the diffraction element was directed to the upper right side, the second A emission diffraction element was disposed such that the periodic direction of the diffraction element was directed to the lower right side, and the second B emission diffraction element was disposed such that the periodic direction of the diffraction element was directed to the upper left side. The first A emission diffraction element and the first B emission diffraction element were disposed such that the periodic directions of the diffraction elements were different from each other by 180°, and the second A emission diffraction element and the second B emission diffraction element were disposed such that the periodic directions of the diffraction elements were different from each other by 180°. In addition, an angle between the periodic direction of the diffraction structure of the first A and first B emission diffraction elements and the periodic direction of the diffraction structure of the second A and second B emission diffraction elements was 90°.

As a result, a light guide element was prepared.

Example 4-2

A light guide element was prepared using the same method as that of Example 4-1, except that the arrangement positions and directions of the diffraction elements were adjusted such that an angle between the periodic direction of the diffraction structure of the first A and first B emission diffraction elements and the periodic direction of the diffraction structure of the second A and second B emission diffraction elements was 70°.

Comparative Example 4

A light guide element was prepared using the same method as that of Example 4-1, except that the first A incidence diffraction element was laminated on the second A incidence diffraction element, the second A intermediate diffraction element was laminated on the first A intermediate diffraction element, the direction of the second A emission diffraction element was changed such that the periodic direction of the diffraction structure of the second A emission diffraction element matched with the periodic direction of the diffraction structure of the first A emission diffraction element, and the first B incidence diffraction element, the second B incidence diffraction element, the first B intermediate diffraction element, the second B intermediate diffraction element, the first B emission diffraction element, and the second B emission diffraction element were not provided.

That is, an angle between the periodic directions of the diffraction structures of the first A and first B emission diffraction element and the periodic directions of the diffraction structures of the second A and second B emission diffraction elements was 0°.

Examples 5-1 and 5-2 and Comparative Example 5

Light guide elements were prepared using the same methods as those of Examples 4-1 and 4-2 and Comparative Example 4, except that the incidence diffraction element B was used as the first A and first B incidence diffraction elements, an intermediate diffraction element B described below was used as the first A and first B intermediate diffraction elements, the emission diffraction element B was used as the first A and first B emission diffraction elements, the incidence diffraction element G was used as the second A and second B incidence diffraction elements, the intermediate diffraction element G was used as the second A and second B intermediate diffraction elements, the emission diffraction element G was used as the second A and second B emission diffraction elements, the incidence diffraction element R was used as the third A and third B incidence diffraction elements, the intermediate diffraction element R was used as the third A and third B intermediate diffraction elements, and the emission diffraction element R was used as the third A and third B emission diffraction elements.

That is, the incidence diffraction element B as the first A incidence diffraction element and the incidence diffraction element R as the third A incidence diffraction element was laminated, the incidence diffraction element B as the first B incidence diffraction element and the incidence diffraction element R as the third B incidence diffraction element were laminated, the intermediate diffraction element B as the first A intermediate diffraction element and the intermediate diffraction element R as the third A intermediate diffraction element were laminated, the intermediate diffraction element R as the third B intermediate diffraction element was laminated on the intermediate diffraction element B as the first B intermediate diffraction element, and the two emission diffraction elements B, the emission diffraction elements G, and the emission diffraction elements R were laminated as the first A, first B, second A, second B, third A, and third B emission diffraction elements.

(Preparation of Intermediate Diffraction Element B)

An intermediate diffraction element B was prepared using the same method as that of the intermediate diffraction element G, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 5.57 parts by mass, and the film thickness was adjusted.

In the liquid crystal layer, the number of pitches was 2, and in the liquid crystal alignment pattern, the single period over which the optical axis derived from the liquid crystal compound rotated by 180° was 0.23 μm. The pitch P of the liquid crystal layer was 0.34 μm.

[Evaluation]

Regarding each of the prepared light guide elements, the multiple images and the viewing angle were evaluated.

(Multiple Images)

A projection display in which a projection light source and a convex lens were combined with liquid crystal on silicon (LCOS) was prepared. An image display apparatus was prepared in which a projection display was disposed to emit an image to the incidence diffraction element. A circular polarization plate was disposed between the projection display and the incidence diffraction element such that an image of right circularly polarized light was projected to the incidence diffraction element. In addition, a plurality of projection displays were used according to the arrangement of the incidence diffraction elements. Each of the projection displays emitted an image of a color (wavelength) corresponding to the incidence diffraction element. In addition, the projection displays emitted the same image to the first A and first B incidence diffraction elements, emitted the same image to the second A and second B incidence diffraction elements, and emitted the same image to the third A and third B incidence diffraction elements.

An image was displayed using the prepared image display apparatus, and multiple images were evaluated based on the following standards.

A: the occurrence of multiple images was not substantially visually recognized

B: the occurrence of multiple images was slightly recognized but the degree thereof was low C: the occurrence of multiple images was weakly visually recognized but the degree thereof was within the allowable range D: the occurrence of multiple images was visually recognized and conspicuous (Viewing Angle)

Light was emitted to each of the light guide elements to evaluate the viewing angle.

Regarding Examples 1-1, 1-2, 4-1, and 4-2 and Comparative Examples 1 and 4, the evaluation was performed using light having a wavelength of 532 nm and light having a wavelength of 635 nm. Regarding Examples 2-1 and 2-2 and Comparative Example 2, the evaluation was performed using light having a wavelength of 450 nm and light having a wavelength of 532 nm. Regarding Examples 3-1, 3-2, 5-1, and 5-2 and Comparative Examples 3 and 5, the evaluation was performed using light having a wavelength of 450 nm, light having a wavelength of 532 nm, and light having a wavelength of 635 nm.

Light emitted from the light source was caused to transmit through the linear polarizer and the λ/4 plate. As a result, right circularly polarized light was obtained. This light was caused to be incident into the incidence diffraction element of the light guide element and was emitted from the emission diffraction elements. In this case, the amount of the emitted light was measured using a power meter. As a position to be measured, the light emitted from the center of the emission diffraction element was measured. In addition, in a case where the normal direction to the main surface of the light guide plate was represented by 0°, the incidence angle of light into the incidence diffraction elements was changed on a basis of 2.5° from −30° to 30° (horizontal direction). A pinhole was disposed such that the effective aperture of the power meter was 2 mmφ, and the light amount was measured for the evaluation such that the emitted light transmitted through the center of the pinhole. An angle range where the amount of the emitted light was 30% or higher with respect to the amount of the emitted light at the emission angle where the amount of the emitted light was the maximum was evaluated as the viewing angle. In a case where light components having two or more wavelengths were used, by performing the evaluation of each of the wavelengths, an angle range where the above-described conditions were satisfied at all the wavelengths used for the evaluation was obtained as the viewing angle.

By emitting light to each of the light guide elements prepared as described above, the viewing angle was evaluated based on the following standards.

A: the viewing angle was 1.5 times or more as compared to the corresponding comparative example B: the viewing angle was 1.3 times or more and less than 1.5 times as compared to the corresponding comparative example C: the viewing angle was 1.1 times or more and less than 1.3 times as compared to the corresponding comparative example D: the viewing angle was less than 1.1 times as compared to the corresponding comparative example The results are shown in the following table.

TABLE 1

| | Incidence Diffraction Element | | | Incidence Diffraction Element | | | Incidence Diffraction Element | | | Intersecting Angle between Periodic Directions | | Evaluation | |
|---|---|---|---|---|---|---|---|---|---|---|---|---|---|
| | $\Lambda_{in1}$ [μm] | $\Lambda_{in2}$ [μm] | $\Lambda_{in3}$ [μm] | $\Lambda_{mid1}$ [μm] | $\Lambda_{mid2}$ [μm] | $\Lambda_{mid3}$ [μm] | $\Lambda_{out1}$ [μm] | $\Lambda_{out2}$ [μm] | $\Lambda_{out3}$ [μm] | First and Second [°] | Third and Second [°] | Multiple Images | Viewing Angle |
| Comparative Example 1 | 0.39 | 0.45 | — | — | — | — | 0.39 | 0.45 | — | 0 | — | D | C |
| Example 1-1 | 0.39 | 0.45 | — | — | — | — | 0.39 | 0.45 | — | 90 | — | A | A |
| Example 1-2 | 0.39 | 0.45 | — | — | — | — | 0.39 | 0.45 | — | 70 | — | B | A |
| Comparative Example 2 | 0.32 | 0.39 | — | — | — | — | 0.32 | 0.39 | — | 0 | — | D | C |
| Example 2-1 | 0.32 | 0.39 | — | — | — | — | 0.32 | 0.39 | — | 90 | — | A | A |
| Example 2-2 | 0.32 | 0.39 | — | — | — | — | 0.32 | 0.39 | — | 70 | — | B | A |
| Comparative Example 3 | 0.32 | 0.39 | 0.45 | — | — | — | 0.32 | 0.39 | 0.45 | 0 | 0 | D | C |
| Example 3-1 | 0.32 | 0.39 | 0.45 | — | — | — | 0.32 | 0.39 | 0.45 | 90 | 90 | A | A |
| Example 3-2 | 0.32 | 0.39 | 0.45 | — | — | — | 0.32 | 0.39 | 0.45 | 70 | 70 | B | A |
| Comparative Example 4 | 0.39 | 0.45 | — | 0.28 | 0.32 | — | 0.39 | 0.45 | — | 0 | — | D | C |
| Example 4-1 | 0.39 | 0.45 | — | 0.28 | 0.32 | — | 0.39 | 0.45 | — | 90 | — | A | A |
| Example 4-2 | 0.39 | 0.45 | — | 0.28 | 0.32 | — | 0.39 | 0.45 | — | 70 | — | B | A |
| Comparative Example 5 | 0.32 | 0.39 | 0.45 | 0.23 | 0.28 | 0.32 | 0.32 | 0.39 | 0.45 | 0 | 0 | D | C |
| Example 5-1 | 0.32 | 0.39 | 0.45 | 0.23 | 0.28 | 0.32 | 0.32 | 0.39 | 0.45 | 90 | 90 | A | A |
| Example5-2 | 0.32 | 0.39 | 0.45 | 0.23 | 0.28 | 0.32 | 0.32 | 0.39 | 0.45 | 70 | 70 | B | A |

It can be seen from Table 1 that, in Examples of the light guide element according to the embodiment of the present invention where the periodic directions of the diffraction structures of the first A and first B emission diffraction element and the periodic directions of the diffraction structures of the second A and second B emission diffraction elements intersected with each other, the occurrence of multiple images was further suppressed as compared to Comparative Examples where the periodic direction of the diffraction structure of the first A emission diffraction element and a periodic direction of the diffraction structure of the second A emission diffraction element did not intersect with each other. In addition, it can be seen that, in Examples of the present invention, the viewing angle can be widened because the same image is guided in the light guide plate along two different routes (two systems) and displayed.

In addition, it can be seen from a comparison between Examples 1-1 and 1-2, Examples 2-1 and 2-2, Examples 3-1 and 3-2, Examples 4-1 and 4-2, and Examples 5-1 and 5-2 that the intersecting angle between the periodic directions of the diffraction structures of the first A and first B emission diffraction elements and the periodic directions of the diffraction structures of the second A and second B emission diffraction element is preferably 70° or more and more preferably 90° or more.

As can be seen from the above results, the effects of the present invention are obvious.

The present invention is suitably applicable to various optical devices such as AR glasses in which light guiding is used.

EXPLANATION OF REFERENCES

10, 10a to 10c: image display apparatus
12, 12B$_1$, 12G$_1$, 12G$_2$, 12RB$_1$: display element
14, 14a to 14c: light guide element
16: light guide plate
17A: first A incidence diffraction element
17B: first B incidence diffraction element
18A: second A incidence diffraction element
18B: second B incidence diffraction element
19A: third A incidence diffraction element
19B: third B incidence diffraction element
20A: first A intermediate diffraction element
20B: first B intermediate diffraction element
21A: second A intermediate diffraction element
21B: second B intermediate diffraction element
22A: third A intermediate diffraction element
22B: third B intermediate diffraction element
23A: first A emission diffraction element
23B: first B emission diffraction element
24A: second A emission diffraction element
24B: second B emission diffraction element
25A: third A emission diffraction element
25B: third B emission diffraction element
30: support
32: alignment film
34, 36: liquid crystal layer
40: liquid crystal compound
40A: optical axis
42: bright portion
44: dark portion
60: exposure device
62: laser
64: light source
65: $\lambda/2$ plate
68: polarization beam splitter
70A, 70B: mirror
72A, 72B: $\lambda/4$ plate
108: volume hologram type diffraction element
110, 112: region
$R_R$: right circularly polarized light of red light
M: laser light
MA, MB: beam
$P_O$: linearly polarized light
$P_R$: right circularly polarized light $P_L$: left circularly polarized light
Q: absolute phase
E, E1, E2: equiphase surface
$L_1$, $L_4$: incidence light
$L_2$, $L_5$: transmitted light
U: user
D, $D_{1a}$, $D_{1b}$, $D_{2a}$, $D_{2b}$, $D_{3a}$, $D_{3b}$: arrangement axis
A, $\Lambda_{in1}$, $\Lambda_{in2}$, $\Lambda_{in3}$, $\Lambda_{mid1}$, $\Lambda_{mid2}$, $\Lambda_{mid3}$, $\Lambda_{out1}$, $\Lambda_{out2}$, $\Lambda_{out3}$: period of diffraction structure
P, $P_{in1}$, $P_{in2}$, $P_{in3}$, $P_{mid1}$, $P_{mid2}$, $P_{mid3}$, $P_{out1}$, $P_{out2}$, $P_{out3}$: pitch

What is claimed is:

1. A light guide element comprising:
a light guide plate; and
a first A incidence diffraction element, a first B incidence diffraction element, a second A incidence diffraction element, a second B incidence diffraction element, a first A emission diffraction element, a first B emission diffraction element, a second A emission diffraction element, and a second B emission diffraction element that are provided in the light guide plate,
wherein the first A incidence diffraction element, the first B incidence diffraction element, the first A emission diffraction element, and the first B emission diffraction element diffract light in the same wavelength range,
the second A incidence diffraction element, the second B incidence diffraction element, the second A emission diffraction element, and the second B emission diffraction element diffract light in the same wavelength range,
the first A incidence diffraction element and the second A incidence diffraction element diffract incident light in different directions to be incident into the light guide plate,
the first B incidence diffraction element and the second B incidence diffraction element diffract incident light in different directions to be incident into the light guide plate,
the first A emission diffraction element emits light that is diffracted by the first A incidence diffraction element and propagates in the light guide plate from the light guide plate,
the first B emission diffraction element emits light that is diffracted by the first B incidence diffraction element and propagates in the light guide plate from the light guide plate,
the second A emission diffraction element emits light that is diffracted by the second A incidence diffraction element and propagates in the light guide plate from the light guide plate,
the second B emission diffraction element emits light that is diffracted by the second B incidence diffraction element and propagates in the light guide plate from the light guide plate,
a period of a diffraction structure of the first A incidence diffraction element is different from periods of diffraction structures of the second A incidence diffraction element and the second B incidence diffraction element,
a period of a diffraction structure of the first B incidence diffraction element is different from the periods of the diffraction structures of the second A incidence diffraction element and the second B incidence diffraction element,
a period of a diffraction structure of the first A emission diffraction element is different from periods of diffraction structures of the second A emission diffraction element and the second B emission diffraction element,
a period of a diffraction structure of the first B emission diffraction element is different from the periods of the diffraction structures of the second A emission diffraction element and the second B emission diffraction element,
the first A emission diffraction element, the first B emission diffraction element, the second A emission diffraction element, and the second B emission diffraction element are disposed at overlapping positions in a plane direction of a main surface of the light guide plate,
a periodic direction of the diffraction structure of the first A emission diffraction element intersects with a periodic direction of the diffraction structure of the second A emission diffraction element and a periodic direction of the diffraction structure of the second B emission diffraction element, and
a periodic direction of the diffraction structure of the first B emission diffraction element intersects with the periodic direction of the diffraction structure of the second A emission diffraction element and the periodic direction of the diffraction structure of the second B emission diffraction element.

2. The light guide element according to claim 1, further comprising:
a first A intermediate diffraction element, a first B intermediate diffraction element, a second A intermediate diffraction element, and a second B intermediate diffraction element that are provided on the light guide plate,
wherein the first A intermediate diffraction element diffracts light that is diffracted by the first A incidence diffraction element and propagates in the light guide plate to the first A emission diffraction element,
the first B intermediate diffraction element diffracts light that is diffracted by the first B incidence diffraction element and propagates in the light guide plate to the first B emission diffraction element,
the second A intermediate diffraction element diffracts light that is diffracted by the second A incidence diffraction element and propagates in the light guide plate to the second A emission diffraction element,
the second B intermediate diffraction element diffracts light that is diffracted by the second B incidence diffraction element and propagates in the light guide plate to the second B emission diffraction element,
a period of a diffraction structure of the first A intermediate diffraction element is different from periods of diffraction structures of the second A intermediate diffraction element and the second B intermediate diffraction element, and
a period of a diffraction structure of the first B intermediate diffraction element is different from the periods of the diffraction structures of the second A intermediate diffraction element and the second B intermediate diffraction element.

3. The light guide element according to claim 2,
wherein each of the first A intermediate diffraction element, the first B intermediate diffraction element, the second A intermediate diffraction element, and the second B intermediate diffraction element is any one of a volume hologram type diffraction element or a polarization diffraction element.

4. The light guide element according to claim 1,
wherein each of the first A incidence diffraction element, the first B incidence diffraction element, the second A incidence diffraction element, the second B incidence diffraction element, the first A emission diffraction element, the first B emission diffraction element, the second A emission diffraction element, and the second B emission diffraction element is any one of a volume hologram type diffraction element or a polarization diffraction element.

5. The light guide element according to claim 3, wherein the polarization diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction.

6. The light guide element according to claim 5, wherein the liquid crystal diffraction element has a region in which the direction of the optical axis of the liquid crystal compound is helically twisted and rotates in a thickness direction.

7. The light guide element according to claim 5, wherein the liquid crystal diffraction element includes a cholesteric liquid crystal layer obtained by immobilizing a cholesteric liquid crystalline phase.

8. The light guide element according to claim 7, wherein in at least either of the first A emission diffraction element and the second A emission diffraction element or the first B emission diffraction element and the second B emission diffraction element, helical twisted rotation directions of cholesteric liquid crystalline phases are different from each other.

9. The light guide element according to claim 5, wherein in a case where an in-plane retardation is measured from a direction tilted with respect to a normal direction and a normal line of a main surface of the liquid crystal diffraction element, a direction in which the in-plane retardation is minimum in any one of a slow axis plane or a fast axis plane is tilted from the normal direction.

10. The light guide element according to claim 1, wherein the periods of the diffraction structures of the first A emission diffraction element, the first B emission diffraction element, the second A emission diffraction element, and the second B emission diffraction element are 0.1 µm to 10 µm.

11. The light guide element according to claim 1, wherein at least either of the first A incidence diffraction element and the first B incidence diffraction element or the second A incidence diffraction element and the second B incidence diffraction element are laminated.

12. The light guide element according to claim 1, wherein the first A incidence diffraction element, the first B incidence diffraction element, the second A incidence diffraction element, and the second B incidence diffraction element are disposed at different positions in the plane direction of the light guide plate.

13. The light guide element according to claim 1, further comprising:
a third A incidence diffraction element, a third B incidence diffraction element, a third A emission diffraction element, and a third B emission diffraction element that are provided on the light guide plate,
wherein the third A incidence diffraction element, the third B incidence diffraction element, the third A emission diffraction element, and the third B emission diffraction element diffract light in the same wavelength range,
the third A incidence diffraction element and the second A incidence diffraction element diffract incident light in different directions to be incident into the light guide plate,
the third B incidence diffraction element and the second B incidence diffraction element diffract incident light in different directions to be incident into the light guide plate,
the third A emission diffraction element emits light that is diffracted by the third A incidence diffraction element and propagates in the light guide plate from the light guide plate,
the third B emission diffraction element emits light that is diffracted by the third B incidence diffraction element and propagates in the light guide plate from the light guide plate,
periods of diffraction structures of the third A incidence diffraction element and the third B incidence diffraction element are different from the periods of the diffraction structures of the first A incidence diffraction element and the first B incidence diffraction element and the periods of the diffraction structures of the second A incidence diffraction element and the second B incidence diffraction element,
periods of diffraction structures of the third A emission diffraction element and the third B emission diffraction element are different from the periods of the diffraction structures of the first A emission diffraction element and the first B emission diffraction element and the periods of the diffraction structures of the second A emission diffraction element and the second B emission diffraction element,
the third A emission diffraction element, the third B emission diffraction element, the second A emission diffraction element, and the second B emission diffraction element are disposed at overlapping positions in the plane direction of the main surface of the light guide plate,
a periodic direction of the diffraction structure of the third A emission diffraction element intersects with the periodic direction of the diffraction structure of the second A emission diffraction element and the periodic direction of the diffraction structure of the second B emission diffraction element, and
a periodic direction of the diffraction structure of the third B emission diffraction element intersects with the periodic direction of the diffraction structure of the second A emission diffraction element and the periodic direction of the diffraction structure of the second B emission diffraction element.

14. The light guide element according to claim 13, wherein in a case where the periods of the diffraction structures of the first A incidence diffraction element and the first B incidence diffraction element are represented by $\Lambda_{in1}$,
the periods of the diffraction structures of the second A incidence diffraction element and the second B incidence diffraction element are represented by $\Lambda_{in2}$,
the periods of the diffraction structures of the third A incidence diffraction element and the third B incidence diffraction element are represented by $\Lambda_{in3}$,
the periods of the diffraction structures of the first A emission diffraction element and the first B emission diffraction element are represented by $\Lambda_{out1}$,
the periods of the diffraction structures of the second A emission diffraction element and the second B emission diffraction element are represented by $\Lambda_{out2}$, and the periods of the diffraction structures of the third A emission diffraction element and the third B emission diffraction element are represented by $\Lambda_{out3}$, $$\Lambda_{in1} < \Lambda_{in2} < \Lambda_{in3} \text{ and}$$

$$\Lambda_{out1} < \Lambda_{out2} < \Lambda_{out3}$$

are satisfied.

15. The light guide element according to claim 13, further comprising:
a first A intermediate diffraction element, a first B intermediate diffraction element, a second A intermediate diffraction element, a second B intermediate diffraction element, a third A intermediate diffraction element, and a third B intermediate diffraction element that are provided on the light guide plate,
wherein the third A intermediate diffraction element diffracts light that is diffracted by the third A incidence diffraction element and propagates in the light guide plate to the third A emission diffraction element,
the third B intermediate diffraction element diffracts light that is diffracted by the third B incidence diffraction element and propagates in the light guide plate to the third B emission diffraction element,
a period of a diffraction structure of the third A intermediate diffraction element is different from periods of diffraction structures of the second A intermediate diffraction element and the second B intermediate diffraction element, and
a period of a diffraction structure of the third B intermediate diffraction element is different from the periods of the diffraction structures of the second A intermediate diffraction element and the second B intermediate diffraction element.

16. The light guide element according to claim 15,
wherein in a case where periods of diffraction structures of the first A intermediate diffraction element and the first B intermediate diffraction element are represented by $\Lambda_{mid1}$,
the periods of the diffraction structures of the second A intermediate diffraction element and the second B intermediate diffraction element are represented by $\Lambda_{mid2}$, and
the periods of the diffraction structures of the third A intermediate diffraction element and the third B intermediate diffraction element are represented by $\Lambda_{mid3}$, $$\Lambda_{mid1} < \Lambda_{mid2} < \Lambda_{mid3}$$

is satisfied.

17. The light guide element according to claim 15,
wherein each of the third A intermediate diffraction element and the third B intermediate diffraction element is any one of a volume hologram type diffraction element or a polarization diffraction element.

18. The light guide element according to claim 13,
wherein each of the third A incidence diffraction element, the third B incidence diffraction element, the third A emission diffraction element, and the third B emission diffraction element is any one of a volume hologram type diffraction element or a polarization diffraction element.

19. The light guide element according to claim 17,
wherein the polarization diffraction element is a liquid crystal diffraction element including a liquid crystal layer that is formed of a composition including a liquid crystal compound and has a liquid crystal alignment pattern in which a direction of an optical axis derived from the liquid crystal compound changes while continuously rotating in at least one in-plane direction.

20. The light guide element according to claim 19,
wherein the liquid crystal diffraction element includes a cholesteric liquid crystal layer obtained by immobilizing a cholesteric liquid crystalline phase.

21. The light guide element according to claim 20,
wherein in at least either of the third A emission diffraction element and the second A emission diffraction element or the third B emission diffraction element and the second B emission diffraction element, helical twisted rotation directions of cholesteric liquid crystalline phases are different from each other.

22. The light guide element according to claim 20,
wherein in a case where an in-plane retardation is measured from a direction tilted with respect to a normal direction and a normal line of a main surface of the liquid crystal diffraction element, a direction in which the in-plane retardation is minimum in any one of a slow axis plane or a fast axis plane is tilted from the normal direction.

23. The light guide element according to claim 20,
wherein in bright portions and dark portions derived from a liquid crystal phase in a cross-section of the liquid crystal layer observed with a scanning electron microscope, in a case where an interval between the bright portions or between the dark portions in a normal direction of lines formed by the bright portions or the dark portions is represented by a ½ pitch,
pitches in the first A incidence diffraction element and the first B incidence diffraction element are represented by $P_{in1}$,
pitches in the second A incidence diffraction element and the second B incidence diffraction element are represented by $P_{in2}$,
pitches in the third A incidence diffraction element and the third B incidence diffraction element are represented by $P_{in3}$,
pitches in the first A emission diffraction element and the first B emission diffraction element are represented by $P_{out1}$,
pitches in the second A emission diffraction element and the second B emission diffraction element are represented by $P_{out2}$, and
pitches in the third A emission diffraction element and the third B emission diffraction element are represented by $P_{out3}$, $$P_{in1} < P_{in2} < P_{in3} \text{ and}$$

$$P_{out1} < P_{out2} < P_{out3}$$

are satisfied.

24. An image display apparatus comprising:
the light guide element according to claim 1; and
a display element that emits an image to the first A incidence diffraction element, the first B incidence diffraction element, the second A incidence diffraction element, and the second B incidence diffraction element of the light guide element.

25. An image display apparatus comprising:
the light guide element according to claim 13; and
a display element that emits an image to the first A incidence diffraction element, the first B incidence diffraction element, the second A incidence diffraction element, the second B incidence diffraction element, the third A incidence diffraction element, and the third B incidence diffraction element of the light guide element.

* * * * *